United States Patent [19]

Tzikas

[11] Patent Number: 4,963,659
[45] Date of Patent: Oct. 16, 1990

[54] FIBER-REACTIVE DYES CONTAINING TWO CHROMOPHORIC SYSTEM BOUND TO A BRIDGING MEMBER CONSISTING OF TWO OR THREE TRIAZINYL RADICALS

[75] Inventor: Athanassios Tzikas, Pratteln, Switzerland

[73] Assignee: Ciba-Geigy Corporation, Ardsley, N.Y.

[21] Appl. No.: 323,455

[22] Filed: Mar. 14, 1989

[30] Foreign Application Priority Data

Mar. 16, 1988 [CH] Switzerland .......................... 999/88

[51] Int. Cl.$^5$ ...................... C09B 62/00; C09B 62/04; C09B 62/44; C09B 62/465
[52] U.S. Cl. .................................. 534/618; 534/617; 534/622; 534/624; 534/632; 534/634; 534/641; 534/643; 534/598; 534/637; 534/629; 544/181; 544/187; 544/198; 544/208; 544/209
[58] Field of Search ............... 534/634, 618, 624, 641, 534/617, 622, 632, 643, 629; 544/181, 187, 198, 208, 209

[56] References Cited

FOREIGN PATENT DOCUMENTS

| | | | |
|---|---|---|---|
| 203567 | 12/1986 | European Pat. Off. | ............ 534/634 |
| 297044 | 12/1988 | European Pat. Off. | ............ 534/634 |
| 302006 | 2/1989 | European Pat. Off. | ............ 534/634 |

OTHER PUBLICATIONS

Chem. Abstract, 100:176450u (1984), Mitsubishi.

*Primary Examiner*—Floyd D. Nigel
*Attorney, Agent, or Firm*—Kevin T. Mansfield; George R. Dohmann

[57] ABSTRACT

Reactive dyes which are particularly suitable for the dyeing or printing of cellulose-containing fiber materials by the exhaust process or by the continuous process and give, at a high color yield, dyeings and prints having good fastness properties, having the formula $$D_1-N-C\overset{N}{\underset{N}{\diagdown}}C-N-E-N-C\overset{N}{\underset{N}{\diagdown}}C-N-D_2, \quad (1)$$
(with $R_1$, $B_1$, $B_2$, $R_2$ substituents and X)

in which $D_1$ and $D_2$, independently of one another, are each a radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye; $R_1$, $R_2$, $B_1$ and $B_2$, independently of one another, are hydrogen or alkyl having 1 to 4 carbon atoms, which is unsubstituted or substituted by halogen, hydroxyl, cyano, $C_1-C_4$ alkoxy, $C_1-C_4$alkoxycarbonyl, carboxyl, sulfamoyl, sulfo or sulfato; X is fluorine, chlorine, bromine, sulfo, $C_1-C_4$alkylsulfonyl, phenylsulfonyl or carboxypyridinium, and E is a radical of the formula $$-A_1-NH-C\overset{N}{\underset{N}{\diagdown}}C-NH-A_2- \quad (2)$$
(with N—$R_3$ and $(R_4)_{0-3}$ phenyl—B—CO—R)

in which $A_1$ and $A_2$, independently of one another, are each a radical of the formula $$-(CH_2)_{1-6}- \quad (3a)$$

$(R_5)_{0-3}$ phenylene (3b)

$HO_3S$-naphthylene-$SO_3H$ (3c)

or

H-cyclohexylene (3d)

or
X is a radical of the formula $(R_4)_{0-3}$, $-N(R_3)-$phenyl$-B-CO-R$ (4)

(Abstract continued on next page.)

and E is a radical of the formula (3a), (3b), (3c) or (3d);

and $R_3$ is hydrogen or alkyl having 1 to 4 carbon atoms, which is unsubstituted or substituted by halogen, hydroxyl, cyano, $C_1$-$C_4$alkoxy, $C_1$-$C_4$alkoxycarbonyl, carboxyl, sulfamoyl, sulfo or sulfato; $R_4$ and $R_5$, independently of one another, are 0 to 3 substituents from the group consisting of $C_1$-$C_4$alkyl, $C_1$-$C_4$alkoxy, halogen, carboxyl and sulfo; B is a direct bond or —$(CH_2)_n$— or —O—$(CH_2)_n$—, n is 1 to 6; R is a radical of the formula

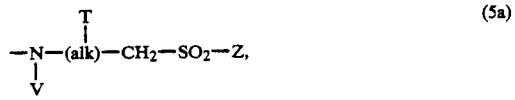

(5a)

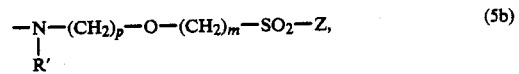

(5b)

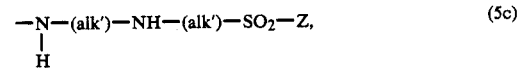

(5c)

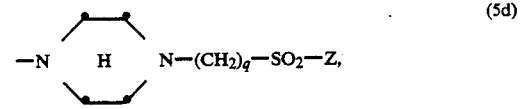

(5d)

Z is a β-sulfatoethyl, β-thiosulfatoethyl, β-phosphatoethyl, β-acyloxyethyl, β-halogenoethyl or vinyl; alk is alkylene having 1 to 6 carbon atoms or branced isomers thereof; T is hydrogen, chlorine, bromine, fluorine, hydroxyl, sulfato, alkanoyloxy having 2 to 4 carbon atoms, cyano, carboxyl, alkoxycarbonyl having 1 to 5 carbon atoms, carbamoyl, or —$SO_2$—Z in which Z is as defined above;

V is hydrogen or alkyl having 1 to 4 carbon atoms, which is unsubstituted or substituted by carboxyl, sulfo, carbamoyl, N-methylcarbamoyl, N-ethylcarbamoyl, N,N-dimethylcarbamoyl, N,N-diethylcarbamoyl, cyano, acetyl, propionyl, butyryl, methoxycarbonyl, ethoxycarbonyl, propyloxycarbonyl, sulfamoyl, N-methylsulfamoyl, N-ethylsulfamoyl, N,N-dimethylsulfamoyl, N,N-diethylsulfamoyl, methylsulfonyl, ethylsulfonyl, propylsulfonyl, alkoxy having 1 or 2 carbon atoms, halogen or hydroxyl; or is

(5e)

in which Z, alk and T are as defined above; R' is hydrogen or $C_1$-$C_6$alkyl; alk', independently of one another, is polymethylene having 2 to 6 carbon atoms or branched isomers thereof; and m is 1 to 6, p is 1 to 6 and q is 1 to 6.

21 Claims, No Drawings

FIBER-REACTIVE DYES CONTAINING CHROMOPHORIC SYSTEM BOUND TO A BRIDGING MEMBER CONSISTING OF TWO OR THREE TRIAZINYL RADICALS

The present application relates to novel improved reactive dyes which are in particular suitable for the dyeing of cellulose-containing fibre materials by the exhaust process or the continuous process and produce wet- and light-fast dyeings; and also to processes for the preparation of these dyes and to their use for the dyeing or printing of textile materials.

The invention relates to reactive dyes of the formula

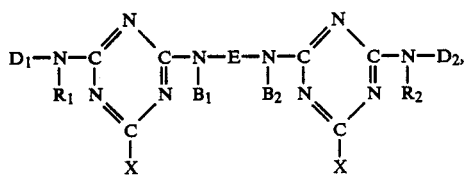
(1)

in which $D_1$ and $D_2$, independently of one another, are each a radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye; $R_1$, $R_2$, $B_1$ and $B_2$, independently of one another, are hydrogen or alkyl having 1 to 4 carbon atoms, which can be substituted by halogen, hydroxyl, cyano, $C_1$–$C_4$alkoxy, $C_1$–$C_4$alkoxycarbonyl, carbonyl, carboxyl, sulfamoyl, sulfo or sulfato; X is fluorine, chlorine, bromine, sulfo, $C_1$–$C_4$alkylsulfonyl, phenylsulfonyl or carboxypyridinium, and E is a radical of the formula

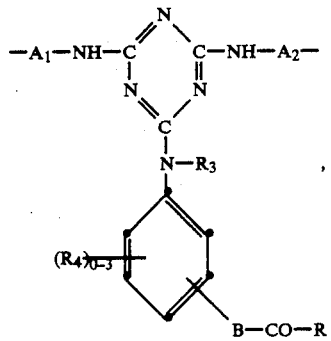
(2)

in which $A_1$ and $A_2$, independently of one another, are each a radical of the formula

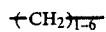
(3a)

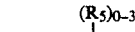
(3b)

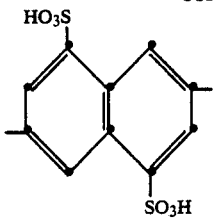
(3c)

or

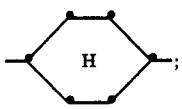
(3d)

or

X is a radical of the formula

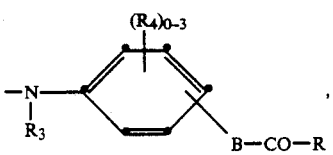
(4)

and E is a radical of the formula (3a), (3b), (3c) or (3d);

and $R_3$ is hydrogen or alkyl having 1 to 4 carbon atoms, which can be substituted by halogen, hydroxyl, cyano, $C_1$–$C_4$alkoxy, $C_1$–$C_4$alkoxycarbonyl, carboxyl, sulfamoyl, sulfo or sulfato; $R_4$ and $R_5$, independently of one another, are 0 to 3 substituents from the group consisting of $C_1$–$C_4$alkyl, $C_1$–$C_4$alkoxy, halogen, carboxyl and sulfo; B is a direct bond or a $-(CH_2)_n-$ or $-O-(CH_2)_n-$ radical, n is 1 to 6; R is a radical of the formula

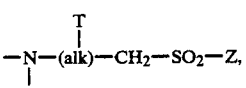
(5a)

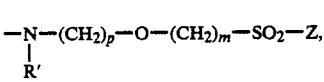
(5b)

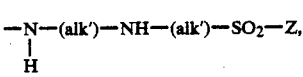
(5c)

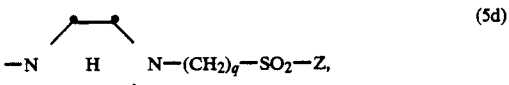
(5d)

Z is β-sulfatoethyl, β-thiosulfatoethyl, β-phosphatoethyl, β-acyloxyethyl, β-halogenoethyl or vinyl; alk is an alkylene radical having 1 to 6 carbon atoms or branched isomers thereof; T is hydrogen, chlorine, bromine, fluorine, hydroxyl, sulfato, acyloxy having 1 to 4 carbon atoms, cyano, carboxyl, alkoxycarbonyl having 1 to 5 carbon atoms, carbamoyl, or an —SO$_2$—Z radical in which Z is as defined above;

V is hydrogen or an alkyl radical having 1 to 4 carbon atoms, which can be substituted by carboxyl or sulfo groups or derivatives thereof, alkoxy groups having 1 or 2 carbon atoms, halogen or hydroxyl; or is a radical

in which Z, alk and T are as defined above; R' is hydrogen or $C_1$–$C_6$alkyl; alk', independently of one another, are polymethylene radicals having 2 to 6 carbon atoms or branched isomers thereof; and m is 1 to 6, p is 1 to 6 and q is 1 to 6.

The radical $D_1$ or $D_2$ in formula (1) can contain substituents which are customary for organic dyes and are bound to its basic structure.

Examples of further suitable substituents in the radical $D_1$ or $D_2$ are: alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, in particular alkanoylamino groups, such as acetylamino, propionylamino or benzoylamino, phenylamino, N,N-di-$\beta$-hydroxyethylamino, N,N-di-$\beta$-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-($\beta$-hydroxyethyl)sulfamoyl, N,N-di-($\beta$-hydroxyethyl)sulfamoyl, N-phenylsulfamoyl, ureido, hydroxyl, carboxyl, sulfomethyl or sulfo. Preferably, the radical $D_1$ or $D_2$ contains one or more sulfo groups. Reactive dyes of the formula (1) in which $D_1$ or $D_2$ is the radical of an azo dye contain as substituents in particular methyl, ethyl, methoxy, ethoxy, acetylamino, benzoylamino, amino, chlorine, bromine, ureido, hydroxyl, carboxyl, sulfomethyl or sulfo.

An alkyl radical $R_1$, $R_2$, $B_1$ or $B_2$ is straight-chain or branched; it can be further substituted, for example by halogen, hydroxyl, cyano, $C_1$–$C_4$alkoxy, $C_1$–$C_4$alkoxycarbonyl, carboxyl, sulfamoyl, sulfo or sulfato. Examples of $R_1$, $R_2$, $B_1$ and $B_2$ are as follows: methyl, ethyl, propyl, isopropyl, butyl, isobutyl, sec-butyl, tert-butyl, carboxymethyl, $\beta$-carboxyethyl, $\beta$-carboxypropyl, methoxycarbonylmethyl, ethoxycarbonylmethyl, $\beta$-methoxyethyl, $\beta$-ethoxyethyl, $\beta$-methoxypropyl, $\beta$-chloroethyl, $\gamma$-bromopropyl, $\beta$-hydroxyethyl, $\beta$-hydroxybutyl, $\beta$-cyanoethyl, sulfomethyl, $\beta$-sulfoethyl, aminosulfonylmethyl and $\beta$-sulfatoethyl. Preferably, $R_1$, $R_2$, $B_1$ and $B_2$, independently of one another, are hydrogen, methyl or ethyl.

A substituent X in its first definition is, for example, a halogen atom, such as fluorine, chlorine or bromine, a low-molecular-weight alkylsulfonyl group, such as methylsulfonyl or ethylsulfonyl, a phenylsulfonyl radical or a sulfo group. Preferably, X is in this case fluorine or chlorine.

The radicals which are suitable as $R_3$ are the same as those which have been mentioned above in the definitions of $R_1$, $R_2$, $B_1$ and $B_2$.

$R_4$ and $R_5$ are, for example, methyl, ethyl, propyl, isopropyl, butyl, isobutyl, sec-butyl, tert-butyl, methoxy, ethoxy, propyloxy, isopropyloxy, butyloxy, isobutyloxy, sec-butyloxy, tert-butyloxy, fluorine, chlorine, carboxyl or sulfo. The radical B contains 1 to 6, preferably 1 to 4, carbon atoms; examples of B are: methylene, ethylene, propylene, butylene, methyleneoxy, ethyleneoxy, propyleneoxy and butyleneoxy. Where B is a —O—$CH_2)_n$ radical, B is bound to the benzene ring via the oxygen atom. Preferably, B is a direct bond.

Z as $\beta$-halogenoethyl is in particular a $\beta$-chloroethyl radical and as $\beta$-acyloxyethyl in particular a $\beta$-acetoxyethyl radical. The alkylene radical alk is preferably methylene, ethylene, methylmethylene, propylene or butylene. Substituent T as acyloxy radical (alkanoyloxy) is in particular acetyloxy, propionyloxy or butyryloxy, and as alkoxycarbonyl radical in particular methoxycarbonyl, ethoxycarbonyl or propyloxycarbonyl. An alkyl radical V is methyl, ethyl, propyl, isopropyl, butyl, isobutyl, sec-butyl or tert-butyl. Derivatives of the carboxyl or sulfo group are, for example, carbamoyl, N-methylcarbamoyl, N-ethylcarbamoyl, N,N-dimethylcarbamoyl and N,N-diethylcarbamoyl, cyano, acetyl, propionyl, butyryl, methoxycarbonyl, ethoxycarbonyl, propyloxycarbonyl, sulfamoyl, N-methylsulfamoyl, N-ethylsulfamoyl, N,N-dimethylsulfamoyl and N,N-diethylsulfamoyl, methylsulfonyl, ethylsulfonyl and propylsulfonyl. The radical R' is, for example, methyl, ethyl, propyl, isopropyl, butyl, sec-butyl, pentyl or hexyl, or preferably hydrogen. The polymethylene radicals alk' are preferably ethylene, propylene or butylene. The indices m, p and q are independent of one another and preferably 2, 3 or 4.

The middle section in formula (1) linking the two dye radicals $D_1$ and $D_2$ is a reactive grouping in which X can be a fibre-reactive leaving group. In addition, the radical R has a reactive radical, namely the group —$SO_2$—Z; this reactive radical contains a leaving group, for example in the case where Z is $\beta$-chloroethyl, or can become active in a manner which is typical of fibre-reactive groups, for example in the case where Z is vinyl (for the basics of reactive dyes see Venkataraman, K.: The Chemistry of Synthetic Dyes. New York: Academic Press 1972; Vol VI, Reactive Dyes). Other suitable reactive dyes of the formula (1) are those in which the radical $D_1$ or $D_2$ includes even a further reactive radical. The additional reactive radicals included in $D_1$ or $D_2$ can be bound to $D_1$ or $D_2$ via amino groups or in a different manner, for example by a direct bond.

An additional reactive radical optionally included in $D_1$ or $D_2$ is in particular a low-molecular-weight alkanoyl or alkylsulfonyl radical which is substituted by a detachable atom or a detachable group, a low-molecular-weight alkenoyl or alkenesulfonyl radical which is unsubstituted or substituted by a detachable atom or a detachable group, a carbocyclic or heterocyclic radical, containing 4-, 5- or 6-membered rings, bound via a carbonyl or sulfonyl group and substituted by a detachable atom or a detachable group, or a triazine or pyrimidine radical bound directly via a carbon atom and substituted by a detachable atom or a detachable group, or contains such a radical. Examples of this type of reactive radical are a six-membered heterocyclic radical containing halogen atoms and bound via an amino group, such as a halogenotriazine or halogenopyrimidine radical or an aliphatic acyl radical, such as a halogenoacetyl or halogenopropionyl radical.

The additional reactive radical is in particular a vinylsulfonyl, β-sulfatoethylsulfonyl, β-thiosulfatoethylsulfonyl, β-chloroethylsulfonyl, β-acetoxyethylsulfonyl or β-chloroethylsulfonylbutyryl radical bound directly or via a bridging link.

Important structural variations resulting from the alternative definition of X in formula (1) are: reactive dyes of the formula

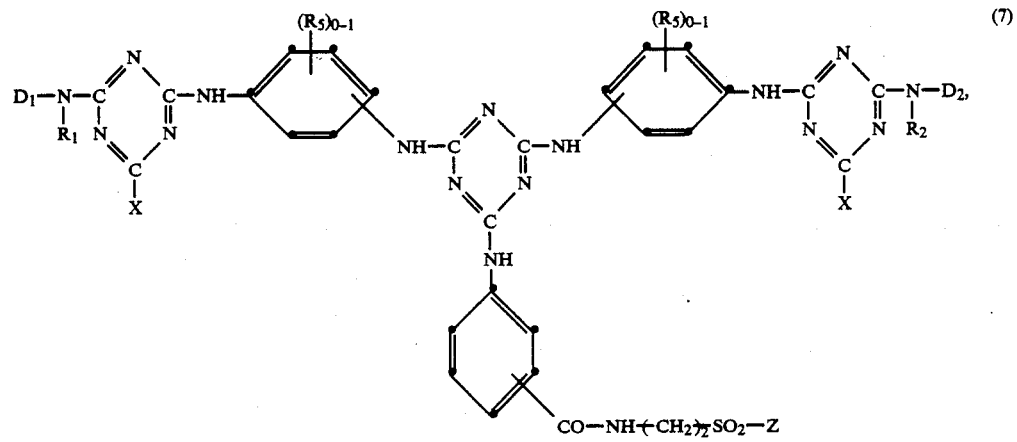

(7)

in which $D_1$, $D_2$, $R_1$, $R_2$, $B_1$, $B_2$, Z and X are as defined in formula (1); reactive dyes of the formula in which $D_1$, $D_2$, $R_1$, $R_2$, $B_1$, $B_2$, Z and X are as defined in formula (1); and $R_5$ is 0 or 1 substituents from the group consisting of methyl, methoxy, chlorine and sulfo; reactive dyes of the formula

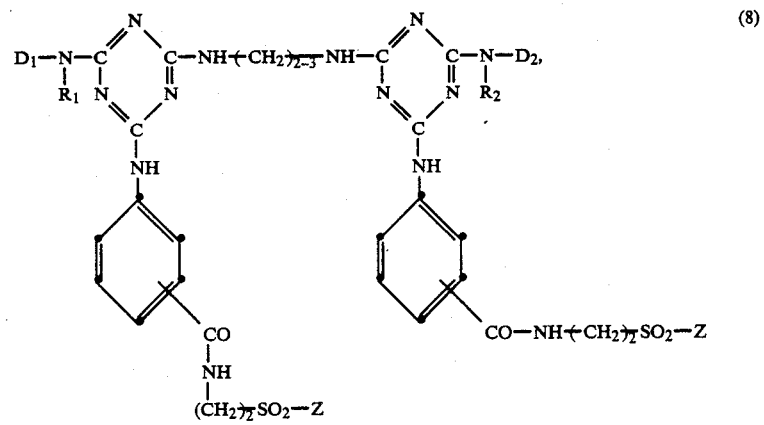

(8)

in which $D_1$, $D_2$, $R_1$, $R_2$ and Z are as defined in formula (1); reactive dyes of the formula

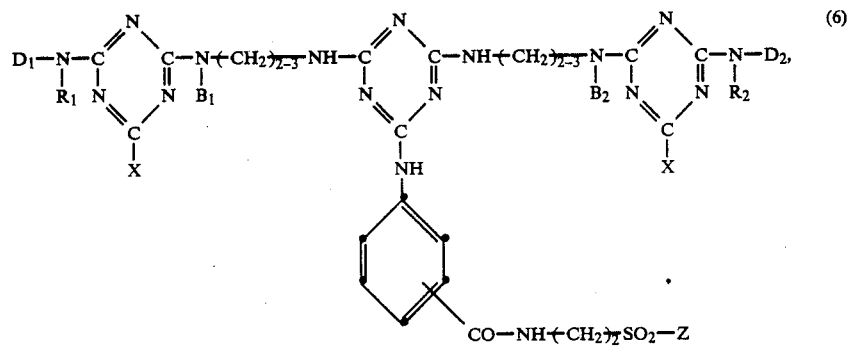

(6)

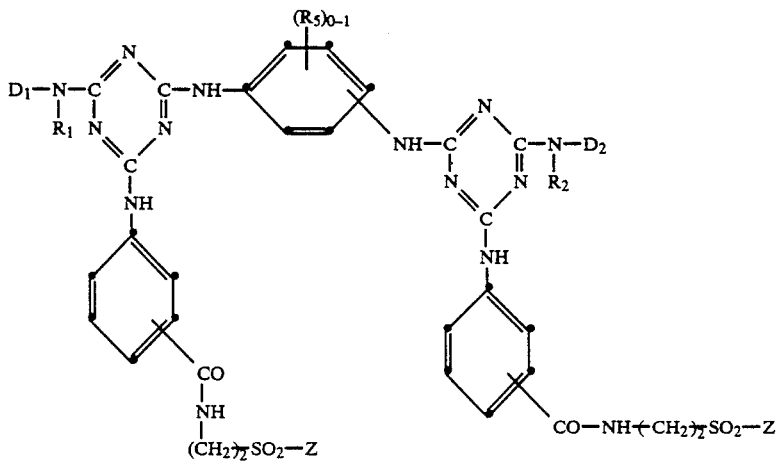

(9)

in which $D_1$, $D_2$, $R_1$, $R_2$ and Z are as defined in formula (1); and $R_5$ is 0 or 1 substituents from the group consisting of methyl, methoxy, chlorine or sulfo.

In formulae (6) to (9), Z is in particular β-chloroethyl, vinyl or preferably β-sulfatoethyl.

Preferred embodiments of the reactive dyes of the formula (1) are:

(a) Reactive dyes of the formula (1) in which the radicals $D_1$—$N(R_1)$— and —$N(R_2)$—$D_2$ are identical.

(b) Reactive dyes of the formula (1) in which X is fluorine or chlorine.

(c) Reactive dyes of the formula (1) in which $R_1$ and $R_2$ are hydrogen, methyl, ethyl or β-hydroxyethyl.

(d) Reactive dyes of the formula (1) in which $B_1$ and $B_2$ are hydrogen.

(e) Reactive dyes according to (d) in which $D_1$ and $D_2$ are each a radical of a monoazo or disazo dye.

(f) Reactive dyes according to (d) in which $D_1$ and $D_2$ are each a radical of a metal complex azo, anthraquinone or formazan dye.

(g) Reactive dyes according to (e) in which $D_1$ and $D_2$ are each a monoazo or disazo dye radical of the formula

(10a), or

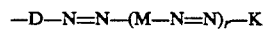

(10b), or of a metal complex derived therefrom; D is the radical of a disazo component of the benzene or naphthalene series, M is the radical of a middle component of the benzene or naphthalene series, and K is the radical of a coupling component of the benzene, naphthalene, pyrazolone, 6-hydroxy-2-pyridone or arylacetoacetamide series, where D, M and K can carry substituents which are customary for azo dyes, in particular hydroxyl, amino, methyl, ethyl, methoxy or ethoxy groups, substituted or unsubstituted alkanoylamino groups having 2 to 4 carbon atoms, substituted or unsubstituted benzoylamino groups or halogen atoms; r is 0 or 1; and D, M and K together contain at least two sulfo groups, preferably three or four sulfo groups.

(h) Reactive dyes according to (f) in which $D_1$ and $D_2$ are each a radical of a 1:1 copper complex azo dye of the benzene or naphthalene series and the copper atom is bound to one metallizable group each on both sides in the ortho position with respect to the azo bridge.

(i) Reactive dyes according to (f) in which $D_1$ and $D_2$ are each a radical of a formazan dye of the formula

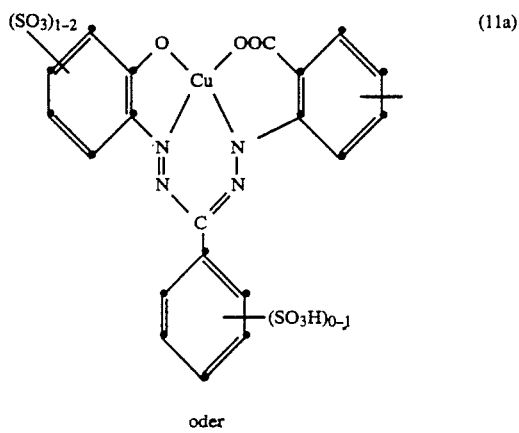

oder

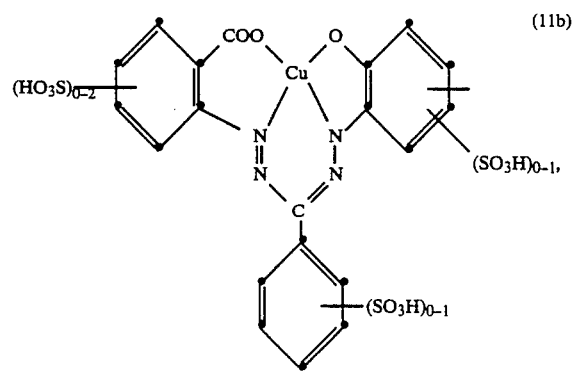

in which the benzene rings can be further substituted by alkyl having 1 to 4 carbon atoms, alkoxy having 1 to 4 carbon atoms, alkylsulfonyl having 1 to 4 carbon atoms, halogen or carboxyl.

Preference is given in particular to reactive dyes according to (g) in which $D_1$ and $D_2$ are each a radical of the following formulae (12) to (24):

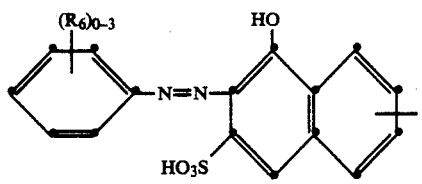 (12)

in which $R_6$ is 0 to 3 substituents from the group consisting of $C_1$-$C_4$alkyl, $C_1$-$C_4$alkoxy, halogen, carboxyl and sulfo.

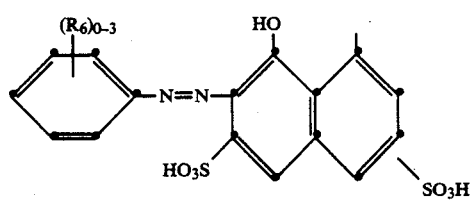 (13)

in which $R_6$ is 0 to 3 substituents from the group consisting of $C_1$-$C_4$alkyl, $C_1$-$C_4$alkoxy, halogen, carboxyl and sulfo.

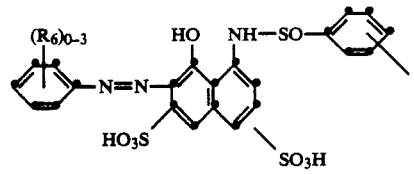 (14)

in which $R_6$ is 0 to 3 substituents from the group consisting of $C_1$-$C_4$alkyl, $C_1$-$C_4$alkoxy, halogen, carboxyl and sulfo.

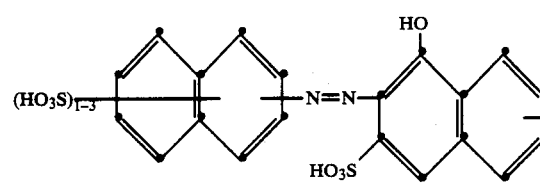 (15)

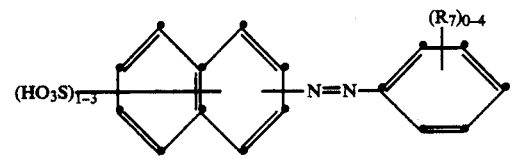 (16)

in which $R_7$ is 0 to 4 substituents from the group consisting of halogen, nitro, cyano, trifluoromethyl, sulfamoyl, carbamoyl, $C_1$-$C_4$alkyl, $C_1$-$C_4$alkoxy, amino, acetylamino, ureido, hydroxyl, carboxyl, sulfomethyl and sulfo, independently of one another.

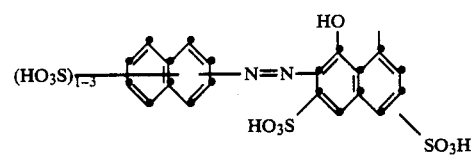 (17)

-continued

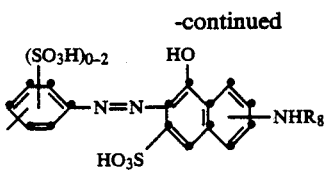 (18)

in which $R_8$ is $C_1$-$C_4$alkanoyl or benzoyl.

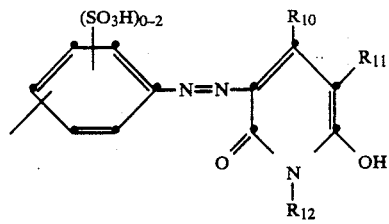 (19)

in which $R_8$ is $C_1$-$C_4$alkanoyl or benzoyl.

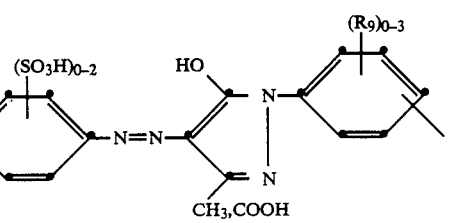 (20)

in which $R_9$ is 0 to 3 substituents from the group consisting of $C_1$-$C_4$alkyl, $C_1$-$C_4$alkoxy, halogen, carboxyl and sulfo.

(21)

in which $R_{12}$ and $R_{10}$, independently of one another, are hydrogen, $C_1$-$C_4$alkyl or phenyl, and $R_{11}$ is hydrogen, cyano, carbamoyl or sulfomethyl.

(22)

in which $R_9$ is 0 to 3 substituents from the group consisting of $C_1$-$C_4$alkyl, $C_1$-$C_4$alkoxy, halogen, carboxyl and sulfo.

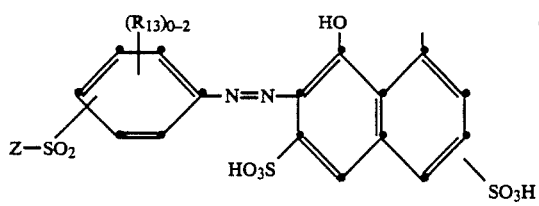

(23)

in which $R_{13}$ is 0 to 2 substituents from the group consisting of $C_1$–$C_4$alkyl, $C_1$–$C_4$alkoxy, halogen, carboxyl and sulfo; and Z is β-sulfatoethyl, β-thiosulfatoethyl, β-phosphatoethyl, β-acyloxyethyl, β-halogenoethyl or vinyl.

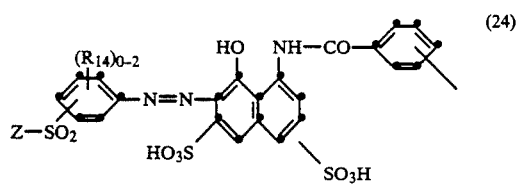

(24)

in which $R_{14}$ is 0 to 2 substituents from the group consisting of $C_1$–$C_4$alkyl, $C_1$–$C_4$alkoxy, halogen, carboxyl and sulfo; and Z is β-sulfatoethyl, β-thiosulfatoethyl, β-phosphatoethyl, β-acyloxyethyl, β-halogenoethyl or vinyl.

Preference is also given to reactive dyes according to (d) in which R is a radical of the formula —NHCH₂CH₂SO₂—Z (25a)

 (25b)

—NHCH₂CH₂OCH₂CH₂SO₂—Z (25c)

—NHCH₂CH₂NHCH₂CH₂SO₂—Z (25d)

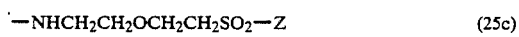 (25e)

oder

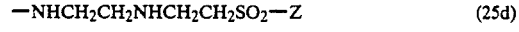 (25f)

and Z is β-chloroethyl, vinyl or β-sulfatoethyl. In formulae (25a) to (25c), Z is in particular β-chloroethyl and in formulae (25a) to (25f), Z is in particular vinyl.

Preference is also given to heavy metal complexes of reactive dyes of the formula (1); suitable complexing heavy metals are in particular copper, nickel, cobalt or chromium.

Preference is given in particular to reactive dyes of the formula (1) in which Z is a β-sulfatoethyl, β-chloroethyl or vinyl group; or in which X is fluorine or chlorine. Combinations of features according to the above description are, if applicable, in particular also suitable.

Particular preference is given to reactive dyes according to (g) in which $D_1$ and $D_2$ are each a monoazo dye radical of the formula D—N=N—K— (10c)

or

—D—N=N—K (10d)

or of a copper complex derived therefrom, D is a benzene or naphthalene radical, which can be substituted by hydroxyl, chlorine, nitro, methyl, methoxy, ethoxy, carboxyl, β-chloroethylsulfonyl, vinylsulfonyl, β-sulfatoethylsulfonyl and β-chloroethylsulfonylbutyryl, K is a benzene, naphthalene, 3-methyl-1-phenylpyrazolone or 3-carboxy-1-phenylpyrazolone radical, which can be substituted by amino, N-methylamino, methyl, methoxy, ethoxy, acetylamino, ureido, benzoylamino, hydroxyl and carboxyl, and D and K together contain at least two sulfo groups, preferably three or four sulfo groups.

Preference is also given to reactive dyes according to (f) in which $D_1$ and $D_2$ are each the radical of an anthraquinone dye of the formula

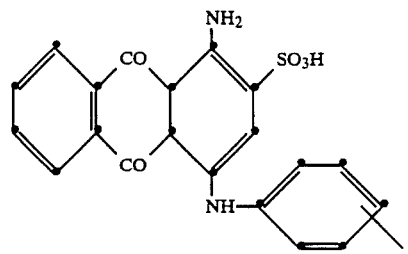

in which the anthraquinone ring can be substituted by another sulfo group and the phenyl radical by alkyl having 1 to 4 carbon atoms, alkoxy having 1 to 4 carbon atoms, halogen, carboxyl or sulfo and the dye preferably contains at least 2 sulfo groups.

The reactive dyes of the formula (1) can be prepared by reacting dyes of the formulae

 (26)

and

 (27)

or dye precursors, two equivalents of an s-triazine of the formula

 (28)

and one equivalent of a diamino compound of the formula

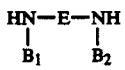

and, if desired, two equivalents of an amine of the formula

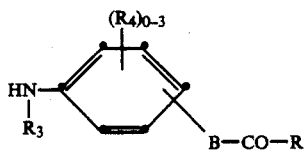

in any desired order with one another, $D_1$, $D_2$, $R_1$, $R_2$, X, $B_1$, $B_2$, E, $R_3$, $R_4$, B and R being as defined in formula (1), or, where dye precursors are used, converting the intermediates obtained into the desired final dyes and, if desired, subsequently carrying out another conversion reaction.

The preparation of the final dyes from precursors is in particular carried out by coupling reactions, resulting in azo dyes.

Since the individual process steps described above can be carried out in varying order, if desired some of them even simultaneously, several process variations are possible. In general the reaction is carried out stepwise in succession, in which case the order of the simple reactions between the individual reaction components advantageously depends on the particular conditions.

An important process comprises condensing a dye of the formula

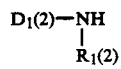

first with an s-triazine of the formula

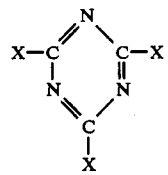

and then condensing the resulting compound of the formula

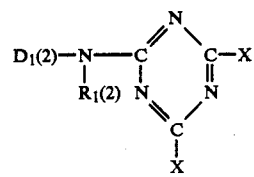

with a diamine compound of the formula (29), in which E is a radical of the formula (2), in a molar ratio of 2:1.

Another process comprises condensing an s-triazine of the formula (28) with an amine of the formula (30) and a dye of the formula (31) and then condensing the resulting triazine compound with a diamino compound of the formula (29), in which E is a radical of the formula (3a), (3b), (3c) or (3d), in a molar ratio of 2:1.

According to a modified process, reactive dyes of the formula (1) can also be prepared by condensing an s-triazine of the formula (28) with a component of this dye and, if desired, an amine of the formula (30), then reacting the product with a second component required for the preparation of the dye, and condensing the triazine compound thus obtained with a diamine compound of the formula (29), in which E is a radical of the formula (2) or a radical of the formula (3a), (3b), (3c) or (3d), in a molar ratio of 2:1.

In these reactions, it depends on the structure of the starting substances as to which of the possible process variations gives the best results, or under which specific conditions, for example at which condensation temperature, the reaction is most advantageously carried out.

Since under certain conditions hydrolysis of a halogenotriazine radical occurs, an intermediate which contains acetylamino groups has to be hydrolyzed to remove the acetyl groups before it is condensed with a halogenotriazine. Which reaction, for example in the preparation of a secondary condensation product from a compound of the formula (30), the triazine of the formula (28) and the dye of the formula (31) or a precursor, is preferably carried out first, that of the triazine with the compound of the formula (30) or with the dye or a precursor of the dye, differs from case to case and depends in particular on the solubility of the amino compounds involved and the basicity of the amino groups to be acylated.

A modified embodiment of the process consists in first preparing a dye which contains a precursor of the reactive radical and converting this dye subsequently into the final product, for example by esterification or an addition reaction. For example, a dye in which Z is a $HO-CH_2CH_2-$ radical can be prepared and the intermediate can be reacted with sulfuric acid before or after acylation, thus converting the hydroxyl group into the sulfato group; or an analogous dye is used in which Z is the group $H_2C=CH-$ and an adduct of the intermediate with thiosulfuric acid is formed, leading to a radical $HO_3SS-CH_2CH_2-$. Sulfation of the hydroxyl group in a dye of the formula (1) or a suitable precursor is carried out, for example, by reaction with concentrated sulfuric acid at 0° C. to moderately elevated temperature. Sulfation can also be carried out by reaction of the hydroxyl compound with two equivalents of chlorosulfonic acid per hydroxyl group in a polar organic solvent, for example N-methylpyrrolidone, at 10° to 80° C. Preferably, sulfation is carried out by pouring the particular compound into sulfuric acid monohydrate at temperatures between 5° and 15° C. Introduction of a different radical for Z into a compound of the formula (1) or an intermediate instead of a halogen atom or the sulfato group, for example a thiosulfato or phosphato group, is carried out in a manner known per se. The synthetic route via an intermediate of the reactive radical leads in many cases to complete conversion and a uniform product.

It is also possible to carry out elimination reactions after the synthesis. For example, reactive dyes of the formula (1) which contain sulfatoethylsulfonyl radicals can be treated with agents, such as sodium hydroxide, which eliminate hydrogen halide, leading to the conversion of the sulfatoethylsulfonyl radicals into vinylsulfonyl radicals.

In some cases, a process variation can be employed in which the starting materials are dye precursors. This variation is suitable for the preparation of reactive dyes of the formula (1) in which $D_1$ or $D_2$ is the radical of a dye composed of two or more than two components, for example of a monoazo, disazo, trisazo or metal complex azo dye.

In principle the reactive dyes of the formula (1) of all dye classes can be prepared in a manner known per se and analogously to known procedures by starting with precursors or intermediates for the dyes which contain fibre-reactive radicals according to formula (1) or introducing these fibre-reactive radicals into suitable intermediates which have dye character.

Preference is given to reactive dyes of the formula (1) in which $D_1$ and $D_2$ are each the radical of a monoazo or disazo dye or a metal complex azo dye. In this case, the middle section of formula (1) is bound to a diazo component or coupling component of $D_1$ or $D_2$, such as is shown above in formulae (10a) and (10b).

Starting from dye precursors, reactive dyes of the formula (1) are obtained by condensing, for example, a component of the dye of the formula (26) which contains an $-N(R_1)H$ group first with a triazine of the formula (28) and then with a compound of the formula (30) or vice versa and then reacting the product with the other component of the dye of the formula (26). Analogously, the same applies to the dye of the formula (27) and the triazine of the formula (28). In the preparation of the preferred azo dyes, the diazo components and coupling components together must contain at least one amino group $-N(R_1)H$ or $-N(R_2)H$ and can contain further amino groups. In this case, the diazo components used are in particular 1,3-phenylenediamine-4-sulfonic acid, 1,4-phenylenediamine-2-sulfonic acid, 1,4-phenylenediamine-2,5-disulfonic acid or 1,3-phenylenediamine-4,6-disulfonic acid. If desired, the corresponding acetylamino or nitro compounds are used in which the acetylamino or nitro group before the condensation with the triazine of the formula (28) is converted to the $H_2N$ group by hydrolysis or reduction.

In the case where groups such as hydroxyl, carboxyl, amino or sulfo which are capable of metal complex formation are present in the reactive dyes prepared, the reactive dyes can also be metallized afterwards. For example, metal complex azo dyes are obtained by treating azo compounds obtained according to the invention and containing complexing groups, for example hydroxyl or carboxyl groups, in the ortho-ortho' position with respect to the azo bridge before or, if desired, even after the condensation with the triazine of the formula (28) with agents which donate heavy metals. Copper complexes of reactive dyes of the formula (1) are of particular interest. A suitable method of metallization, apart from the one mentioned above, is also dealkylating metallization and, when copper complexes are prepared, the oxidative coppering.

Preferred embodiments of the process according to the invention comprise using (a) a diamino compound of the formula

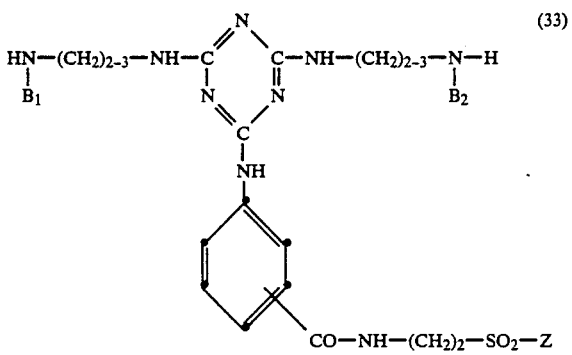

in which $B_1$, $B_2$, X and Z are as defined in formula (1), (b) a diamino compound of the formula

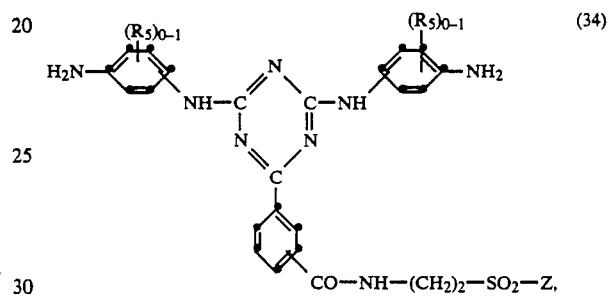

in which Z is as defined in formula (1); and $R_5$ is 0 to 1 substituents from the group consisting of methyl, methoxy, chlorine and sulfo, (c) as amine of the formula (30) an amine of the formula

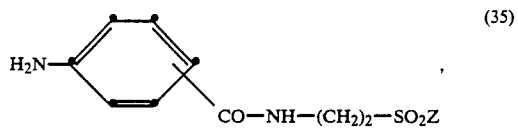

in which Z is as defined in formula (1) and using a diamino compound of the formula (29) in which E is a radical of the formula $-CH_2)_{2-3}$ (36), (d) as amine of the formula (30) an amine of the formula

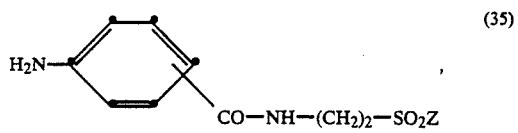

in which Z is as defined in formula (1) and using a diamino compound of the formula (29) in which E is a radical of the formula

and $R_5$ is 0 to 1 substituents from the group consisting of methyl, methoxy, chlorine or sulfo, (e) identical radicals D₁—N(R₁)— and —N(R₂)—D₂, (f) compounds of the formula (28) in which X is fluorine or chlorine, (g) compounds of the formulae (26) and (27) in which R₁ and R₂ are hydrogen, methyl, ethyl or β-hydroxyethyl, (h) compounds of the formula (29) in which B₁ and B₂ are hydrogen, (i) compounds of the formulae (26) and (27) in which D₁ and D₂ are each a radical of a monoazo or disazo dye; or in which D₁ and D₂ are each a radical of a metal complex azo, anthraquinone or formazan dye.

Particularly preferred embodiments of the process according to the invention comprise using (j) compounds of the formulae (26) and (27) according to (i) in which D₁ and D₂ are each a monoazo or disazo dye of the formula (10a) or (10b); or in which D₁ and D₂ are each a radical of a 1:1 copper complex azo dye of the benzene or naphthalene series and the copper atom is bound to one metallizable group on both sides in the ortho-position with respect to the azo bridge; or in which D₁ and D₂ are each a radical of a formazan dye of the formulae (11a) or (11b).

Very particularly preferred embodiments of the process according to the invention comprise using (k) compounds of the formulae (26) and (27) in which D₁ and D₂ are each a radical of the formulae (12) to (24); or in which D₁ and D₂ are each the radical of an anthraquinone dye of the formula

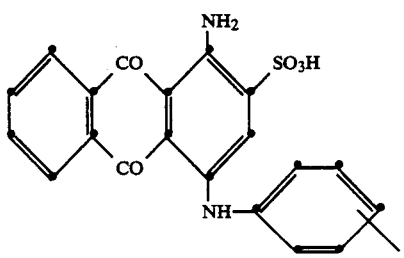

in which the anthraquinone ring can be substituted by a further sulfo group and the phenyl radical by alkyl having 1 to 4 carbon atoms, alkoxy having 1 to 4 carbon atoms, halogen, carboxyl or sulfo and the dye preferably contains at least 2 sulfo groups;

(l) compounds of the formula (30) in which R is a radical of the formula (25a) to (25f); or (m) compounds of the formula (26) and (27) in which D₁ and D₂ are each a monoazo dye radical of the formula (10c) or (10d) or a copper complex derived therefrom.

The most important process variations are described in the exemplary embodiments.

Below, possible starting substances which can be used for the preparation of the reactive dyes of the formula (1) are mentioned in detail.

Dyes of the formulae (26) and (27)

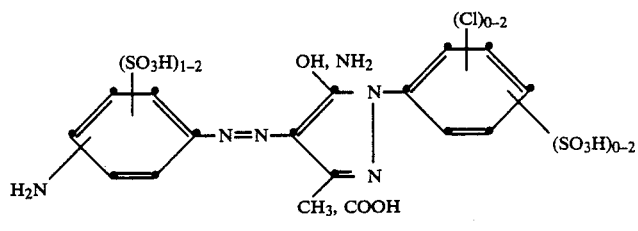

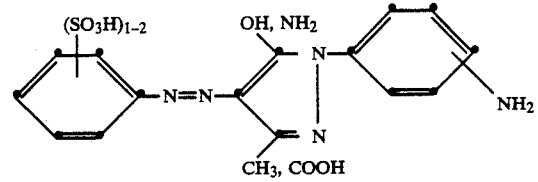

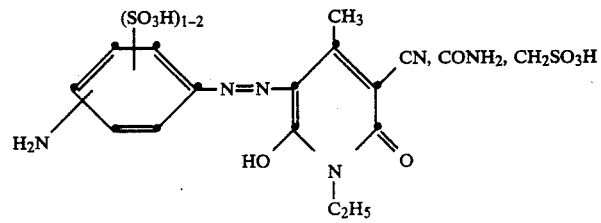

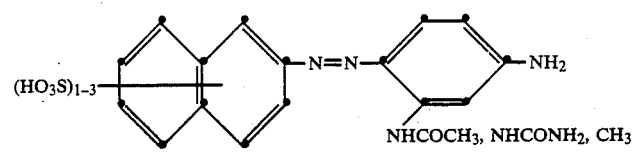

-continued
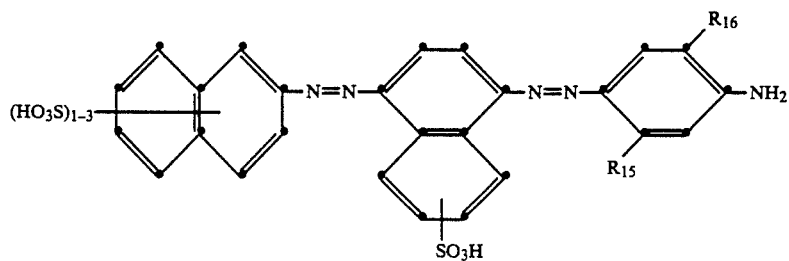
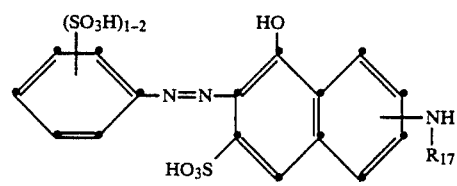
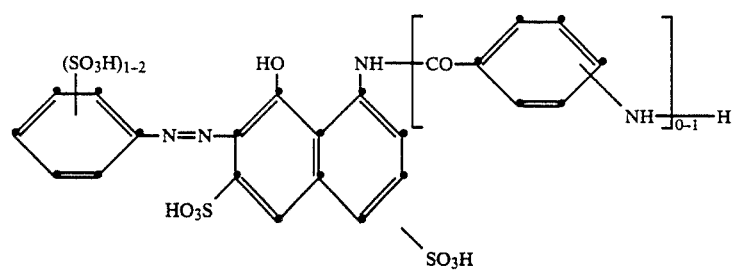
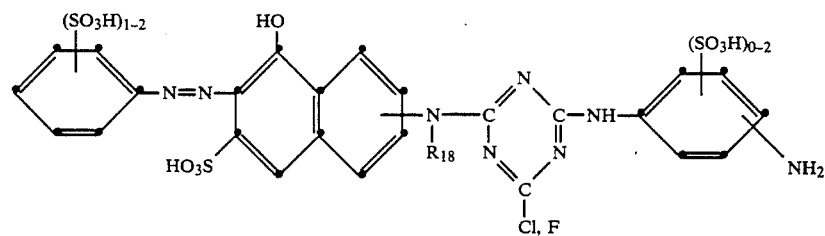
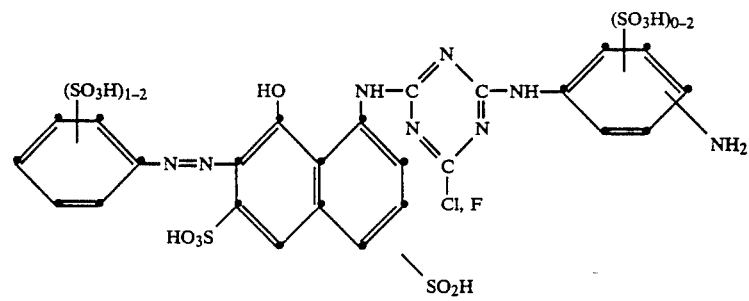
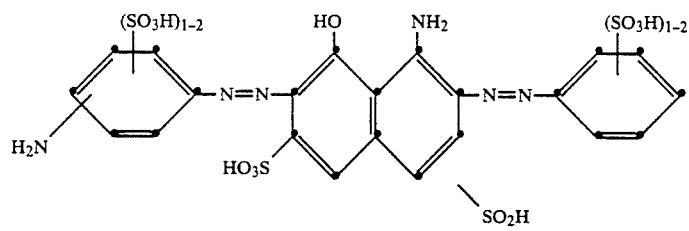

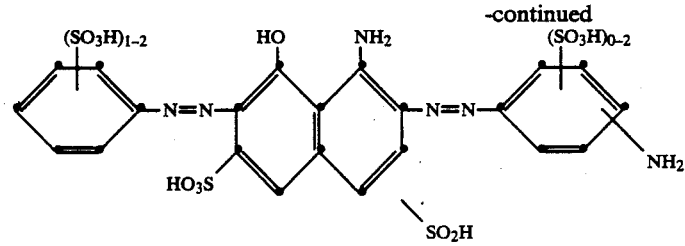
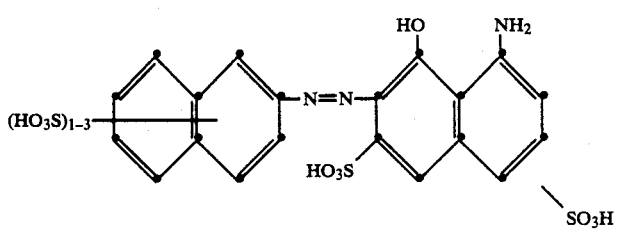
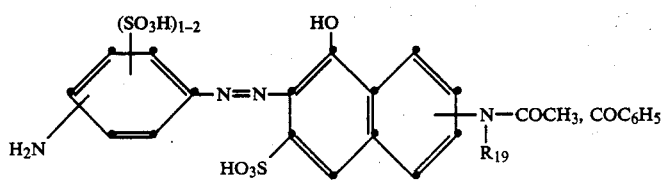
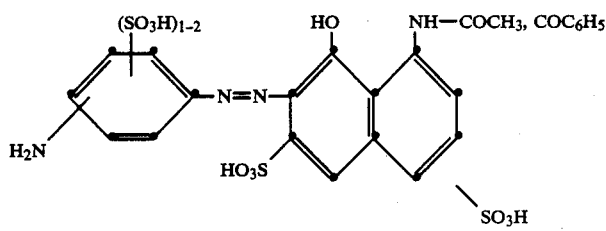
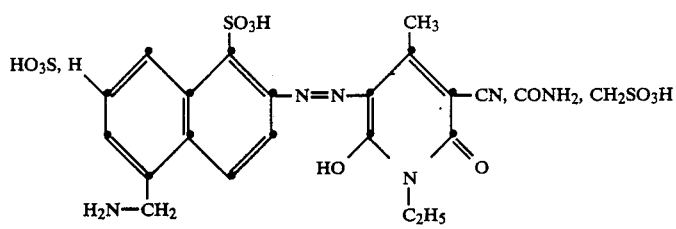
Metal complexes of dyes of the formulae:
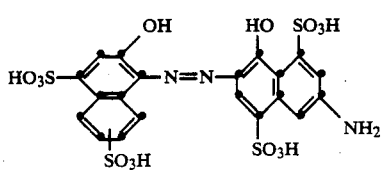
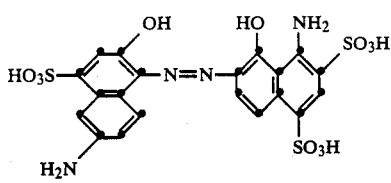
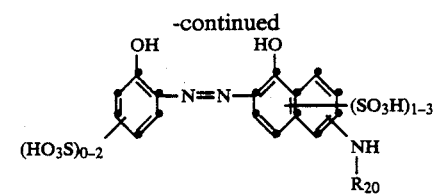
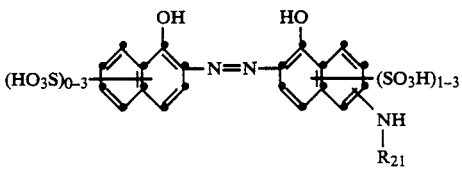
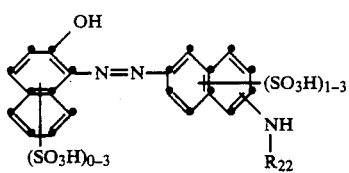

-continued

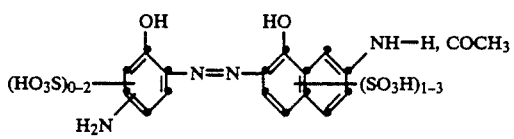

The preferred metal atoms are Cu (1:1 complex) or Cr and Co (1:2 complex). Cr and Co complexes can contain the azo compound of the abovementioned formula once or twice, that is, they can have a symmetrical or, using any other ligands, unsymmetrical structure.

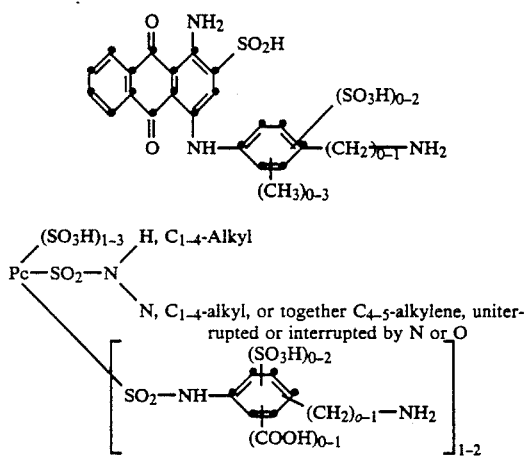

In this formula, Pc is a Cu or Ni phthalocyanine radical and the total number of substituents on the Pc skeleton is 4.

are independent of one another. Preferably, the radicals $R_{17}$ to $R_{22}$ are hydrogen, methyl or ethyl and the radicals $R_{15}$ and $R_{16}$ are hydrogen, methyl, ethyl, methoxy, ethoxy, acetylamino, ureido or chlorine. The aromatic rings in the above dyes can be further substituted, the benzene rings can be substituted in particular by methyl, ethyl, methoxy, ethoxy, methylsulfonyl, ethylsulfonyl, carboxyl, acetylamino or chlorine and the naphthalene rings especially by methoxy, carboxyl, acetylamino, nitro or chlorine; the same applies to anthraquinones, dioxazines and the like. Preferably, the benzene rings are not further substituted.

Individual diazo and coupling components are as follows:

Diazo components:

Aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4-aminobiphenyl, 1-aminobenzene-2-, -3- or -4-carboxylic acid, 2-aminodiphenyl ether, 1-aminobenzene-2-, -3- or -4-sulfonamide and their N-methyl, N-ethyl, N,N-dimethyl or N,N-diethyl derivatives, dehydrothio-p-toluidinesulfonic acid, 1-amino-3-trifluoromethyl-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-

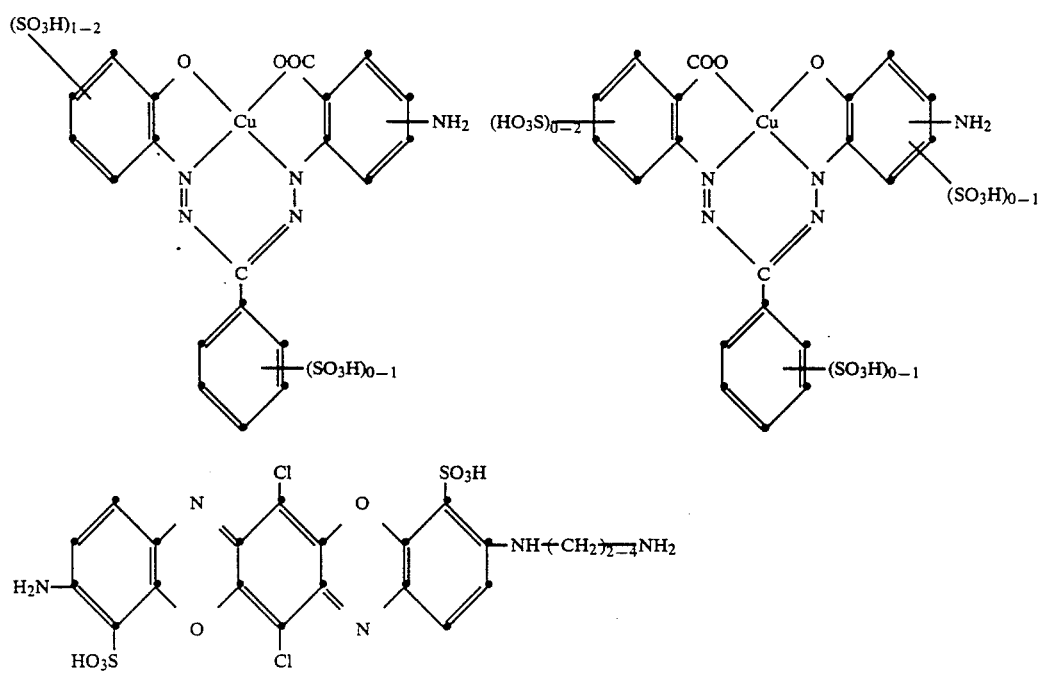

In the formulae mentioned above, the radicals $R_{17}$ to $R_{22}$ are hydrogen or $C_1$-$C_4$alkyl and the radicals $R_{15}$ and $R_{16}$ are hydrogen, $C_1$-$C_4$alkyl, $C_1$-$C_4$alkoxy, $C_1$-$C_4$alkanoylamino, ureido or halogen, where the radicals $R_{15}$ and $R_{16}$ which belong to one and the same formula amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-6-nitrobenzene-4-sulfonic acid, 1-hydroxy-2-amino-4-methylsulfonylbenzene, 1-amino-2-hydroxy-6-nitronaphthalene-4-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid, 1,4-diaminobenzene-2,5-disulfonic acid, 1,4-diaminobenzene-2,6-disulfonic acid, 1,3-diaminobenzene-4,6-disulfonic acid, 2-amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid.

If it is desired to use as diazo component instead of a diamine an aminoacetylamino compound from which the acetyl group is later eliminated by hydrolysis, such as has been described above in the description of the process variations, the monoacetyl compounds of the abovementioned diazo components can be used, for example 1-acetylamino-3-aminobenzene-4-sulfonic acid or 1-acetylamino-4-aminobenzene-3-sulfonic acid.

Coupling components

Phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-1-aminonaphthalene-5,7-disulfonic acid, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or 2-ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or -4,6-disulfonic acid, 2-(4'-amino-3'-sulfophenylamino)-5-hydroxynaphthalene-7-sulfonic acid, 3-methyl-5-pyrazolone, 1-phenyl-3-methyl-5-pyrazolone, 1-(4'-sulfophenyl)-3-methyl-5-pyrazolone, 1-(4'-sulfophenyl)-5-pyrazolone-3-carboxylic acid, 1-(3'-aminophenyl)-3-methyl-5-pyrazolone, 1-(2',5'-disulfophenyl)-3-methyl-5-pyrazolone, 1-(2'-methyl-4'-sulfophenyl)-5-pyrazolone-3-carboxylic acid, 1-(4',8'-disulfonaphthyl-[2'])-3-methyl-5-pyrazolone, 1-(5',7'-disulfonaphthyl-[2'])-3-methyl-5-pyrazolone, 1-(2',5'-dichloro-4'-sulfophenyl)-3-methyl-5-pyrazolone, 3-aminocarbonyl-4-methyl-6-hydroxy-2-pyridone, 1-ethyl-3-cyano- or -3-chloro-4-methyl-6-hydroxy-2-pyridone, 1-ethyl-3-sulfomethyl-4-methyl-6-hydroxy-2-pyridone, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis-(2'-hydroxyethylamino)-3-cyano-4-methylpyridine, 1-ethyl-3-carbamoyl-4-methyl-6-hydroxy-2-pyridone, 1-ethyl-3-sulfomethyl-4-methyl-5-carbamoyl-6-hydroxy-2-pyridone, N-acetoacetylaminobenzene, 1-(N-acetoacetylamino)-2-methoxybenzene-5-sulfonic acid, 4-hydroxy-2-quinolone, 1-amino-8-hydroxy-2-(phenylazo)-naphthalene-3,6-disulfonic acid, 1-amino-8-hydroxy-2-(4'-sulfophenylazo)-naphthalene-3,6-disulfonic acid, 1-amino-8-hydroxy-2-(2',5'-disulfophenylazo)-naphthalene-3,6-disulfonic acid, 1-β-aminoethyl-3-cyano-4-methyl-6-hydroxy-2-pyridone, 1-?-aminopropyl-3-sulfomethyl-4-methyl-6-hydroxy-2-pyridone, 1,3-diaminobenzene, 1-amino-3-N,N-di-β-hydroxyethylaminobenzene, 1-amino-3-N,N-di-β-sulfatoethylaminobenzene, 1-amino-3-N,N-di-β-hydroxyethylamino-4-methoxybenzene, 1-amino-3-N,N-di-β-sulfatoethylamino-4-methoxybenzene, 1-amino-3-sulfobenzylaminobenzene, 1-amino-3-sulfobenzylamino-4-chlorobenzene, 1-amino-3-N,N-disulfobenzylaminobenzene.

Triazines of the formula (28)

2,4,6-Trifluoro-s-triazine (cyanuric fluoride), 2,4,6-trichloro-s-triazine (cyanuric chloride), 2,4,6-tribromo-s-triazine (cyanuric bromide), 2,4,6-trisulfo-s-triazine, 2,4,6-trismethylsulfonyl-s-triazine, 2,4,6-trisphenylsulfonyl-s-triazine.

Diamines of the formula (29)

Diamines of this type are known or can be prepared by condensation of an s-triazine of the formula (28) with 2 mol of the particular diamines and 1 mol of an amine of the formula (30).

Amines of the formula (30)

They can be prepared by condensing suitable nitrobenzenecarbonyl chlorides, nitrophenylalkanecarbonyl chlorides or nitrophenoxyalkanecarbonyl chlorides with amines of the formula $$H-R \tag{38}$$

which conform to the radicals of the formulae (5a) to (5d) and reducing the nitro groups to amino groups.

The reaction is preferably carried out in a high-boiling organic solvent, for example nitrobenzene. The reduction of the nitro group to the amino group is carried out in a manner known per se by catalytic hydrogenation with Pd/carbon in ethanol, ethyl acetate or tetrahydrofuran at room temperature up to about 40° C. The reduction can also be carried out in aqueous solution with Fe/hydrochloric acid or Fe/acetic acid.

According to a different method described in German Offenlegungsschrift No. 2,040,620, the acid chloride can be reacted with an unsaturated aliphatic amine, and 2-mercaptoethanol can be added to the double bond of the amide at temperatures between 50° C. and 180° C. by means of catalytic amounts of an agent which forms free radicals or of sulfur. The hydroxyethylthioether compounds thus obtained can also be prepared by condensing the acid chloride with a halogenoalkylamine and heating the condensation product with 2-mercaptoethanol and sodium alcoholate in alcohol. The thioether compounds are then additionally oxidized to the corresponding sulfones.

The oxidation of the thioether compounds to the sulfones can be carried out by various methods, for example using hydrogen peroxide with or without the addition of tungsten or vanadium compounds as catalysts, furthermore using peracetic acid, potassium permanganate or chromic acid, or using chlorine/hydrochloric acid, each of these in aqueous, aqueous/organic or organic medium.

The carboxamides thus obtainable, in which the grouping —SO$_2$—Z is a β-hydroxyethylsulfonyl group, can be converted to the corresponding dye precursors by treatment with sulfating agents, phosphorylating agents, halogenating agents, alkyl- or arylsulfonyl halides, alkyl- or arylcarbonyl halides or alkyl- or arylcarboxylic anhydrides, in which the grouping —SO$_2$—Z is, for example, the grouping —SO$_2$—CH$_2$—CH$_2$—O—SO$_3$H, —SO$_2$—CH$_2$—CH$_2$—O—PO$_3$H$_2$, —SO$_2$—CH$_2$—CH$_2$—halogen, —SO$_2$—CH$_2$—CH$_2$—O—CO—CH$_3$ or —SO$_2$—CH$_2$—CH$_2$—O—CO—C$_6$H$_5$. The products thus obtained can in turn be converted by treatment with alkylene reagents, for example alkali metal hydroxide or alkali metal carbonate, such as sodium hydroxide or sodium carbonate, to the corresponding compounds, in which the grouping —SO$_2$—Z is the grouping —SO$_2$—CH═CH$_2$. The products thus obtained can again be converted by reaction (addition) with salts of thiosulfuric acid, such as sodium thiosulfate, to compounds, in which the grouping —SO$_2$—Z is the grouping —SO$_2$—CH$_2$—CH$_2$—S—SO$_3$H.

Suitable sulfating agents are, for example, concentrated sulfuric acid and chlorosulfonic acid and amidosulfonic acid or other compounds which release sulfur trioxide. Suitable phosphorylating agents are, for example, concentrated phosphoric acid, pyrophosphoric acid, metaphosphoric or polyphosphoric acid, alkyl polyphosphates, phosphorus oxychloride or mixtures of phosphoric acid and phosphorus pentoxide. Suitable halogenating agents are, for example, thionyl chloride or thionyl bromide.

Preference is given to compounds of the formula

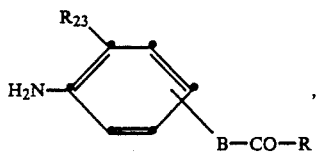
(39)

in which R is one of the radicals of the formulae (5a) to (5d), R$_{23}$ is hydrogen, methyl, ethyl, methoxy, ethoxy or chlorine and B is as defined in formula (1). Preferably, B is a direct bond or methylene, methyleneoxy or ethyleneoxy.

The preferred process for the preparation of compounds of the formula (39) comprises condensing a compound of the formula

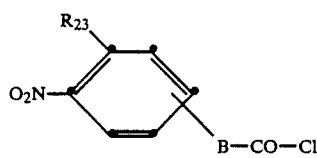
(40)

with an amine of the formula

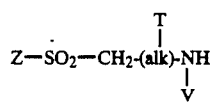
(41a)

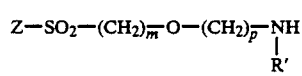
(41b)

$$Z-SO_2-(alk')-NH-(alk')-NH_2 \tag{41c}$$

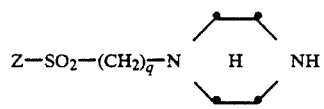
(41d)

and reducing the nitro groups to amino groups.

According to a modification of the process described above, compounds of the formula (39) can also be prepared in such a manner that a compound of the formula (40) is condensed with an amine of the formula

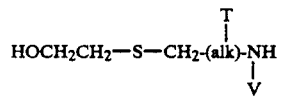
(42a)

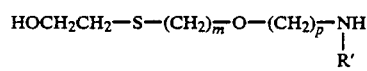
(42b)

$$HOCH_2CH_2-S-(alk')-NH-(alk')-NH_2 \tag{42c}$$

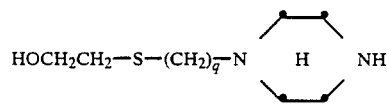
(42d)

the condensation product is oxidized to the corresponding β-chloroethylsulfonyl compound using elemental chlorine, and the nitro groups are reduced to amino groups.

In addition still another process variation can be used, according to which a compound of the formula (40) is first condensed with one of the amines of the formulae (42a) to (42d), the product obtained is oxidized with a peroxide to the sulfone, the nitro group is then reduced to the amino group, the amino compound obtained is condensed with an s-triazine of the formula (28) or a compound of the formula (29), and finally the hydroxyl group in the radical of one of the amines of the formulae (42a) to (42d) is sulfated.

The condensation of the compound of the formula (40) with the amines of the formulae (42a) to (42d) is carried out, for example, in chloroform at room temperature and in the presence of alkaline, acid-binding agents, for example alkali metal hydroxides, alkali metal carbonates or bicarbonates. The condensation product is then oxidized in a manner known per se using a chlorine/hydrochloric acid mixture. The reduction of the nitro group to the amino group is carried out as described above.

The amines of the formulae (41a) to (41d) which are used as starting compounds can be prepared analogously to the process of Example 1 of German Offenlegungsschrift No. 2,614,550.

AMINES OF THE FORMULA (38)

$\beta$-($\beta'$-Chloroethylsulfonyl)-ethylamine,
$\beta$-[$\beta'$-($\beta''$-Chloroethylsulfonyl)-ethoxy]-ethylamine,
$\gamma$-($\beta'$-Chloroethylsulfonyl)-propylamine,
Bis-[$\beta$-($\beta'$-chloroethylsulfonyl)-ethyl]-amine,
Bis-[$\gamma$-($\beta'$-chloroethylsulfonyl)-propyl]-amine,
$\beta$-(Vinylsulfonyl)-ethylamine,
Bis-[$\beta$-(vinylsulfonyl)-ethyl]-amine,
$\delta$-($\beta'$-Chloroethylsulfonyl)-butylamine,
$\beta$-($\beta'$-Sulfatoethylsulfonyl)-ethylamine,
Bis-[$\beta$-($\beta'$-sulfatoethylsulfonyl)-ethyl]-amine,
N-($\gamma$-Vinylsulfonylpropyl)piperazine,
$\beta$-($\beta'$-Vinylsulfonylethylamino)-ethylamine,
N-($\beta$-Vinylsulfonylethyl)piperazine,
$\beta$-($\beta'$-Vinylsulfonylethoxy)-ethylamine,
$\beta$-[$\beta'$-($\beta''$-Chloroethylsulfonyl)-ethylamino]-ethylamine,
$\beta$-[$\beta'$-($\beta''$-Sulfatoethylsulfonyl)-$\alpha'$-methylethylamino]-ethylamine,
$\beta$-[$\beta'$-($\beta''$-Sulfatoethylsulfonyl)-$\alpha'$-methylethylamino]-$\beta$-methylethylamine,
$\gamma$-[$\beta'$-($\beta''$-Sulfatoethylsulfonyl)-$\alpha'$-methylethylamino]-propylamine,
$\delta$-[$\beta'$-($\beta''$-Sulfatoethylsulfonyl)-$\alpha'$-methylethylamino]-n-butylamine,
$\alpha$-Carboxyl-$\beta$-($\beta'$-chloroethylsulfonyl)-ethylamine,
$\alpha$-Carbethoxy-$\beta$-($\beta'$-chloroethylsulfonyl)-ethylamine,
$\beta$-Hydroxy-$\gamma$-($\beta'$-chloroethylsulfonyl)-propylamine,
$\beta,\gamma$-(Bis-$\beta'$-chloroethylsulfonyl)-propylamine,
$\beta$-Acetoxy-$\gamma$-($\beta'$-acetoxyethylsulfonyl)-propylamine,
$\beta$-Chloro-$\gamma$-($\beta'$-chloroethylsulfonyl)-propylamine,
$\beta$-Sulfato-$\gamma$-($\beta'$-sulfatoethylsulfonyl)-propylamine,
Bis-[$\beta$-hydroxy-$\gamma$-($\beta'$-chloroethylsulfonyl)-propyl]-amine,
Bis-[$\beta$-chloro-$\gamma$-($\beta'$-chloroethylsulfonyl-propyl]-amine,
Bis-[$\beta$-sulfato-$\gamma$-($\beta'$-sulfatoethylsulfonyl)-propyl]-amine,
$\beta$-Hydroxy-$\gamma$-($\beta'$-vinylsulfonyl)-propylamine,
4-($\beta$-Chloroethylsulfonyl)-cyclohexylamine,
4-($\beta$-Sulfatoethylsulfonyl)-cyclohexylamine,
4-Vinylsulfonylpiperidine,
4-($\beta$-Chloroethylsulfonyl)-piperidine,
2-[$\beta$-($\beta'$-Chloroethylsulfonyl)ethyl]-piperidine,
2-($\beta$-Sulfatoethylsulfonyl)methylpiperidine,
N-[$\gamma$-($\beta'$-Chloroethylsulfonyl)propyl]-piperazine,
$\gamma$-[$\gamma'$-($\beta''$-Chloroethylsulfonyl)propyloxy]-propylamine,
$\beta$-[Bis-($\beta'$-vinylsulfonylethyl)amino]-ethylamine,
($\beta,\epsilon$-Bis-vinylsulfonyl)-n-pentylamine,
and, if desired, further compounds in which the $\beta$-chloroethylsulfonyl group is replaced by $\beta$-sulfatoethylsulfonyl or vinylsulfonyl or in which the $\beta$-chloroethylsulfonyl, $\beta$-sulfatoethylsulfonyl or vinylsulfonyl group is replaced by $\beta$-hydroxyethyl.

The condensation of the s-triazine of the formula (28), in particular of a 2,4,6-trihalogeno-s-triazine with the dyes of the formulae (26) and (27) or the components which are diazotizable and/or capable of coupling and contain an —N($R_1$)H or —N($R_2$)H group is preferably carried out in aqueous solution or suspension, at low temperatures, preferably between 0° and 5° C. and at a weakly acidic, neutral to weakly alkaline pH. Advantageously, the hydrogen halide which is liberated in the condensation reaction is constantly neutralized by the addition of aqueous alkali metal hydroxides, alkali metal carbonates or bicarbonates. For the further reaction of the halogenotriazine dyes thus obtained or for the reaction of the 2,4,6-trihalogeno-s-triazine with compounds of the formula (29), the free amines or their salts, preferably in the form of the hydrochloride, are used. The reaction is carried out at temperatures approximately between 0° and 40°, preferably between 5° and 25° C., with the addition of acid-binding agents, preferably sodium carbonate, in a pH range from 2 to 8, preferably 5 to 6.5.

The condensation of the halogenotriazine with a compound of the formula (29) can take place before or after the condensation of the halogenotriazine with a dye of the formula (26) or (27). The condensation of the halogenotriazine with a compound of the formula (29) is preferably carried out in aqueous solution or suspension, at low temperature (0° to 40° C.) and at a weakly acidic to neutral pH. In this case, too, the hydrogen halide which is liberated in the condensation reaction is advantageously neutralized by constant addition of aqueous alkali metal hydroxides, alkali metal carbonates or bicarbonates.

As a rule, the diazotization of the diazo components or the intermediates containing a diazotizable amino group is carried out by the action of nitrous acid in aqueous/mineral acidic solution at low temperature. The coupling onto the coupling component is carried out at strongly acidic, neutral to weakly alkaline pH.

The reactive dyes of the formula (1) are suitable for the dyeing and printing of a large range of materials, such as silk, leather, wool, polyamide fibres and polyurethanes, and in particular cellulose-containing fibre materials of any type. These fibre materials comprise, for example, natural cellulose fibres, such as cotton, linen and hemp, and cellulose and regenerated cellulose. The reactive dyes of the formula (1) are also suitable for the dyeing or printing of hydroxyl-containing fibres which are present in mixed fabrics, for example of mixtures of cotton with polyamide fibres, or in particular polyester fibres.

The dyes according to the invention can be applied to the fibre material and fixed on the fibre by various methods, in particular in the form of aqueous dye solutions and print pastes. They are suitable not only for the exhaust process but also for dyeing by the padding process, in which the goods are impregnated with aqueous, if desired, salt-containing dye solutions, and the dyes are fixed after an alkali treatment or in the presence of alkali, if desired with the application of heat. After fixing, the dyeings or prints are thoroughly rinsed with cold and hot water, if desired with the addition of an agent acting as a dispersant and promoting the diffusion of the nonfixed components.

In the case where the reactive dyes of the formula (1) in which D is the radical of an anthraquinone dye have insufficient solubility in the alkaline dyeing liquor, this defect can be corrected in a manner known from the literature by the addition of dispersants or other colourless compounds, for example a naphthalenesulfonic acid/formaldehyde condensation product or in particular anthraquinone-2-sulfonic acid.

The reactive dyes of the formula (1) are distinguished by good fixation properties and very good build-up properties. They can be used in the exhaust process over a large temperature range and are therefore also highly suitable for the dyeing of cotton/polyester mixed fabrics under the conditions recommended for this type of fabric. The degrees of fixation are high and the difference between degree of exhaustion and degree of fixation is remarkably small, that is, the soaping loss is very small. The reactive dyes of the formula (1) are also suitable for prints, in particular on cotton, but also for the printing of nitrogen-containing fibres, for example of wool or silk or mixed fabrics which contain wool or silk.

The dyeings and prints produced on cellulose fibre materials by means of the dyes according to the invention have high tinctorial strength and high fibre to dye bond stability, not only in the acidic but also in the alkaline range, furthermore they have good light fastness properties and very good wet fastness properties, such as wash, water, seawater, cross-dyeing and perspiration fastness properties, as well as good pleating, hot press and crock fastness properties and very good chlorinated water fastness.

The examples which follow serve to illustrate the invention. The temperatures are given in degrees Celsius, parts and percentages are by weight, unless stated otherwise. Parts by weight relate to parts by volume as the kilogram relates to the litre.

The preparation of the monoazo or disazo intermediates has not been described in all cases in the exemplary embodiments which follow, but is clearly evident from the general description.

EXAMPLE 1

18.5 parts of cyanuric chloride are dissolved in 110 parts of acetone and are poured onto 250 parts of ice with vigorous stirring. A solution of 63 parts of the dye of the following structure

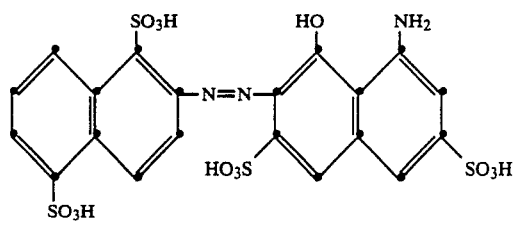

in run in at 0°. 50 parts of 2-normal sodium carbonate solution is then added dropwise, giving a pH of 6–6.5.

After the condensation is completed, a solution of 5.4 parts of m-phenylenediamine in 100 parts of water is run in, and the mixture is stirred at a temperature between 30° and 40° for one hour, during which the pH is maintained between 5 and 7 by dropwise addition of sodium hydroxide solution. The pH is then brought to 4 with hydrochloric acid. 29 parts of

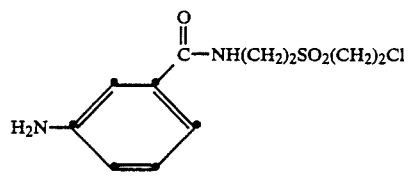

are then added as a powder. The mixture is heated to 70° C. and maintained at this temperature for 3 hours, during which the pH is maintained between 4 and 5 by dropwise addition of a sodium hydroxide solution. 10% of potassium chloride are then added, the mixture is allowed to cool to 20°–55° with stirring and is filtered. About 285 parts of a dye paste, which are dried at 50°–55° in vacuo, are obtained. The reactive dye prepared has the following structure:

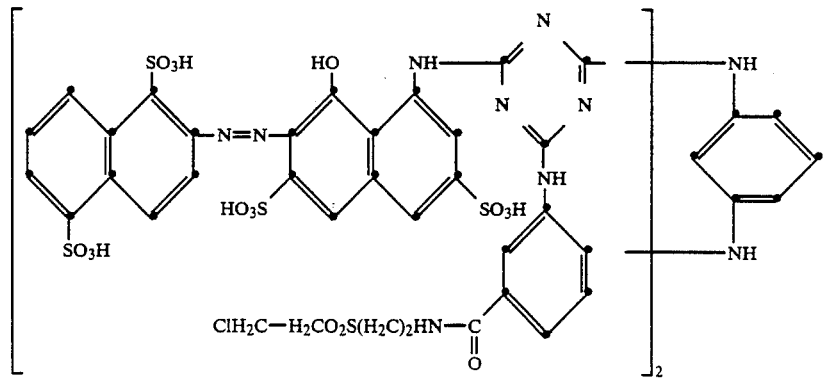

It dyes cellulose fibres by the exhaust process in fast strong red shades.

EXAMPLE 2

31.9 parts of 1,8-aminonaphthol-3,6-disulfonic acid are dissolved under neutral conditions with the addition of sodium hydroxide, and the solution is added to an ice-cold aqueous suspension of 18.5 parts of cyanuric chloride. The mixture is stirred between 0° and 5° for 2 hours and neutralized with a dilute sodium hydroxide solution in such a manner that the reaction always remains weakly acidic to congo red. After the condensation reaction is completed, a diazonium salt solution prepared in a conventional manner from 15.7 parts of orthanilic acid is added. About 50 parts by volume of 2N sodium hydroxide solution are added dropwise over a period of 1 to 2 hours. After the coupling reaction is completed, a solution of 5.4 parts of m-phenylenediamine in 100 parts of water is added, the mixture is heated to 35° and maintained at this temperature for 2 hours. The reaction mixture is neutralized by the gradual addition of a dilute sodium hydroxide solution. The pH is then brought to 4 with hydrochloric acid. 29 parts of

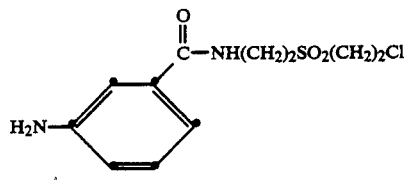

are then added as a powder. The mixture is heated to 70° C. and maintained at this temperature for 3 hours, during which the pH is maintained between 4 and 5 by dropwise addition of sodium hydroxide solution. 10% of potassium chloride are then added, the mixture is allowed to cool to 20°–55° with stirring and is filtered. About 285 parts of a dye paste, which are dried at 50°–55° in vacuo, are obtained. The reactive dye prepared has the following structure:

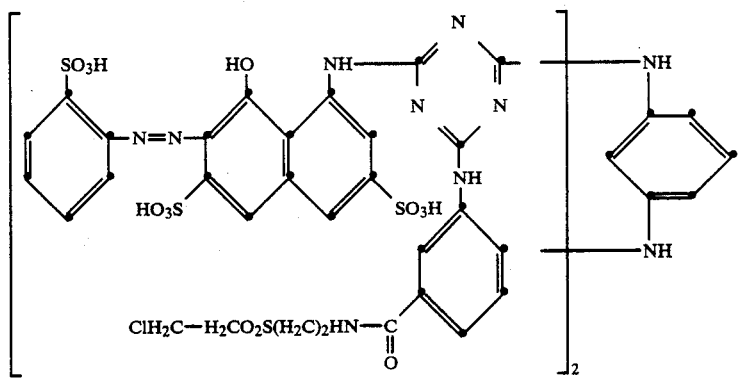

It dyes cellulose fibres by the exhaust process in fast strong red shades.

The table below contains further examples of dyes obtained according to Example 2 by reacting the monoazo dyes of column I with cyanuric chloride, then with the diamines of column II and the amino compounds of column III in a ratio of 2:2:1:2.

TABLE 1

| Ex. | Monoazo dye I | Diamine II | Amino compound III | Hue |
|---|---|---|---|---|
| 3 | Orthanilic acid → 1,8-aminonaphthol-3,6-disulfonic acid | 1,4-Phenylenediamine | $H_2N-\langle\text{phenyl}\rangle-C(O)-NH(CH_2)_2SO_2(CH_2)_2Cl$ | Red |
| 4 | Orthanilic acid → 1,8-aminonaphthol-3,6-disulfonic acid | 1,4-Phenylenediamine | $H_2N-\langle\text{phenyl}\rangle-C(O)-NH(CH_2)_2SO_2(CH_2)_2OSO_3H$ | Red |
| 5 | Orthanilic acid → 1,8-aminonaphthol-3,6-disulfonic acid | 1,4-Phenylenediamine | $H_2N-\langle\text{phenyl}\rangle-C(O)-NH(CH_2)_2SO_2(CH_2)_2OSO_3H$ | Red |

TABLE 1-continued

| Ex. | Monoazo dye I | Diamine II | Amino compound III | Hue |
|---|---|---|---|---|
| 6 | Orthanilic acid → 1,8-aminonaphthol-3,6-disulfonic acid | 1,4-Phenylenediamine | $H_2N-\text{C}_6H_4-\text{C}(=O)-NH(CH_2)_2SO_2CH=CH_2$ | Red |
| 7 | Orthanilic acid → 1,8-aminonaphthol-3,6-disulfonic acid | 1,3-Phenylenediamine | $H_2N-\text{C}_6H_4-\text{C}(=O)-NH(CH_2)_2SO_2(CH_2)_2Cl$ | Red |
| 8 | Orthanilic acid → 1,8-aminonaphthol-3,6-disulfonic acid | 1,3-Phenylenediamine | $H_2N-\text{C}_6H_4-\text{C}(=O)-NH(CH_2)_2SO_2CH=CH_2$ | Red |
| 9 | Orthanilic acid → 1,8-aminonaphthol-3,6-disulfonic acid | 1,3-Phenylenediamine | $H_2N-\text{C}_6H_4-\text{C}(=O)-NH(CH_2)_2SO_2(CH_2)_2OSO_3H$ | Red |
| 10 | Orthanilic acid → 1,8-aminonaphthol-3,6-disulfonic acid | 1,3-Phenylenediamine | $H_2N-\text{C}_6H_4-\text{C}(=O)-NH(CH_2)_2SO_2(CH_2)_2OSO_3H$ | Red |
| 11 | Orthanilic acid → 1,8-aminonaphthol-3,6-disulfonic acid | 1,3-Phenylenediamine | $H_2N-\text{C}_6H_4-\text{C}(=O)-NH(CH_2)_2SO_2CH=CH_2$ | Red |
| 12 | Orthanilic acid → 1,8-aminonaphthol-3,6-disulfonic acid | 1,3-Phenylenediamine | $H_2N-\text{C}_6H_4-\text{C}(=O)-N[(CH_2)_2SO_2CH=CH_2]_2$ | Red |
| 13 | Orthanilic acod → 1,8-aminonaphthol-4,6-disulfonic acid | 1,4-Phenylenediamine | $H_2N-\text{C}_6H_4-\text{C}(=O)-NH(CH_2)_2SO_2(CH_2)_2Cl$ | Red |
| 14 | Orthanilic acid → 1,8-aminonaphthol-4,6-disulfonic acid | 1,4-Phenylenediamine | $H_2N-\text{C}_6H_4-\text{C}(=O)-NH(CH_2)_2SO_2(CH_2)_2OSO_3H$ | Red |
| 15 | Orthanilic acid → 1,8-aminonaphthol-4,6-disulfonic acid | 1,4-Phenylenediamine | $H_2N-\text{C}_6H_4-\text{C}(=O)-NH(CH_2)_2SO_2(CH_2)_2OSO_3H$ | Red |

TABLE 1-continued

| Ex. | Monoazo dye I | Diamine II | Amino compound III | Hue |
|---|---|---|---|---|
| 16 | Orthanilic acid → 1,8-aminonaphthol-4,6-disulfonic acid | 1,4-Phenylenediamine | $H_2N-\text{C}_6H_4-\text{C}(O)-NH(CH_2)_2SO_2CH=CH_2$ | Red |
| 17 | Orthanilic acid → 1,8-aminonaphthol-4,6-disulfonic acid | 1,4-Phenylenediamine | $H_2N-\text{C}_6H_4-\text{C}(O)-NH(CH_2)_2SO_2(CH_2)_2Cl$ | Red |
| 18 | Orthanilic acid → 1,8-aminonaphthol-4,6-disulfonic acid | 1,3-Phenylenediamine | $H_2N-\text{C}_6H_4-\text{C}(O)-NH(CH_2)_2SO_2CH=CH_2$ | Red |
| 19 | Orthanilic acid → 1,8-aminonaphthol-4,6-disulfonic acid | 1,3-Phenylenediamine | $H_2N-\text{C}_6H_4-\text{C}(O)-NH(CH_2)_2SO_2(CH_2)_2OSO_3H$ | Red |
| 20 | Orthanilic acid → 1,8-aminonaphthol-4,6-disulfonic acid | 1,3-Phenylenediamine | $H_2N-\text{C}_6H_4-\text{C}(O)-NH(CH_2)_2SO_2(CH_2)_2OSO_3H$ | Red |
| 21 | Orthanilic acid → 1,8-aminonaphthol-4,6-disulfonic acid | 1,3-Phenylenediamine | $H_2N-\text{C}_6H_4-\text{C}(O)-NH(CH_2)_2SO_2CH=CH_2$ | Red |
| 22 | Orthanilic acid → 1,8-aminonaphthol-4,6-disulfonic acid | 1,3-Phenylenediamine | $H_2N-\text{C}_6H_4-\text{C}(O)-N[(CH_2)_2SO_2CH=CH_2]_2$ | Red |
| 23 | Orthanilic acid → 1,8-aminonaphthol-3,6-disulfonsäure | 2,4-Diaminotoluene | $H_2N-\text{C}_6H_4-\text{C}(O)-NH(CH_2)_2SO_2CH=CH_2$ | Bright red |
| 24 | Orthanilic acid → 1,8-aminonaphthol-3,6-disulfonic acid | 2,4-Diaminochlorbenzene | $H_2N-\text{C}_6H_4-\text{C}(O)-NH(CH_2)_2SO_2CH=CH_2$ | Bright red |
| 25 | Orthanilic acid → 1,8-aminonaphthol-3,6-disulfonic acid | 2,5-Diaminotoluene | $H_2N-\text{C}_6H_4-\text{C}(O)-NH(CH_2)_2SO_2CH=CH_2$ | Bright red |

TABLE 1-continued

| Ex. | Monoazo dye I | Diamine II | Amino compound III | Hue |
|---|---|---|---|---|
| 26 | Orthanilic acid → 1,8-aminonaphthol-3,6-disulfonic acid | 1,2-Ethylenediamine | $H_2N-\phantom{x}\bigcirc\phantom{x}-C(=O)-NH(CH_2)_2SO_2CH=CH_2$ | Bright red |
| 27 | Orthanilic acid → 1,8-aminonaphthol-3,6-disulfonic acid | —N⟨⟩N— (piperazine) | $H_2N-\phantom{x}\bigcirc\phantom{x}-C(=O)-NH(CH_2)_2SO_2CH=CH_2$ | Bright red |
| 28 | Orthanilic acid → 1,8-aminonaphthol-3,6-disulfonic acid | 1,3-Propylenediamine | $H_2N-\phantom{x}\bigcirc\phantom{x}-C(=O)-NH(CH_2)_2SO_2CH=CH_2$ | Bright red |
| 29 | Naphthylamino-1,6-disulfonic acid → 1,8-aminonaphthol-3,6-disulfonic acid | 1,4-Phenylenediamine | $H_2N-\phantom{x}\bigcirc\phantom{x}-C(=O)-NH(CH_2)_2SO_2(CH_2)_2Cl$ | Bluish red |
| 30 | Naphthylamino-1,6-disulfonic acid → 1,8-aminonaphthol-3,6-disulfonic acid | 1,4-Phenylenediamine | $H_2N-\phantom{x}\bigcirc\phantom{x}-C(=O)-NH(CH_2)_2SO_2(CH_2)_2OSO_3H$ | Bluish red |
| 31 | 2-Naphthylamino-1,6-disulfonic acid → 1,8-aminonaphthol-3,6-disulfonic acid | 1,4-Phenylenediamine | $H_2N-\phantom{x}\bigcirc\phantom{x}-C(=O)-NH(CH_2)_2SO_2(CH_2)_2OSO_3H$ | Bluish red |
| 32 | 2-Naphthylamino-1,6-disulfonic acid → 1,8-aminonaphthol-3,6-disulfonic acid | 1,4-Phenylenediamine | $H_2N-\phantom{x}\bigcirc\phantom{x}-C(=O)-NH(CH_2)_2SO_2CH=CH_2$ | Bluish red |
| 33 | 2-Naphthylamino-1,6-disulfonic acid → 1,8-aminonaphthol-3,6-disulfonic acid | 1,3-Phenylenediamine | $H_2N-\phantom{x}\bigcirc\phantom{x}-C(=O)-NH(CH_2)_2SO_2(CH_2)_2Cl$ | Bluish red |
| 34 | 2-Naphthylamino-1,6-disulfonic acid → 1,8-aminonaphthol-3,6-disulfonic acid | 1,3-Phenylenediamine | $H_2N-\phantom{x}\bigcirc\phantom{x}-C(=O)-NH(CH_2)_2SO_2CH=CH_2$ | Bluish red |
| 35 | 2-Naphthylamino-1,6-disulfonic acid → 1,8-aminonaphthol-3,6-disulfonic acid | 1,3-Phenylenediamine | $H_2N-\phantom{x}\bigcirc\phantom{x}-C(=O)-NH(CH_2)_2SO_2(CH_2)_2OSO_3H$ | Bluish red |

TABLE 1-continued

| Ex. | Monoazo dye I | Diamine II | Amino compound III | Hue |
|---|---|---|---|---|
| 36 | 2-Naphthylamino-1,6-disulfonic acid → 1,8-aminonaphthol-3,6-disulfonic acid | 1,3-Phenylenediamine | H₂N—⟨C₆H₄⟩—C(=O)—NH(CH₂)₂SO₂(CH₂)₂OSO₃H | Bluish red |
| 37 | 2-Naphthylamino-1,6-disulfonic acid → 1,8-aminonaphthol-3,6-disulfonic acid | 1,3-Phenylenediamine | H₂N—⟨C₆H₄⟩—C(=O)—NH(CH₂)₂SO₂CH=CH₂ | Bluish red |
| 38 | 2-Naphthylamino-1,6-disulfonic acid → 1,8-aminonaphthol-3,6-disulfonic acid | 1,3-Phenylenediamine | H₂N—⟨C₆H₄⟩—C(=O)—N[(CH₂)₂SO₂CH=CH₂]₂ | Bluish red |
| 39 | 2-Naphthylamino-1,6-disulfonic acid → 1,8-aminonaphthol-4,6-disulfonic acid | 1,3-Phenylenediamine | H₂N—⟨C₆H₄⟩—C(=O)—NH(CH₂)₂SO₂CH=CH₂ | Red |
| 40 | 2-Naphthylamino-1,6-disulfonic acid → 1,8-aminonaphthol-4,6-disulfonic acid | 1,2-Aethylenediamine | H₂N—⟨C₆H₄⟩—C(=O)—NH(CH₂)₂SO₂CH=CH₂ | Red |
| 41 | 2-Naphthylamino-1,6-disulfonic acid → 1,8-aminonaphthol-3,6-disulfonic acid | 1,3-Propylenediamine | H₂N—⟨C₆H₄⟩—C(=O)—NH(CH₂)₂SO₂CH=CH₂ | Red |
| 42 | 2-Naphthylamino-1,6-disulfonic acid → 1,8-aminonaphthol-4,6-disulfonic acid | piperazine (HN⟨C₄H₈⟩NH) | H₂N—⟨C₆H₄⟩—C(=O)—NH(CH₂)₂SO₂CH=CH₂ | Red |
| 43 | 2-Naphthylamino-1,6-disulfonic acid → 1,8-aminonaphthol-4,6-disulfonic acid | 1,4-Phenylenediamine | H₂N—⟨C₆H₄⟩—C(=O)—NH(CH₂)₂SO₂CH=CH₂ | Red |

TABLE 1-continued

| Ex. | Monoazo dye I | Diamine II | Amino compound III | Hue |
|---|---|---|---|---|
| 44 | 2-Naphthylamino-1,6-disulfonic acid → 1,8-aminonaphthol-4,6-disulfonic acid | 2,4-Diaminotoluene | H₂N—⟨C₆H₄⟩—C(O)—NH(CH₂)₂SO₂CH=CH₂ | Red |
| 45 | 2-Naphthylamino-1,6-disulfonic acid → 1,8-aminonaphthol-4,6-disulfonic acid | 2,4-Diaminochlorobenzene | H₂N—⟨C₆H₄⟩—C(O)—NH(CH₂)₂SO₂CH=CH₂ | Red |
| 46 | 2-Naphthylamino-1,5-disulfonic acid → 1,8-aminonaphthol-3,6-disulfonic acid | 1,4-Phenylenediamine | H₂N—⟨C₆H₄⟩—C(O)—NH(CH₂)₂SO₂(CH₂)₂Cl | Bluish red |
| 47 | 2-Naphthylamino-1,5-disulfonic acid → 1,8-aminonaphthol-3,6-disulfonic acid | 1,4-Phenylenediamine | H₂N—⟨C₆H₄⟩—C(O)—NH(CH₂)₂SO₂(CH₂)₂OSO₃H | Bluish red |
| 48 | 2-Naphthylamino-1,5-disulfonic acid → 1,8-aminonaphthol-3,6-disulfonic acid | 1,4-Phenylenediamine | H₂N—⟨C₆H₄⟩—C(O)—NH(CH₂)₂SO₂(CH₂)₂OSO₃H | Bluish red |
| 49 | 2-Naphthylamino-1,5-disulfonic acid → 1,8-aminonaphthol-3,6-disulfonic acid | 1,4-Phenylenediamine | H₂N—⟨C₆H₄⟩—C(O)—NH(CH₂)₂SO₂CH=CH₂ | Bluish red |
| 50 | 2-Naphthylamino-1,5-disulfonic acid → 1,8-aminonaphthol-3,6-disulfonic acid | 1,3-Phenylenediamine | H₂N—⟨C₆H₄⟩—C(O)—NH(CH₂)₂SO₂(CH₂)₂Cl | Bluish red |
| 51 | 2-Naphthylamino-1,5-disulfonic acid → 1,8-aminonaphthol-3,6-disulfonic acid | 1,3-Phenylenediamine | H₂N—⟨C₆H₄⟩—C(O)—NH(CH₂)₂SO₂CH=CH₂ | Bluish red |
| 52 | 2-Naphthylamino-1,5-disulfonic acid → 1,8-aminonaphthol-3,6-disulfonic acid | 1,3-Phenylenediamine | H₂N—⟨C₆H₄⟩—C(O)—NH(CH₂)₂SO₂(CH₂)₂OSO₃H | Bluish red |
| 53 | 2-Naphthylamino-1,5-disulfonic acid → 1,8-aminonaphthol-3,6-disulfonic acid | 1,3-Phenylenediamine | H₂N—⟨C₆H₄⟩—C(O)—NH(CH₂)₂SO₂(CH₂)₂OSO₃H | Bluish red |

TABLE 1-continued

| Ex. | Monoazo dye I | Diamine II | Amino compound III | Hue |
|---|---|---|---|---|
| 54 | 2-Naphthylamino-1,5-disulfonic acid→1,8-aminonaphthol-3,6-disulfonic acid | 1,3-Phenylenediamine | $H_2N-\text{C}_6H_4-\text{C(=O)}-NH(CH_2)_2SO_2CH=CH_2$ | Bluish red |
| 55 | 2-Naphthylamino-1,5-disulfonic acid→1,8-aminonaphthol-3,6-disulfonic acid | 1,3-Phenylenediamine | $H_2N-\text{C}_6H_4-\text{C(=O)}-N[(CH_2)_2SO_2CH=CH_2]_2$ | Bluish red |
| 56 | 2-Naphthylamino-1,5-disulfonic acid→1,8-aminonaphthol-4,6-disulfonic acid | 1,3-Phenylenediamine | $H_2N-\text{C}_6H_4-\text{C(=O)}-NH(CH_2)_2SO_2CH=CH_2$ | Red |
| 57 | 2-Naphthylamino-1,5-disulfonic acid→1,8-aminonaphthol-4,6-disulfonic acid | 1,3-Phenylenediamine | $H_2N-\text{C}_6H_4-\text{C(=O)}-NH(CH_2)_2SO_2CH=CH_2$ (ortho) | Red |
| 58 | 2-Naphthylamino-1,5-disulfonic acid→1,8-aminonaphthol-4,6-disulfonic acid | 1,4-Phenylenediamine | $H_2N-\text{C}_6H_4-\text{C(=O)}-NH(CH_2)_2SO_2CH=CH_2$ | Red |
| 59 | 2-Naphthylamino-1,5-disulfonic acid→1,8-aminonaphthol-4,6-disulfonic acid | 1,4-Phenylenediamine | $H_2N-\text{C}_6H_4-\text{C(=O)}-NH(CH_2)_2SO_2CH=CH_2$ (ortho) | Red |
| 60 | 2-Naphthylamino-1,5-disulfonic acid→1,8-aminonaphthol-4,6-disulfonic acid | 1,2-Ethylenediamine | $H_2N-\text{C}_6H_4-\text{C(=O)}-NH(CH_2)_2SO_2CH=CH_2$ | Red |
| 61 | 2-Naphthylamino-1,5-disulfonic acid→1,8-aminonaphthol-4,6-disulfonic acid | 1,3-Propylenediamine | $H_2N-\text{C}_6H_4-\text{C(=O)}-NH(CH_2)_2SO_2CH=CH_2$ | Red |
| 62 | 2-Naphthylamino-1,5-disulfonic acid→1,8-aminonaphthol-4,6-disulfonic acid | piperazine (HN⟨⟩NH) | $H_2N-\text{C}_6H_4-\text{C(=O)}-NH(CH_2)_2SO_2CH=CH_2$ | Red |

TABLE 1-continued

| Ex. | Monoazo dye I | Diamine II | Amino compound III | Hue |
|---|---|---|---|---|
| 63 | Metanilic acid → 1,8-aminonaphthol-3,6-disulfonic acid | 1,4-Phenylenediamine | H₂N—C₆H₄—C(O)—NH(CH₂)₂SO₂(CH₂)₂Cl | Red |
| 64 | Metanilic acid → 1,8-aminonaphthol-3,6-disulfonic acid | 1,4-Phenylenediamine | H₂N—C₆H₄—C(O)—NH(CH₂)₂SO₂(CH₂)₂OSO₃H | Red |
| 65 | Metanilic acid → 1,8-aminonaphthol-3,6-disulfonic acid | 1,4-Phenylenediamine | H₂N—C₆H₄—C(O)—NH(CH₂)₂SO₂(CH₂)₂OSO₃H | Red |
| 66 | Metanilic acid → 1,8-aminonaphthol-3,6-disulfonic acid | 1,4-Phenylenediamine | H₂N—C₆H₄—C(O)—NH(CH₂)₂SO₂CH=CH₂ | Red |
| 67 | Metanilic acid → 1,8-aminonaphthol-3,6-disulfonic acid | 1,3-Phenylenediamine | H₂N—C₆H₄—C(O)—NH(CH₂)₂SO₂(CH₂)₂Cl | Red |
| 68 | Metanilic acid → 1,8-aminonaphthol-3,6-disulfonic acid | 1,3-Phenylenediamine | H₂N—C₆H₄—C(O)—NH(CH₂)₂SO₂CH=CH₂ | Red |
| 69 | Metanilic acid → 1,8-aminonaphthol-3,6-disulfonic acid | 1,3-Phenylenediamine | H₂N—C₆H₄—C(O)—NH(CH₂)₂SO₂(CH₂)₂OSO₃H | Red |
| 70 | Metanilic acid → 1,8-aminonaphthol-3,6-disulfonic acid | 1,3-Phenylenediamine | H₂N—C₆H₄—C(O)—NH(CH₂)₂SO₂(CH₂)₂OSO₃H | Red |
| 71 | Metanilic acid → 1,8-aminonaphthol-3,6-disulfonic acid | 1,3-Phenylenediamine | H₂N—C₆H₄—C(O)—NH(CH₂)₂SO₂CH=CH₂ | Red |
| 72 | Metanilic acid → 1,8-aminonaphthol-3,6-disulfonic acid | 1,3-Phenylenediamine | H₂N—C₆H₄—C(O)—N[(CH₂)₂SO₂CH=CH₂]₂ | Red |

TABLE 1-continued

| Ex. | Monoazo dye I | Diamine II | Amino compound III | Hue |
|---|---|---|---|---|
| 73 | Sulfanilic acid → 1,8-aminonaphthol-4,6-disulfonic acid | 1,3-Phenylenediamine | $H_2N-C_6H_4-C(=O)-NH(CH_2)_2SO_2CH=CH_2$ | Bright red |
| 74 | Sulfanilic acid → 1,8-aminonaphthol-4,6-disulfonic acid | 1,4-Phenylenediamine | $H_2N-C_6H_4-C(=O)-NH(CH_2)_2SO_2CH=CH_2$ | Bright red |
| 75 | Sulfanilic acid → 1,8-aminonaphthol-4,6-disulfonic acid | 1,3-Propylenediamine | $H_2N-C_6H_4-C(=O)-NH(CH_2)_2SO_2CH=CH_2$ | Bright red |
| 76 | Sulfanilic acid → 1,8-aminonaphthol-4,6-disulfonic acid | 1,2-Aethylenediamine | $H_2N-C_6H_4-C(=O)-NH(CH_2)_2SO_2CH=CH_2$ | Bright red |
| 77 | Sulfanilic acid → 1,8-aminonaphthol-4,6-disulfonic acid | Piperazine (H-N⌒N-H) | $H_2N-C_6H_4-C(=O)-NH(CH_2)_2SO_2CH=CH_2$ | Bright red |
| 78 | Aniline-2,5-disulfonic acid → 1,8-aminonaphthol-3,6-disulfonic acid | 2,4-Diaminotoluene | $H_2N-C_6H_4-C(=O)-NH(CH_2)_2SO_2CH=CH_2$ | Red |
| 79 | Aniline-2,5-disulfonic acid → 1,8-aminonaphthol-3,6-disulfonic acid | 2,4-Diamino chlorobenzene | $H_2N-C_6H_4-C(=O)-NH(CH_2)_2SO_2CH=CH_2$ | Red |
| 80 | Aniline-2,5-disulfonic acid → 1,8-aminonaphthol-3,6-disulfonic acid | 2,5-Diaminotoluene | $H_2N-C_6H_4-C(=O)-NH(CH_2)_2SO_2CH=CH_2$ | Red |

TABLE 1-continued

| Ex. | Monoazo dye I | Diamine II | Amino compound III | Hue |
|-----|---------------|------------|--------------------|----|
| 81 | Aniline-2,5-disulfonic acid → 1,8-aminonaphthol-3,6-disulfonic acid | m-Phenylenediamine | $H_2N-\bigcirc-C(=O)-NH(CH_2)_2SO_2CH=CH_2$ | Red |
| 82 | m-Aminobenzoic acid → 1,8-aminonaphthol-3,6-disulfonic acid | p-Phenylenediamine | $H_2N-\bigcirc-C(=O)-NH(CH_2)_2SO_2CH=CH_2$ | Red |
| 83 | m-Aminobenzoic acid → 1,8-aminonaphthol-3,6-disulfonic acid | 4,4'-Diaminodiphenyl oxide | $H_2N-\bigcirc-C(=O)-NH(CH_2)_2SO_2CH=CH_2$ | Red |

Similarly useful reactive dyes are also obtained by using, instead of the starting dye 1-amino-8-hydroxy-2',7-azonaphthalene-1',3,5',6-tetrasulfonic acid used above, the azo dyes obtainable from the diazo and coupling components listed in the table below and otherwise repeating the above procedure.

Diazo components:

2-Aminobenzenesulfonic acid, 3-aminobenzenesulfonic acid, 4-aminobenzenesulfonic acid, 5-chloro-2-aminobenzenesulfonic acid, 6-chloro-2-aminobenzenesulfonic acid, 5-nitro-2-aminobenzenesulfonic acid, 4-chloro-3-aminobenzenesulfonic acid, 6-chloro-3-aminobenzenesulfonic acid, 3-chloro-4-aminobenzenesulfonic acid, 2-aminotoluene-4-sulfonic acid, 2-aminotoluene-5-sulfonic acid, 3-aminotoluene-6-sulfonic acid, 4-aminotoluene-2-sulfonic acid, 4-aminotoluene-3-sulfonic acid, 5-chloro-2-aminotoluene-3-sulfonic acid, 3-chloro-2-aminotoluene-5-sulfonic acid, 6-chloro-3-aminotoluene-4-sulfonic acid, 2-chloro-4-aminotoluene-5-sulfonic acid, 2-chloro-4-aminotoluene-6-sulfonic acid, 4-nitro-2-aminotoluene-6-sulfonic acid, 6-nitro-4-aminotoluene-2-sulfonic acid, 3-amino-1,2-dimethylbenzene-4-sulfonic acid, 4-amino-1,3-dimethylbenzene-5-sulfonic acid, 4-amino-1,3-dimethylbenzene-6-sulfonic acid, 2-aminoanisole-4-sulfonic acid, 4-aminoanisole-2-sulfonic acid, 4-aminoanisole-3-sulfonic acid, 4-chloro-2-aminoanisole-5-sulfonic acid, 4-aminophenetole-2-sulfonic acid, 4-aminophenetole-3-sulfonic acid, 2-aminophenetole-4-sulfonic acid, 4-aminobenzene-1,3-disulfonic acid, 2-aminobenzene-1,4-disulfonic acid, 2-aminotoluene-3,4-disulfonic acid, 2-aminotoluene-3,5-disulfonic acid, aniline, 4-aminotoluene, 4-aminoanisole, 4-aminochlorobenzene, 2-aminobenzenesulfonic acid, 2-naphthylamine-1-sulfonic acid, 2-naphthylamine-5-sulfonic acid, 2-naphthylamine-6-sulfonic acid, 2-naphthylamine-7-sulfonic acid, 2-naphthylamine-8-sulfonic acid, 2-naphthylamine-1,7-disulfonic acid, 2-naphthylamine-3,6-disulfonic acid, 2-naphthylamine-3,7-disulfonic acid, 2-napthylamine-4,7-disulfonic acid, 2-naphthylamine-4,8-disulfonic acid, 2-naphthylamine-5,7-disulfonic acid, 2-naphthylamine-6,8-disulfonic acid, 2-naphthylamine-1,5,7-trisulfonic acid, 2-naphthylamine-3,6,8-trisulfonic acid, 2-naphthylamine-4,6,8-trisulfonic acid, 1-naphthylamine-4-sulfonic acid, 1-naphthylamine-5-sulfonic acid, 1-naphthylamine-6-sulfonic acid, 1-naphthylamine-7-sulfonic acid, 1-naphthylamine-3,6-disulfonic acid, 1-naphthylamine-3,7-disulfonic acid, 1-naphthylamine-3,8-disulfonic acid, 1-naphthylamine-4,6-disulfonic acid, 1-naphthylamine-4,7-disulfonic acid, 1-naphthylamine-4,8-disulfonic acid, 1-naphthylamine-5,7-disulfonic acid, 1-naphthylamine-6,8-disulfonic acid, 1-naphthylamine-2,4,6-trisulfonic acid, 1-naphthylamine-3,6,8-trisulfonic acid, 1-naphthylamine-4,6,8-trisulfonic acid, 1-amino-4-β-chloroethylsulfonylbenzene, 1-amino-3-vinylsulfonylbenzene, 1-amino-2-bromo-4-β-sulfatoethylsulfonylbenzene, 1-amino-4-β-sulfatoethylsulfonylbenzene-2-sulfonic acid, 1-amino-3-δ-(β-chloroethylsulfonyl)-butyrylbenzene-6-sulfonic acid, 2-amino-8-β-sulfatoethylsulfonylnaphthalene, 2-amino-6-β-sulfatoethylsulfonylnaphthalene-1-sulfonic acid, 2-amino-8-vinylsulfonylnaphthalene-6-sulfonic acid.

Coupling components:

1-Amino-8-naphthol-4,6-disulfonic acid, 1-amino-8-naphthol-4-sulfonic acid, 1-amino-8-naphthol-6-sulfonic acid, 1-amino-8-naphthol-3,5-disulfonic acid, 1-(4'-aminobenzoylamino)-8-naphthol-3,6- or -4,6-disulfonic acid, 1-(3'-aminobenzoylamino)-8-naphthol-3,6- or -4,6-disulfonic acid.

EXAMPLE 84

63.1 parts of 1-[2'-sulfo-4'-(4'',6''-dichloro-1'',3'',5''-triazin-2'-ylamino)-phenyl]-4-(2'''-sulfophenylazo)-5-pyrazolone-3-carboxylic acid are dissolved in water at a pH of 6.8–7.2. After the coupling reaction is completed, a solution of 5.4 parts of m-phenylenediamine in 100 parts of water is added, the mixture is heated to 35° and maintained at this temperature for 2 hours. The reaction mixture is neutralized by the gradual addition of a dilute sodium hydroxide solution. The pH is then brought to 4 with hydrochloric acid. 29 parts of

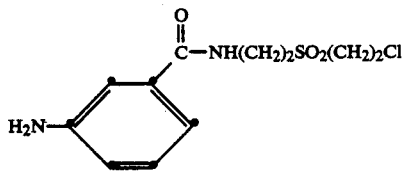

are then added as a powder. The mixture is heated to 70° C. and maintained at this temperature for 3 hours, during which the pH is maintained between 4 and 5 by dropwise addition of sodium hydroxide solution. 10% of potassium chloride are then added, the mixture is allowed to cool to 20°–55° with stirring and is filtered. About 185 parts of a dye paste, which are dried at 50°–55° in vacuo, are obtained. The reactive dye prepared has the following structure:

pH of 6.8–7.2. After the coupling reaction is completed, a solution of 5.4 parts of m-phenylenediamine in 100 parts of water is added, the mixture is heated to 35° and maintained at this temperature for 2 hours. The reaction mixture is neutralized by the gradual addition of a dilute sodium hydroxide solution. The pH is then brought to 4 with hydrochloric acid. 29 parts of

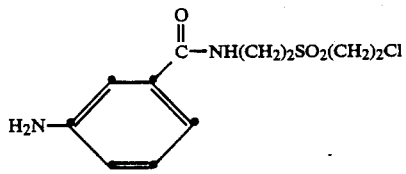

are then added as a powder. The mixture is heated to 70° C. and maintained at this temperature for 3 hours,

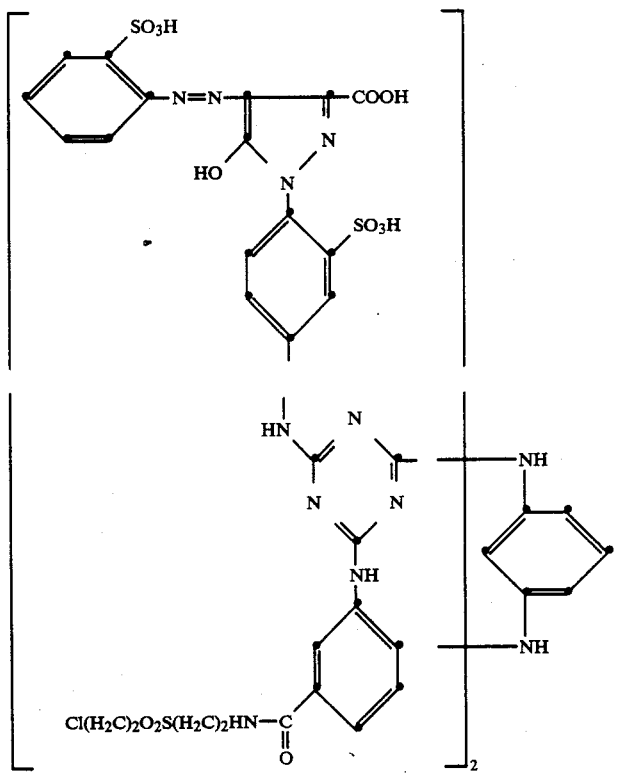

and can be isolated by salting out or spray-drying. It dyes cellulose fibres in pure greenish yellow shades.

EXAMPLE 85

63.1 parts of 1-[2'-sulfo-4'-(4",6"-dichloro-1",3",5"-triazin-2'-ylamino)-phenyl]-4-(2'''-sulfophenylazo)-5-pyrazolone-3-carboxylic acid are dissolved in water at a during which the pH is maintained between 4 and 5 by dropwise addition of sodium hydroxide solution. 10% of potassium chloride are then added, the mixture is allowed to cool to 20°–55° with stirring and is filtered. About 185 parts of a dye paste, which are dried at 50°–55° in vacuo, are obtained. The reactive dye prepared has the following structure:

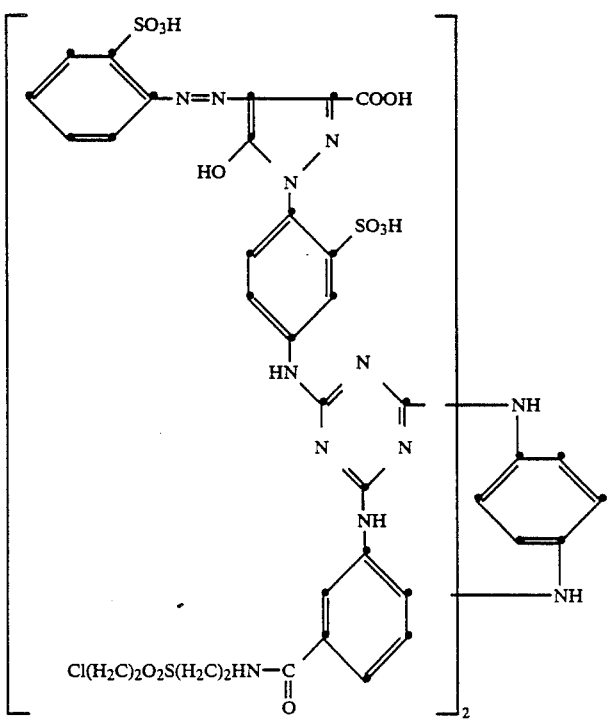

and can be isolated by salting out or spray-drying. It dyes cellulose fibres in pure greenish yellow shades.

EXAMPLE 86

63.1 parts of 1-[2'-sulfo-4'-(4",6"-dichloro-1",3",5"-triazin-2"-ylamino)-phenyl]-4-(2'''-sulfophenylazo)-5-pyrazolone-3-carboxylic acid are dissolved in water at a pH of 6.8–7.2. After the coupling reaction is completed, a solution of 5.4 parts of m-phenylenediamine in 100 parts of water is added, the mixture is heated to 35° and maintained at this temperature for 2 hours. The reaction mixture is neutralized by the gradual addition of a dilute sodium hydroxide solution. The pH is then brought to 4 with hydrochloric acid. 29 parts of

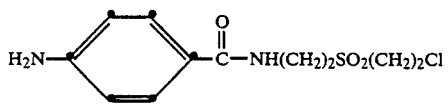

are then added as a powder. The mixture is heated to 70° C. and maintained at this temperature for 3 hours, during which the pH is maintained between 4 and 5 by dropwise addition of sodium hydroxide solution. 10% of potassium chloride are then added, the mixture is allowed to cool to 20°–55° with stirring and is filtered. About 185 parts of a dye paste, which are dried at 50°–55° in vacuo, are obtained. The reactive dye prepared has the following structure:

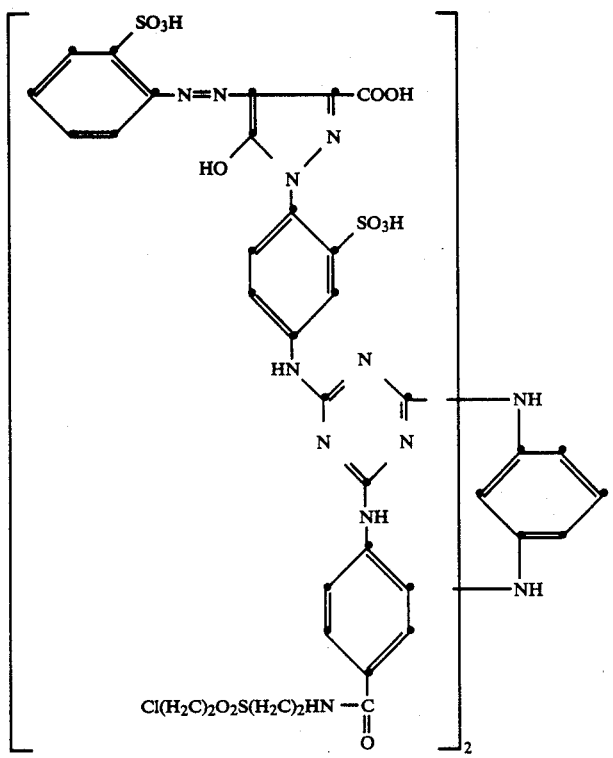

and can be isolated by salting out or spray-drying. It dyes cellulose fibres in pure greenish yellow shades.

Similar useful reactive dyes according to the invention are obtained by using, instead of the intermediate dye used above, the condensation products of the azo dyes obtainable from the diazo and coupling components listed in the table below together with cyanuric chloride and otherwise repeating the procedure as described above.

Diazo components:
3-Aminobenzenesulfonic acid
4-Aminobenzenesulfonic acid
5-Chloro-2-aminobenzenesulfonic acid
2,5-Dichloro-4-aminobenzenesulfonic acid
2-Aminotoluene-4-sulfonic acid
4-Aminotoluene-3-sulfonic acid
2-Aminoanisole-4-sulfonic acid
4-Aminobenzene-1,3-disulfonic acid
2-Aminobenzene-1,4-disulfonic acid
2-Aminotoluene-3,5-disulfonic acid
2-Aminonaphthalene-1,5-disulfonic acid
2-Aminonaphthalene-4,8-disulfonic acid
2-Aminonaphthalene-6,8-disulfonic acid
2-Aminonaphthalene-1-sulfonic acid
2-Aminonaphthalene-6-sulfonic acid
4-β-Ethylsulfonylaniline
3-β-Chloroethylsulfonylaniline
2-Methoxy-4-β-sulfatoethylsulfonylaniline
2-Methoxy-5-methyl-4-β-sulfatoethylsulfonylaniline
2-Bromo-4-β-sulfatoethylsulfonylaniline
2-Sulfo-4-β-sulfatoethylsulfonylaniline
2-Methoxy-5-β-sulfatoethylsulfonylaniline
2-Sulfo-5-δ-(β-chloroethylsulfonylbutyryl)-aminoaniline
2-Amino-8-β-sulfatoethylsulfonylnaphthalene-5-sulfonic acid
2-Amino-8-β-sulfatoethylsulfonylnaphthalene
2-Amino-6-vinylsulfonylnaphthalene-1-sulfonic acid.

Coupling components:
1-(3'-Amino-6'-sulfophenyl)-3-methyl-5-pyrazolone
1-(4'-Amino-3'-sulfophenyl)-3-methyl-5-pyrazolone
1-(4'-Amino-2'-sulfophenyl)-3-methyl-5-pyrazolone
1-(3'-Amino-6'-sulfophenyl)-5-pyrazolone-3-carboxylic acid
1-(4'-Amino-3'-sulfophenyl)-5-pyrazolone-3-carboxylic acid
1-(3'-Amino-5'-sulfo-6'-methylphenyl)-5-pyrazolone-3-carboxylic acid
1-(2'-Methyl-3'-amino-5'-sulfophenyl)-5-pyrazolone-3-carboxylic acid
1-(2'-Methyl-3'-amino-5'-sulfophenyl)-3-methyl-5-pyrazolone
1-(3'-Amino-5'-sulfo-6'-methylphenyl)-3-methyl-5-pyrazolone
1-(4'-Amino-2',5'-disulfophenyl)-5-pyrazolone-3-carboxylic acid.

EXAMPLE 87

54.5 parts of the dye 2-(4'-amino-2'-ureidophenylazo)-naphthalene-3,6,8-trisulfonic acid are dissolved in 250 parts of water under neutral conditions. This neutral solution is added to a suspension prepared from 18.5 parts of cyanuric chloride in acetone and water. The temperature is maintained at 0° to 3° by cooling with ice. During the course of the acylation reaction, 9 g of bicarbonate are added at such a rate that the pH remains between 5.5 and 7. After the coupling reaction is completed, a solution of 5.4 parts of m-phenylenediamine in 100 parts of water is added, the mixture is warmed to 35° and maintained at this temperature for 2 hours. The reaction mixture is neutralized by the gradual addition of a dilute sodium hydroxide solution. The pH is then brought to 4 with hydrochloric acid. 29 parts of

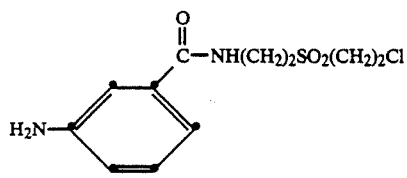

are then added as a powder. The mixture is heated to 70° C. and maintained at this temperature for 3 hours, during which the pH is maintained between 4 and 5 by dropwise addition of sodium hydroxide solution. 10% of potassium chloride are then added, the mixture is allowed to cool to 20°-55° with stirring and is filtered. The reactive dye prepared has the following structure:

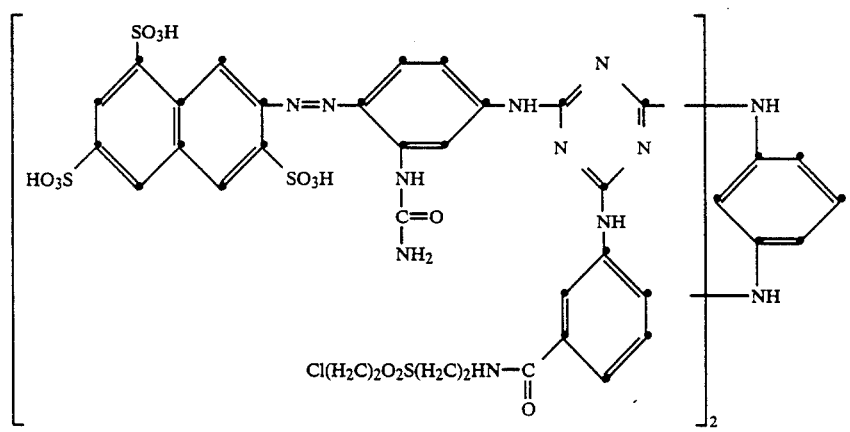

It dyes cellulose fibres by the exhaust process in fast golden-yellow shades.

EXAMPLE 88

54.5 parts of the dye 2-(4'-amino-2'-ureidophenylazo)-naphthalene-3,6,8-trisulfonic acid are dissolved in 250 parts of water under neutral conditions. This neutral solution is added to a suspension prepared from 18.5 parts of cyanuric chloride in acetone and water. The temperature is maintained at 0° to 3° by cooling with ice. During the course of the acylation reaction, 9 g of bicarbonate are added at such a rate that the pH remains between 5.5 and 7. After the coupling reaction is completed, a solution of 5.4 parts of m-phenylenediamine in 100 parts of water is added, the mixture is warmed to 35° and maintained at this temperature for 2 hours. The reaction mixture is neutralized by the gradual addition of a dilute sodium hydroxide solution. The pH is then brought to 4 with hydrochloric acid. 29 parts of

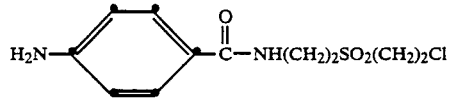

are then added as a powder. The mixture is heated to 70° C. and maintained at this temperature for 3 hours, during which the pH is maintained between 4 and 5 by dropwise addition of sodium hydroxide solution. 10% of potassium chloride are then added, the mixture is allowed to cool to 20°-55° with stirring and is filtered. The reactive dye prepared has the following structure:

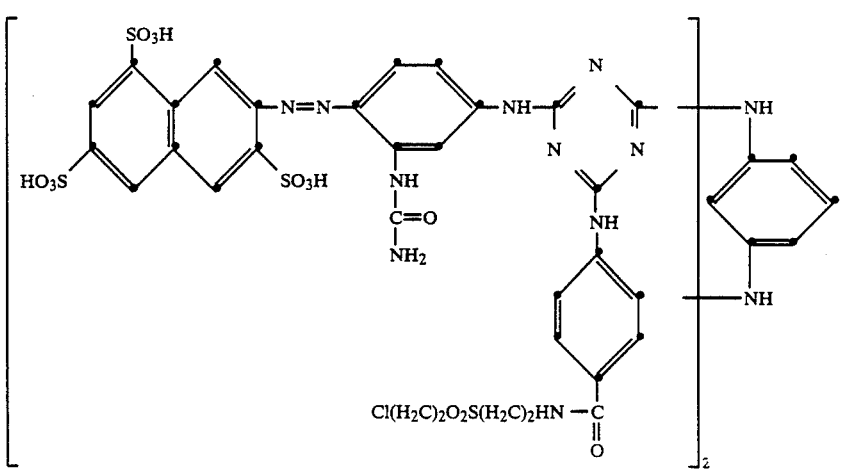

It dyes cellulose fibres by the exhaust process in fast golden-yellow shades.

EXAMPLE 89

54.5 parts of the dye 2-(4'-amino-2'-ureidophenylazo)-naphthalene-3,6,8-trisulfonic acid are dissolved in 250 parts of water under neutral conditions. This neutral solution is added to a suspension prepared from 18.5 parts of cyanuric chloride in acetone and water. The temperature is maintained at 0° to 3° by cooling with ice. During the course of the acylation reaction, 9 g of bicarbonate are added at such a rate that the pH remains between 5.5 and 7. After the coupling reaction is completed, a solution of 5.4 parts of p-phenylenediamine in 100 parts of water is added, the mixture is warmed to 35° and maintained at this temperature for 2 hours. The reaction mixture is neutralized by the gradual addition of a dilute sodium hydroxide solution. The pH is then brought to 4 with hydrochloric acid. 29 parts of

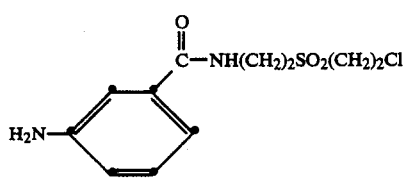

are then added as a powder. The mixture is heated to 70° C. and maintained at this temperature for 3 hours, during which the pH is maintained between 4 and 5 by dropwise addition of sodium hydroxide solution. 10% of potassium chloride are then added, the mixture is allowed to cool to 20°–55° with stirring and is filtered. The reactive dye prepared has the following structure:

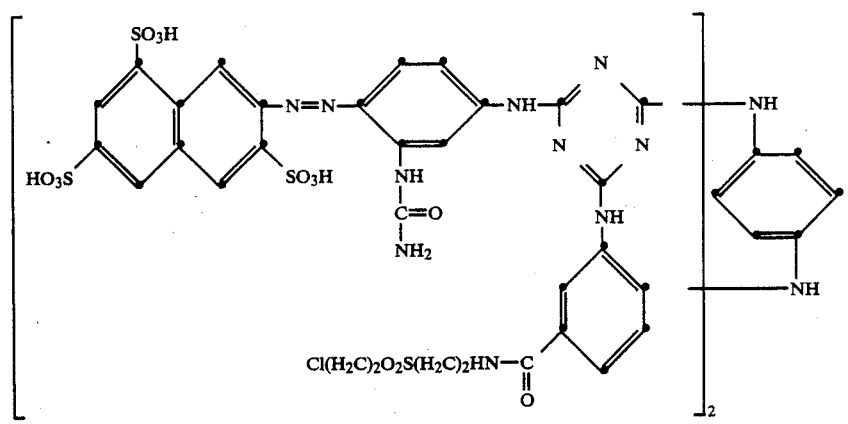

It dyes cellulose fibres by the exhaust process in fast golden-yellow shades.

Similar useful reactive dyes are also obtained by using, instead of the starting dye 2-(4'-amino-2'-ureidophenylazo)-naphthalene-3,6,8-trisulfonic acid used above, the azo dyes obtainable from the diazo and coupling components listed in the table below and otherwise repeating the procedure as described above:

Diazo components:
2-Naphthylamine-1,5-disulfonic acid
2-Naphthylamine-4,8-disulfonic acid
2-Naphthylamine-5,7-disulfonic acid
2-Naphthylamine-6,8-disulfonic acid
2-Naphthylamine-1,5,7-trisulfonic acid
2-Naphthylamine-4,6,8-trisulfonic acid
Aniline-2,5-disulfonic acid.

Coupling components:
Aniline, N-methylaniline
3-Aminoanisole, 3-aminotoluene
2-Amino-4-acetaminotoluene
2-Amino-4-acetaminoanisole
3-Aminoacetanilide
3-Amino-4-methoxytoluene
3-Toluidine
1-Naphthylamine-5-sulfonic acid
1-Naphthylamine-7-sulfonic acid
1-Naphthylamine-8-sulfonic acid
2-Aminotoluene
2-Aminoanisole
2,5-Dimethylaniline
2-Methoxy-5-methylaniline
2,5-Dimethoxyaniline
o-Phenetidine
m-Phenetidine
3-Aminophenylurea.

EXAMPLE 90

50.3 parts of the dye 2-amino-5-hydroxy-6-(2',5'-disulfophenylazo)-naphthalene-7-sulfonic acid are dissolved in 800 ml of water under neutral conditions, and the solution is cooled to 0° to 5°. At this temperature, 18.5 parts of cyanuric chloride are added, during which the pH of the reaction solution is maintained at 6–6.5 by the simultaneous addition of 2N sodium hydroxide solution. After the condensation reaction is completed, a solution of 5.4 parts of p-phenylenediamine in 100 parts of water is run in, and the mixture is stirred for 1 hour at a temperature between 30°–40°, during which the pH is maintained between 5 and 7 by dropwise addition of sodium hydroxide solution. The pH is then brought to 4 with hydrochloric acid. 29 parts of

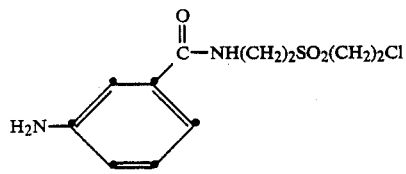

are then added as a powder. The mixture is heated to 70° C. and maintained at this temperature for 3 hours, during which the pH is maintained between 4 and 5 by dropwise addition of sodium hydroxide solution. 10% of potassium chloride are then added, the mixture is allowed to cool to 20°-55° with stirring and filtered. About 200 parts of a dye paste, which are dried at 50°-55° in vacuo, are obtained. The reactive dye prepared has the following structure:

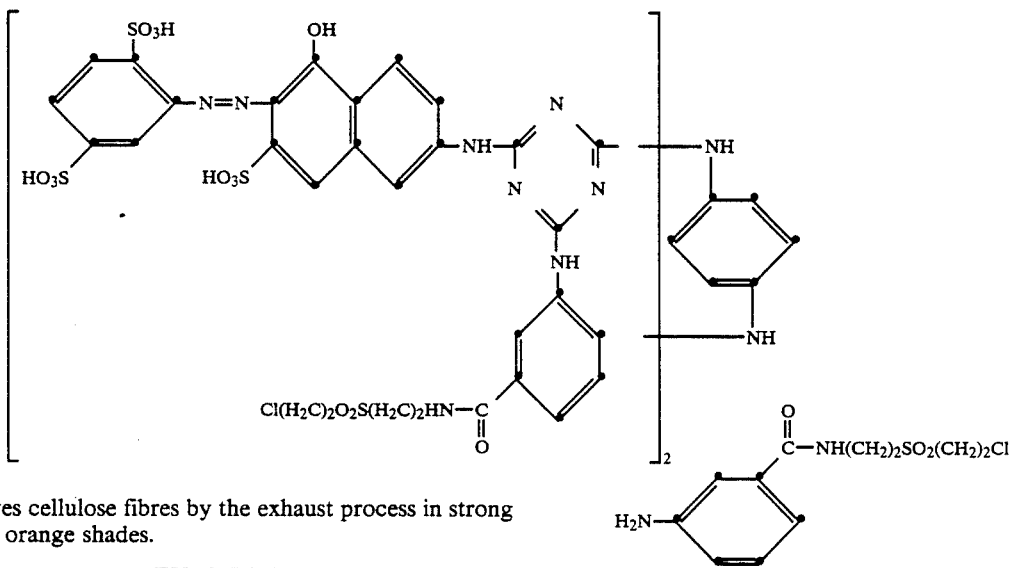

It dyes cellulose fibres by the exhaust process in strong pure orange shades.

EXAMPLE 91

50.3 parts of the dye 2-amino-5-hydroxy-6-(2',5'-disulfophenylazo)-naphthalene-7-sulfonic acid are dissolved in 800 ml of water under neutral conditions, and the solution is cooled to 0° to 5°. At this temperature, 18.5 parts of cyanuric chloride are added, during which the pH of the reaction solution is maintained at 6-6.5 by the simultaneous addition of 2N sodium hydroxide solution. After the condensation reaction is completed, a solution of 5.4 parts of m-phenylenediamine in 100 parts of water is run in, and the mixture is stirred for 1 hour at a temperature between 30°-40°, during which the pH is maintained between 5 and 7 by dropwise addition of sodium hydroxide solution. The pH is then brought to 4 with hydrochloric acid. 29 parts of are then added as a powder. The mixture is heated to 70° C. and maintained at this temperature for 3 hours, during which the pH is maintained between 4 and 5 by dropwise addition of sodium hydroxide solution. 10% of potassium chloride are then added, the mixture is allowed to cool to 20°-55° with stirring and is filtered. About 200 parts of a dye paste, which are dried at 50°-55° in vacuo, are obtained. The reactive dye prepared has the following structure:

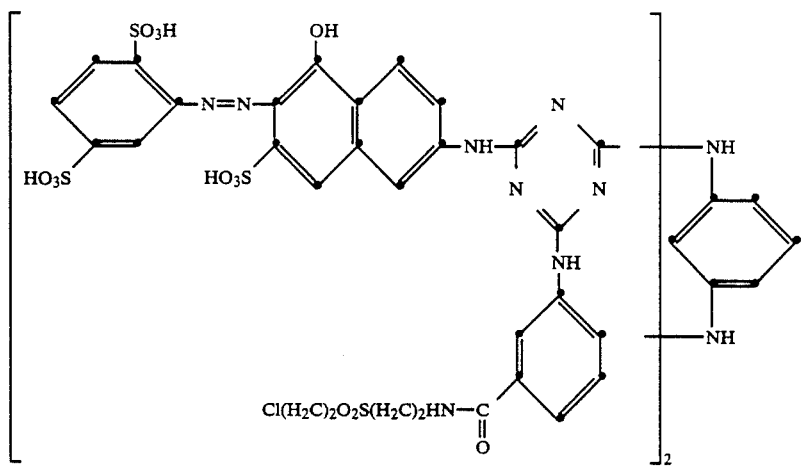

It dyes cellulose fibres by the exhaust process in strong pure orange shades.

EXAMPLE 92

50.3 parts of the dye 2-amino-5-hydroxy-6-(2',5'-disulfophenylazo)-naphthalene-7-sulfonic acid are dissolved in 800 ml of water under neutral conditions, and the solution is cooled to 0° to 5°. At this temperature, 18.5 parts of cyanuric chloride are added, during which the pH of the reaction solution is maintained at 6–6.5 by the simultaneous addition of 2N sodium hydroxide solution. After the condensation reaction is completed, a solution of 5.4 parts of m-phenylenediamine in 100 parts of water is run in, and the mixture is stirred for 1 hour at a temperature between 30°–40°, during which the pH is maintained between 5 and 7 by dropwise addition of sodium hydroxide solution. The pH is then brought to 4 with hydrochloric acid. 29 parts of

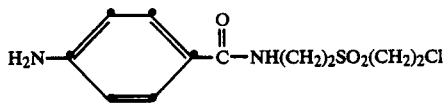

are then added as a powder. The mixture is heated to 70° C. and maintained at this temperature for 3 hours, during which the pH is maintained between 4 and 5 by dropwise addition of sodium hydroxide solution. 10% of potassium chloride are then added, the mixture is allowed to cool to 20°–55° with stirring and is filtered. About 200 parts of a dye paste, which are dried at 50°–55° in vacuo, are obtained. The reactive dye prepared has the following structure:

4-Aminotoluene-3-sulfonic acid
5-Chloro-2-aminotoluene-3-sulfonic acid
3-Chloro-2-aminotoluene-5-sulfonic acid
6-Chloro-3-aminotoluene-4-sulfonic acid
2-Chloro-4-aminotoluene-5-sulfonic acid
2-Chloro-4-aminotoluene-6-sulfonic acid
4-Nitro-2-aminotoluene-6-sulfonic acid
6-Nitro-4-aminotoluene-2-sulfonic acid
3-Amino-1,2-dimethylbenzene-4-sulfonic acid
4-Amino-1,3-dimethylbenzene-5-sulfonic acid
4-Amino-1,3-dimethylbenzene-6-sulfonic acid
2-Aminoanisole-4-sulfonic acid
4-Aminoanisole-2-sulfonic acid
4-Aminoanisole-3-sulfonic acid
4-Chloro-2-aminoanisole-5-sulfonic acid
4-Aminophenetole-2-sulfonic acid
4-Aminophenetole-3-sulfonic acid
2-Aminophenetole-4-sulfonic acid
4-Aminobenzene-1,3-disulfonic acid
2-Aminotoluene-3,4-disulfonic acid
2-Aminotoluene-3,5-disulfonic acid
Aniline
4-Aminotoluene
4-Aminoanisole
4-Aminochlorobenzene

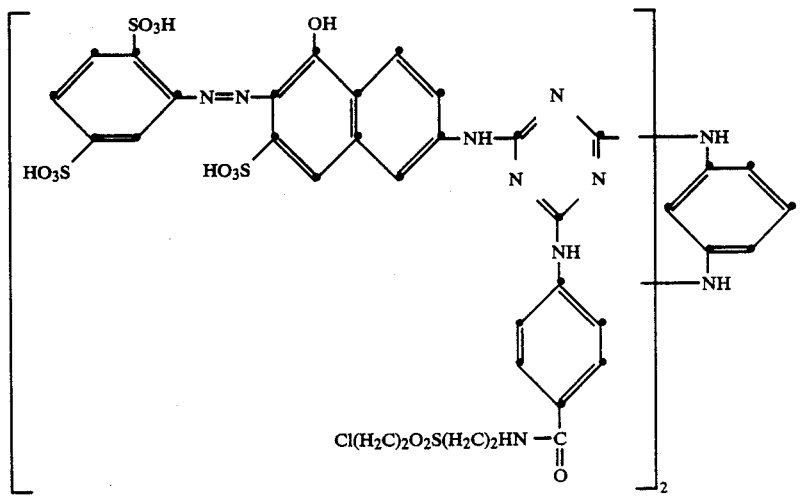

It dyes cellulose fibres by the exhaust process in strong pure orange shades.

The procedure as described is repeated, except that 2-aminobenzene-1,4-disulfonic acid is replaced by an equimolar amount of one of the diazo components mentioned below to give similarly useful dyes according to the invention:
2-Aminobenzenesulfonic acid
3-Aminobenzenesulfonic acid
4-Aminobenzenesulfonic acid
2-Naphthylamine-1,5-disulfonic acid
5-Chloro-2-aminobenzenesulfonic acid
6-Chloro-2-aminobenzenesulfonic acid
5-Nitro-2-aminobenzenesulfonic acid
4-Chloro-3-aminobenzenesulfonic acid
6-Chloro-3-aminobenzenesulfonic acid
3-Chloro-4-aminobenzenesulfonic acid
2-Aminotoluene-4-sulfonic acid
2-Aminotoluene-5-sulfonic acid
3-Aminotoluene-6-sulfonic acid
4-Aminotoluene-2-sulfonic acid
2-Aminochlorobenzene
2-Naphthylamine-1-sulfonic acid
2-Naphthylamine-5-sulfonic acid
2-Naphthylamine-6-sulfonic acid
2-Naphthylamine-7-sulfonic acid
2-Naphthylamine-8-sulfonic acid
2-Naphthylamine-1,7-disulfonic acid
2-Naphthylamine-3,6-disulfonic acid
2-Naphthylamine-3,7-disulfonic acid
2-Naphthylamine-4,7-disulfonic acid
2-Naphthylamine-5,7-disulfonic acid
2-Naphthylamine-6,8-disulfonic acid
2-Naphthylamine-1,5,7-trisulfonic acid
2-Naphthylamine-3,6,8-trisulfonic acid
2-Naphthylamine-4,6,8-trisulfonic acid.

The procedure as described above is repeated, except that the 2-acetamino-5-naphthol-7-sulfonic acid used as coupling component for the preparation of the starting dye is replaced by equimolar amounts of the acetyl compound of one of the coupling components mentioned below to give similarly z useful dyes according to the invention:

2-Amino-8-naphthol-6-sulfonic acid, 2-methylamino-8-naphthol-6-sulfonic acid, 2-carboxymethylamino-8-naphthol-6-sulfonic acid, 2-β-sulfoethylamino-8-naphthol-6-sulfonic acid, 2-isopropylamino-8-naphthol-6-sulfonic acid, 2-methylamino-5-naphthol-7-sulfonic acid, 2-ethylamino-5-naphthol-7-sulfonic acid, 2-n-butylamino-5-naphthol-7-sulfonic acid, 2-amino-8-naphthol-4-sulfonic acid, 2-amino-5-naphthol-4,7-disulfonic acid, 1-amino-5-naphthol-7-sulfonic acid, 2-amino-5-naphthol-1,7-disulfonic acid.

EXAMPLE 93

46.7 parts of the monoazo dye which is obtained by coupling diazotized p-aminobenzoic acid onto 1-amino-8-naphthol-3,6-disulfonic acid in an alkaline medium are dissolved in the form of the sodium salt in 600 parts of water and added to an ice-cold suspension of 18.5 parts of cyanuric chloride. The mixture is stirred at a temperature between 0° and 5° and neutralized by the gradual addition of a dilute sodium hydroxide solution. After the condensation reaction is completed, a solution of 40 parts of

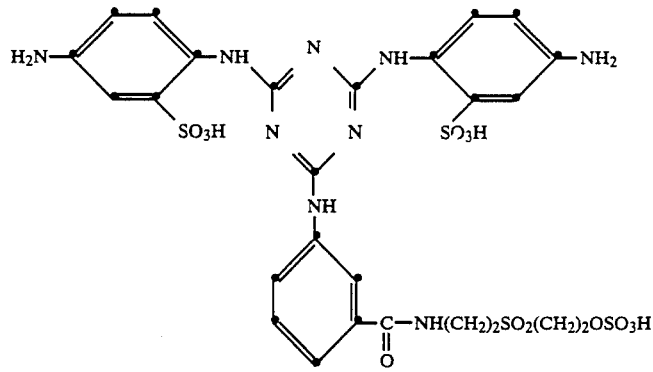

in 100 parts of water is run in, and the mixture is stirred at a temperature between 30°–40° for one hour, during which the pH is maintained between 5 and 7 by dropwise addition of sodium hydroxide solution. After the condensation reaction is completed, the pH is brought to 8 with sodium carbonate, and the disazo dye is precipitated by the addition of acetone, filtered off and dried.

The resulting disazo dye of the formula

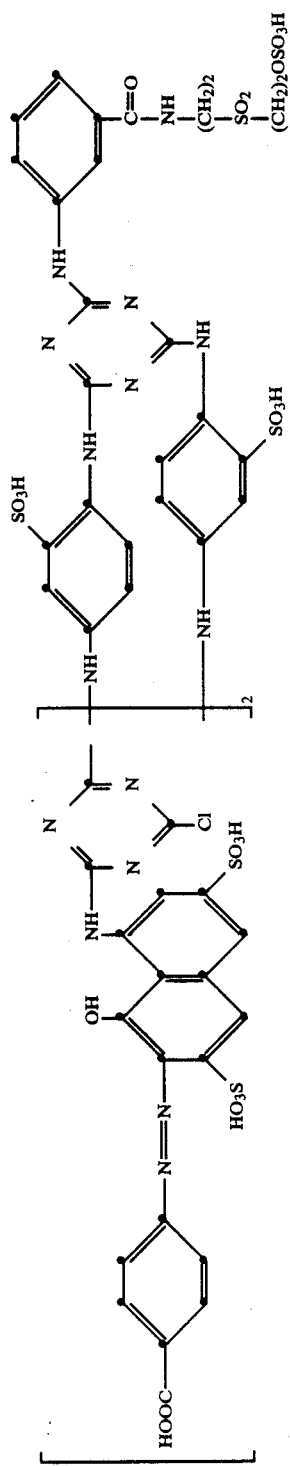

dyes cellulose fibres by the exhaust process in the presence of electrolytes from an alkaline bath in strong pure bluish red shades.

EXAMPLE 94

18.5 parts of cyanuric chloride are dissolved in 110 parts of acetone and poured onto 250 parts of ice with vigorous stirring. A solution of 63 parts of the dye of the following structure

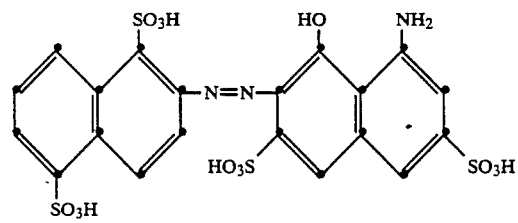

is run in at 0°. 50 parts of 2-normal sodium carbonate solution are then added dropwise, giving a pH of 6–6.5. 32.6 parts of

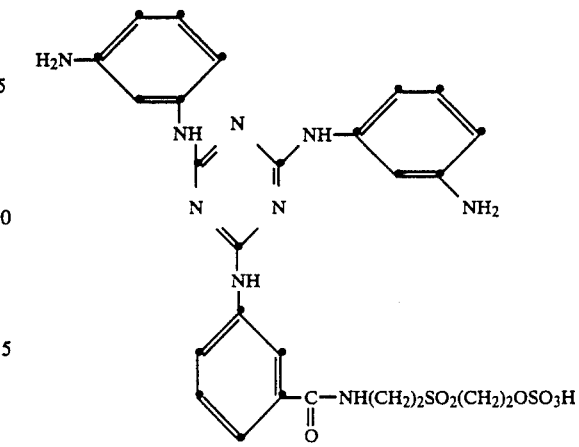

are then added as a powder. The mixture is heated to 40° C. within half an hour and maintained at this temperature for 3 hours. At the same time, 100 parts of 2-normal sodium carbonate solution are added dropwise at a pH of 6.0–6.5. The dye is precipitated by adding 20% of potassium chloride, allowed to cool to 20°–55° with stirring and filtered. About 235 parts of a dye paste, which are dried at 50°–55° in vacuo, are obtained. The reactive dye prepared has the following structure:

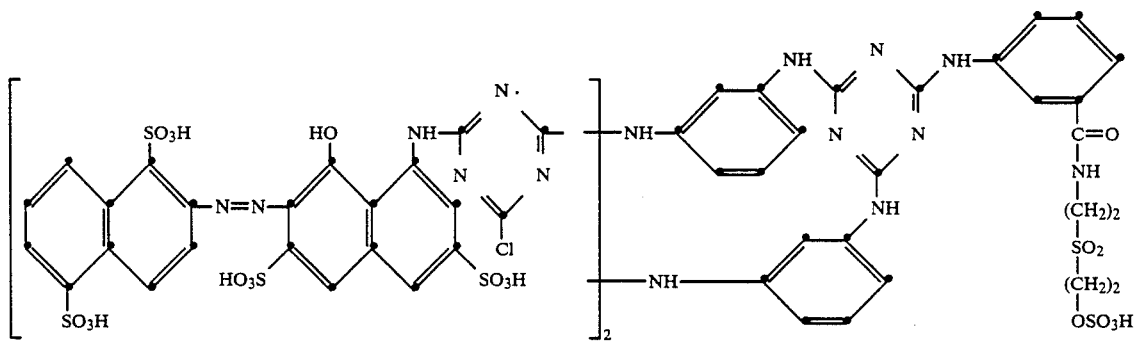

It dyes cellulose fibres by the exhaust process in fast strong red shades.

Table 2 below contains further examples of dyes obtained according to Example 93 by reacting the monoazo dyes of column I with cyanuric chloride and then with diamines of column II in a ratio of 2:2:1.

TABLE 2

| Example | Monoazo dye I | Diamine II | Hue |
|---|---|---|---|
| 95 | Orthanilic acid → 1,8-aminonaphthol-3,6-disulfonic acid | $H_2N-(CH_2)_2-NH$ ... $NH(CH_2)_2NH_2$ ... $NH$-C$_6$H$_4$-C(=O)-NH(CH$_2$)$_2$SO$_2$(CH$_2$)$_2$OSO$_3$H (triazine-linked) | Red |

TABLE 2-continued

| Example | Monoazo dye I | Diamine II | Hue |
|---|---|---|---|
| 96 | Orthanilic acid → 1,8-aminonaphthol-3,6-disulfonic acid | [structure: triazine with two 2-sulfo-4-amino-phenylamino groups and a 3-(CONH(CH$_2$)$_2$SO$_2$CH=CH$_2$)phenylamino group] | Red |
| 97 | Orthanilic acid → 1,8-aminonaphthol-3,6-disulfonic acid | [structure: triazine with two 4-aminophenylamino groups and a 3-(CONH(CH$_2$)$_2$SO$_2$(CH$_2$)$_2$OSO$_3$H)phenylamino group] | Red |
| 98 | Orthanilic acid → 1,8-aminonaphthol-3,6-disulfonic acid | [structure: triazine with a 4-aminophenylamino group, a 3-aminophenylamino group, and a 3-(CONH(CH$_2$)$_2$SO$_2$(CH$_2$)$_2$OSO$_3$H)phenylamino group] | Red |
| 99 | Orthanilic acid → 1,8-aminonaphthol-3,6-disulfonic acid | [structure: triazine with two 4-aminophenylamino groups and a 4-(CONH(CH$_2$)$_2$SO$_2$(CH$_2$)$_2$OSO$_3$H)phenylamino group] | Red |

TABLE 2-continued

| Example | Monoazo dye I | Diamine II | Hue |
|---|---|---|---|
| 100 | Orthanilic acid → 1,8-aminonaphthol-3,6-disulfonic acid | Structure with triazine core, H$_2$N—(CH$_2$)$_3$—NH and NH(CH$_2$)$_3$—NH$_2$ substituents, linked via NH to phenyl ring bearing O=C—NH(CH$_2$)$_2$SO$_2$(CH$_2$)$_2$OSO$_3$H | Red |
| 101 | Orthanilic acid → 1,8-aminonaphthol-4,6-disulfonic acid | Structure with triazine core, H$_2$N—(CH$_2$)$_2$—NH and NH(CH$_2$)$_2$NH$_2$ substituents, linked via NH to phenyl ring bearing C(=O)—NH(CH$_2$)$_2$SO$_2$(CH$_2$)$_2$OSO$_3$H | Red |
| 102 | Orthanilic acid → 1,8-aminonaphthol-4,6-disulfonic acid | Structure with triazine core linked to two H$_2$N-phenyl-SO$_3$H groups via NH, and to phenyl ring bearing C(=O)—NH(CH$_2$)$_2$SO$_2$CH=CH$_2$ | Red |
| 103 | Orthanilic acid → 1,8-aminonaphthol-4,6-disulfonic acid | Structure with triazine core linked to two H$_2$N-phenyl-NH groups, and to phenyl ring bearing C(=O)—NH(CH$_2$)$_2$SO$_2$(CH$_2$)$_2$OSO$_3$H | Red |

TABLE 2-continued

| Example | Monoazo dye I | Diamine II | Hue |
|---|---|---|---|
| 104 | Orthanilic acid → 1,8-aminonaphthol-4,6-disulfonic acid | Diamine structure: triazine with two 4-amino-2-methylanilino groups and one 3-[C(O)NH(CH$_2$)$_2$SO$_2$(CH$_2$)$_2$OSO$_3$H]anilino group | Red |
| 105 | Orthanilic acid → 1,8-aminonaphthol-4,6-disulfonic acid | Diamine structure: triazine with two 4-amino-2-chloroanilino groups and one 4-[C(O)NH(CH$_2$)$_2$SO$_2$(CH$_2$)$_2$OSO$_3$H]anilino group | Red |
| 106 | Orthanilic acid → 1,8-aminonaphthol-4,6-disulfonic acid | Diamine structure: triazine with two H$_2$N—(CH$_2$)$_3$—NH— groups and one 4-[C(O)NH(CH$_2$)$_2$SO$_2$(CH$_2$)$_2$OSO$_3$H]anilino group | Red |
| 107 | Aniline-2,5-disulfonic acid → 1,8-aminonaphthol-3,6-disulfonic acid | Diamine structure: triazine with two H$_2$N—(CH$_2$)$_2$—NH— groups and one 3-[C(O)NH(CH$_2$)$_2$SO$_2$(CH$_2$)$_2$OSO$_3$H]anilino group | Red |

TABLE 2-continued

| Example | Monoazo dye I | Diamine II | Hue |
|---|---|---|---|
| 108 | Aniline-2,5-disulfonic acid → 1,8-aminonaphthol-3,6-disulfonic acid | H₂N–⟨SO₃H⟩–NH–C(=N)–NH–⟨SO₃H⟩–NH₂, with central triazine bearing –NH–C₆H₄–C(O)–NH(CH₂)₂SO₂CH=CH₂ | Red |
| 109 | Aniline-2,5-disulfonic acid → 1,8-aminonaphthol-3,6-disulfonic acid | H₂N–⟨⟩–NH–C(=N)–NH–⟨⟩–NH₂, with central triazine bearing –NH–C₆H₄–C(O)–NH(CH₂)₂SO₂(CH₂)₂OSO₃H | Red |
| 110 | Aniline-2,5-disulfonic acid → 1,8-aminonaphthol-3,6-disulfonic acid | H₂N–⟨⟩–NH–C(=N)–NH–⟨⟩–NH₂ (meta), with central triazine bearing –NH–C₆H₄–C(O)–NH(CH₂)₂SO₂(CH₂)₂OSO₃H | Red |
| 111 | Aniline-2,4-disulfonic acid → 1,8-aminonaphthol-3,6-disulfonic acid | H₂N–⟨⟩–NH–C(=N)–NH–⟨⟩–NH₂, with central triazine bearing –NH–C₆H₄–C(O)–NH(CH₂)₂SO₂(CH₂)₂OSO₃H | Red |

TABLE 2-continued
| Example | Monoazo dye I | Diamine II | Hue |
|---|---|---|---|
| 112 | Aniline-2,4-disulfonic acid → 1,8-aminonaphthol-3,6-disulfonic acid | 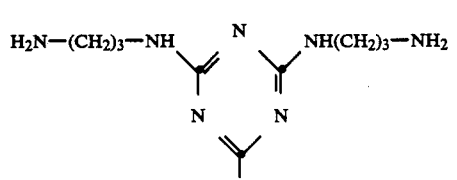 | Red |
| 113 | Aniline-2,5-disulfonic acid → 1,8-aminonaphthol-4,6-disulfonic acid | 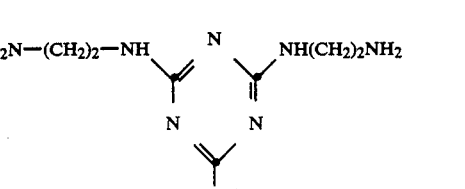 | Bright red |
| 114 | Aniline-2,5-disulfonic acid → 1,8-aminonaphthol-4,6-disulfonic acid | 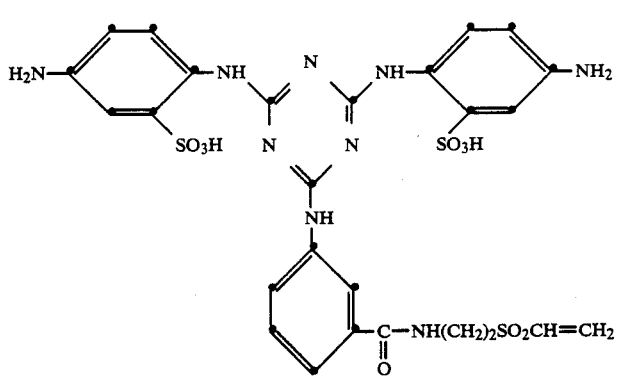 | Bright red |
| 115 | Aniline-2,5-disulfonic acid → 1,8-Aminonaphthol-4,6-disulfonic acid | 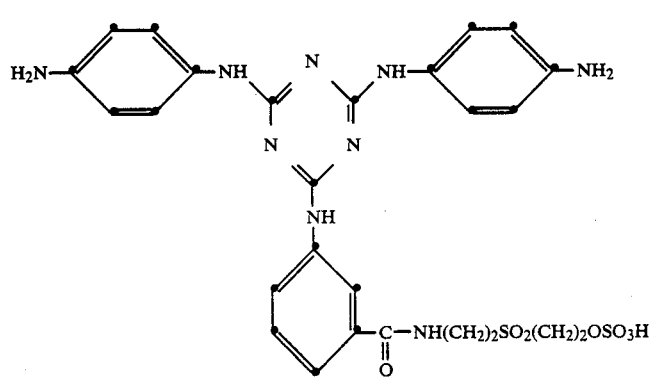 | Bright red |

TABLE 2-continued

| Example | Monoazo dye I | Diamine II | Hue |
|---|---|---|---|
| 116 | Aniline-2,5-disulfonic acid → 1,8-aminonaphthol-4,6-disulfonic acid | (triazine with two 4-aminoanilino groups and one 3-substituted anilino group bearing —C(O)—NH(CH$_2$)$_2$SO$_2$(CH$_2$)$_2$OSO$_3$H) | Bright red |
| 117 | Aniline-2,4-disulfonic acid → 1,8-Aminonaphthol-4,6-disulfonic acid | (triazine with two 4-aminoanilino groups and one 4-substituted anilino group bearing —C(O)—NH(CH$_2$)$_2$SO$_2$(CH$_2$)$_2$OSO$_3$H) | Bright red |
| 118 | Aniline-2,4-disulfonic acid → 1,8-Aminonaphthol-4,6-disulfonic acid | (triazine with two H$_2$N—(CH$_2$)$_3$—NH— groups and one 4-substituted anilino group bearing —C(O)—NH(CH$_2$)$_2$SO$_2$(CH$_2$)$_2$OSO$_3$H) | Bright red |
| 119 | 2-Naphthylamine-1,5-disulfonic acid → 1,8-aminonaphthol-3,6-disulfonic acid | (triazine with two H$_2$N—(CH$_2$)$_2$—NH— groups and one 3-substituted anilino group bearing —C(O)—NH(CH$_2$)$_2$SO$_2$(CH$_2$)$_2$OSO$_3$H) | Bluish red |

TABLE 2-continued

| Example | Monoazo dye I | Diamine II | Hue |
|---|---|---|---|
| 120 | 2-Naphthylamine-1,5-disulfonic acid → 1,8-aminonaphthol-3,6-disulfonic acid | (structure shown) | Bluish red |
| 121 | 2-Naphthylamine-1,5-disulfonic acid → 1,8-aminonaphthol-3,6-disulfonic acid | (structure shown) | Bluish red |
| 122 | 2-Naphthylamine-1,6-disulfonic acid → 1,8-aminonaphthol-3,6-disulfonic acid | (structure shown) | Bluish red |
| 123 | 2-Naphthylamine-1,6-disulfonic acid → 1,8-aminonaphthol-3,6-disulfonic acid | (structure shown) | Bluish red |

Example 120 Diamine II: triazine bearing two (4-amino-2-sulfophenyl)amino groups and one 3-[NH-C(=O)-NH(CH$_2$)$_2$SO$_2$CH=CH$_2$]phenylamino group.

Example 121 Diamine II: triazine bearing two (4-aminophenyl)amino groups and one 3-[NH-C(=O)-NH(CH$_2$)$_2$SO$_2$(CH$_2$)$_2$OSO$_3$H]phenylamino group.

Example 122 Diamine II: triazine bearing (4-aminophenyl)amino, (3-aminophenyl)amino, and 3-[NH-C(=O)-NH(CH$_2$)$_2$SO$_2$(CH$_2$)$_2$OSO$_3$H]phenylamino groups.

Example 123 Diamine II: triazine bearing two (4-aminophenyl)amino groups and one 4-[NH-C(=O)-NH(CH$_2$)$_2$SO$_2$(CH$_2$)$_2$OSO$_3$H]phenylamino group.

TABLE 2-continued
| Example | Monoazo dye I | Diamine II | Hue |
|---|---|---|---|
| 124 | 2-Naphthylamine-1,6-disulfonic acid → 1,8-aminonaphthol-3,6-disulfonic acid | 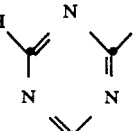 | Bluish red |
| 125 | 2-Naphthylamine-1,5-disulfonic acid → 1,8-aminonaphthol-4,6-disulfonic acid | 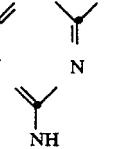 | Red |
| 126 | 2-Naphthylamine-1,5-disulfonic acid → 1,8-aminonaphthol-4,6-disulfonic acid | 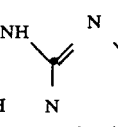 | Red |
| 127 | 2-Naphthylamine-1,5-disulfonic acid → 1,8-aminonaphthol-4,6-disulfonic acid | 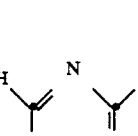 | Red |

TABLE 2-continued

| Example | Monoazo dye I | Diamine II | Hue |
|---|---|---|---|
| 128 | 2-Naphthylamine-1,6-disulfonic acid → 1,8-aminonaphthol-4,6-disulfonic acid | Triazine with two 4-aminoanilino substituents and one 3-[-C(O)-NH(CH$_2$)$_2$SO$_2$(CH$_2$)$_2$OSO$_3$H]anilino substituent | Red |
| 129 | 2-Naphthylamine-1,6-disulfonic acid → 1,8-aminonaphthol-4,6-disulfonic acid | Triazine with two 4-aminoanilino substituents and one 4-[-C(O)-NH(CH$_2$)$_2$SO$_2$(CH$_2$)$_2$OSO$_3$H]anilino substituent | Red |
| 130 | 2-Naphthylamine-1,6-disulfonic acid → 1,8-aminonaphthol-4,6-disulfonic acid | Triazine with two H$_2$N—(CH$_2$)$_2$—NH— substituents and one 4-[-C(O)-NH(CH$_2$)$_2$SO$_2$(CH$_2$)$_2$OSO$_3$H]anilino substituent | Red |
| 131 | Metanilic acid → 1,8-aminonaphthol-3,6-disulfonic acid | Triazine with two H$_2$N—(CH$_2$)$_2$—NH— substituents and one 3-[-C(O)-NH(CH$_2$)$_2$SO$_2$(CH$_2$)$_2$OSO$_3$H]anilino substituent | Red |

TABLE 2-continued

| Example | Monoazo dye I | Diamine II | Hue |
|---|---|---|---|
| 132 | Metanilic acid → 1,8-aminonaphthol-3,6-disulfonic acid | H₂N—⟨C₆H₃(SO₃H)⟩—NH—C(=N—)—N=C(—NH—⟨C₆H₃(SO₃H)⟩—NH₂) with N=C—NH—⟨C₆H₄⟩—C(O)—NH(CH₂)₂SO₂CH=CH₂ | Red |
| 133 | Metanilic acid → 1,8-aminonaphthol-3,6-disulfonic acid | H₂N—⟨C₆H₄⟩—NH—C(=N—)—N=C(—NH—⟨C₆H₄⟩—NH₂) with N=C—NH—⟨C₆H₄⟩—C(O)—NH(CH₂)₂SO₂(CH₂)₂OSO₃H | Red |
| 134 | Metanilic acid → 1,8-aminonaphthol-3,6-disulfonic acid | H₂N—⟨C₆H₄⟩—NH—C(=N—)—N=C(—NH—⟨C₆H₃(NH₂)⟩) with N=C—NH—⟨C₆H₄⟩—C(O)—NH(CH₂)₂SO₂(CH₂)₂OSO₃H | Red |
| 135 | Metanilic acid → 1,8-aminonaphthol-4,6-disulfonic acid | H₂N—⟨C₆H₄⟩—NH—C(=N—)—N=C(—NH—⟨C₆H₄⟩—NH₂) with N=C—NH—⟨C₆H₄⟩—C(=O)—NH(CH₂)₂SO₂(CH₂)₂OSO₃H | Red |

TABLE 2-continued

| Example | Monoazo dye I | Diamine II | Hue |
|---|---|---|---|
| 136 | Metanilic acid → 1,8-aminonaphthol-4,6-disulfonic acid | (structure with H$_2$N—(CH$_2$)$_3$—NH— and —NH(CH$_2$)$_3$—NH$_2$ groups on a triazine ring, linked via NH to a phenyl group bearing O=C—NH(CH$_2$)$_2$SO$_2$(CH$_2$)$_2$OSO$_3$H) | Red |
| 137 | Anthranilic acid → 1,8-aminonaphthol-3,6-disulfonic acid | (structure with H$_2$N—(CH$_2$)$_2$—NH— and —NH(CH$_2$)$_2$NH$_2$ groups on a triazine ring, linked via NH to a phenyl group bearing C(=O)—NH(CH$_2$)$_2$SO$_2$(CH$_2$)$_2$OSO$_3$H) | Red |
| 138 | Anthranilic acid → 1,8-aminonaphthol-3,6-disulfonic acid | (triazine linked to two aminophenyl-SO$_3$H groups and to a phenyl group bearing C(=O)—NH(CH$_2$)$_2$SO$_2$CH=CH$_2$) | Red |
| 139 | Anthranilic acid → 1,8-aminonaphthol-3,6-disulfonic acid | (triazine linked to two H$_2$N—C$_6$H$_4$—NH— groups and to a phenyl group bearing C(=O)—NH(CH$_2$)$_2$SO$_2$(CH$_2$)$_2$OSO$_3$H) | Red |

TABLE 2-continued

| Example | Monoazo dye I | Diamine II | Hue |
|---|---|---|---|
| 140 | Anthranilic acid → 1,8-aminonaphthol-3,6-disulfonic acid | (structure shown) | Red |
| 141 | Anthranilic acid → 1,8-aminonaphthol-4,6-disulfonic acid | (structure shown) | Red |
| 142 | Anthranilic acid → 1,8-aminonaphthol-4,6-disulfonic acid | (structure shown) | Red |

Similarly useful reactive dyes are also obtained by using, instead of the starting dye 1-amino-8-hydroxy-2′,7-azonaphthalene-1′,3,5′,6-tetrasulfonic acid used above, the azo dyes obtainable from the diazo and coupling components listed in the table below and otherwise repeating the procedure as described above.

Diazo components:
2-Aminobenzenesulfonic acid, 3-aminobenzenesulfonic acid, 4-aminobenzenesulfonic acid, 5-chloro-2-aminobenzenesulfonic acid, 6-chloro-2-aminobenzenesulfonic acid, 5-nitro-2-aminobenzenesulfonic acid, 4-chloro-3-aminobenzenesulfonic acid, 6-chloro-3-aminobenzenesulfonic acid, 3-chloro-4-aminobenzenesulfonic acid, 2-aminotoluene-4-sulfonic acid, 2-aminotoluene-5-sulfonic acid, 3-aminotoluene-6-sulfonic acid, 4-aminotoluene-2-sulfonic acid, 4-aminotoluene-3-sulfonic acid, 5-chloro-2-aminotoluene-3-sulfonic acid, 3-chloro-2-aminotoluene-5-sulfonic acid, 6-chloro-3-aminotoluene-4-sulfonic acid, 2-chloro-4-aminotoluene-5-sulfonic acid, 2-chloro-4-aminotoluene-6-sulfonic acid, 4-nitro-2-aminotoluene-6-sulfonic acid, 6-nitro-4-aminotoluene-2-sulfonic acid, 3-amino-1,2-dimethylbenzene-4-sulfonic acid, 4-amino-1,3-dimethylbenzene-5-sulfonic acid, 4-amino-1,3-dimethylbenzene-6-sulfonic acid, 2-aminoanisole-4-sulfonic acid, 4-aminoanisole-2-sulfonic acid, 4-aminoanisole-3-sulfonic acid, 4-chloro-2-aminoanisole-5-sulfonic acid, 4-aminophenetole-2-sulfonic acid, 4-aminophenetole-3-sulfonic acid, 2-aminophenetole-4-sulfonic acid, 4-aminobenzene-1,3-disulfonic acid, 2-aminobenzene-1,4-disulfonic acid, 2- aminotoluene-3,4-disulfonic acid, 2-aminotoluene-3,5-disulfonic acid, aniline, 4-aminotoluene, 4-aminoanisole, 4-aminochlorobenzene, 2-aminobenzenesulfonic acid, 2-naphthylamine-1-sulfonic acid, 2-naphthylamine-5-sulfonic acid, 2-naphthylamine-6-sulfonic acid, 2-naphthylamine-7-sulfonic acid, 2-naphthylamine-8-sulfonic acid, 2-naphthylamine-1,7-disulfonic acid, 2-naphthylamine-3,6-disulfonic acid, 2-naphthylamine-3,7-disulfonic acid, 2-naphthylamine-4,7-disulfonic acid, 2-naphthylamine-4,8-disulfonic acid, 2-naphthylamine-5,7-disulfonic acid, 2-naphthylamine-6,8-disulfonic acid, 2-naphthylamine-1,5,7-trisulfonic acid, 2-naphthylamine-3,6,8-trisulfonic acid, 2-naphthylamine-4,6,8-trisulfonic acid, 1-naphthylamine-4-sulfonic acid, 1-naphthylamine-5-sulfonic acid, 1-naphthylamine-6-sulfonic acid, 1-naphthylamine-7-sulfonic acid, 1-naphthylamine-3,6-disulfonic acid, 1-naphthylamine-3,7-disulfonic acid, 1-naphthylamine-3,8-disulfonic acid, 1-naphthylamine-4,6-disulfonic acid, 1-naphthylamine-4,7-disulfonic acid, 1-naphthylamine-4,8-disulfonic acid, 1-naphthylamine-5,7-disulfonic acid, 1-naphthylamine-6,8-disulfonic acid, 1-naphthylamine-2,4,6-trisulfonic acid, 1-naphthylamine-3,6,8-trisulfonic acid, 1-naphthylamine-4,6,8-trisulfonic acid, 1-amino-4-β-chloroethylsulfonylbenzene, 1-amino-3-vinylsulfonylbenzene, 1-amino-2-bromo-4-β-sulfatoethylsulfonylbenzene, 1-amino-4-β-sulfatoethylsulfonylbenzene-2-sulfonic acid, 1-amino-3-δ-(β-chloroethylsulfonyl)-butyrylbenzene-6-sulfonic acid, 2-amino-8-β-sulfatoethylsulfonylnaphthalene, 2-amino-6-β-sulfatoethylsulfonylnaphthalene-1-sulfonic acid, 2-amino-8-vinylsulfonylnaphthalene-6-sulfonic acid.

Coupling components:
1-Amino-8-naphthol-4,6-disulfonic acid, 1-amino-8-naphthol-4-sulfonic acid, 1-amino-8-naphthol-6-sulfonic acid, 1-amino-8-naphthol-3,5-disulfonic acid, 1-(4'-aminobenzoylamino)-8-naphthol-3,6- or -4,6-disulfonic acid, 1-(3'-aminobenzoylamino)-8-naphthol-3,6- or -4,6-disulfonic acid.

EXAMPLE 143

63.1 parts of 1-[2'-sulfo-4'-(4",6"-dichloro-1",3",5"-triazine-2"-ylamino)-phenyl]-4-(2'''-sulfophenylazo)-5-pyrazolone-3-carboxylic acid are dissolved in water at a pH of 6.8–7.2. 27 parts of the compound of the formula

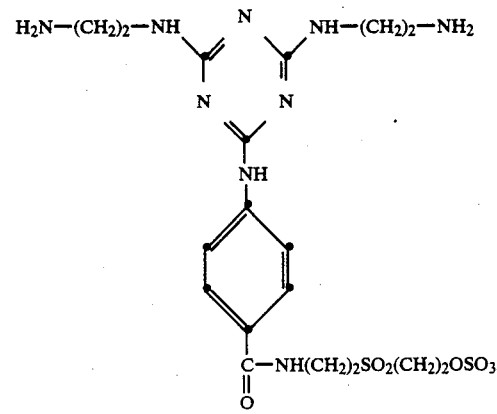

are added to this solution at about 25°, and the mixture is heated to 35°–40°. The pH starts to drop. After reaching a value of about 3.5, it is maintained in a range from 3.5 to 4.5 by the addition of about 11 g of sodium carbonate in portions. The reaction is completed after about 3 hours, which is evident from the cessation of alkali consumption. The dye solution is then brought to a pH of 7.0 by the addition of disodium hydrogen phosphate. The dye obtained of the structure:

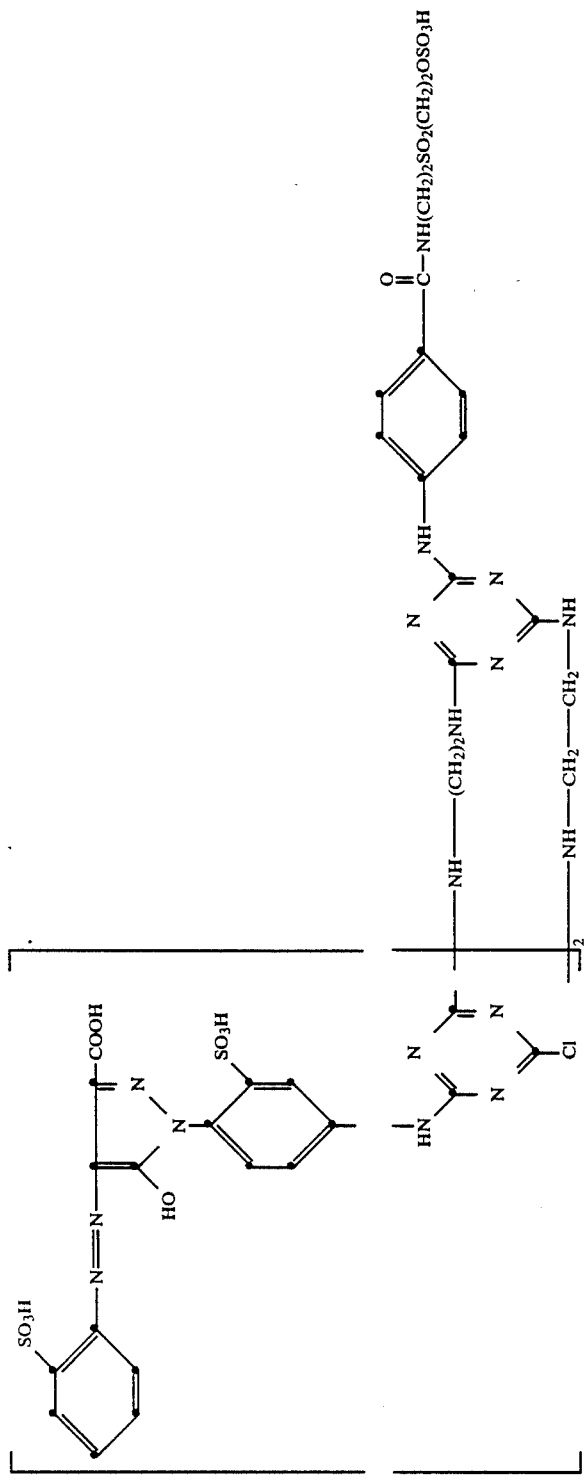

can be isolated by salting out or spray-drying. It dyes cellulose fibres in pure greenish yellow shades.

Similarly useful reactive dyes according to the invention are obtained by using, instead of the intermediate dye used above, the condensation products of the azo dyes obtainable from the diazo and coupling components listed in the table below together with cyanuric chloride and otherwise repeating the procedure as described above.

Diazo components:
3-Aminobenzenesulfonic acid
4-Aminobenzenesulfonic acid
5-Chloro-2-aminobenzenesulfonic acid
2,5-Dichloro-4-aminobenzenesulfonic acid
2-Aminotoluene-4-sulfonic acid
4-Aminotoluene-3-sulfonic acid
2-Aminoanisole-4-sulfonic acid
4-Aminobenzene-1,3-disulfonic acid
2-Aminobenzene-1,4-disulfonic acid
2-Aminotoluene-3,5-disulfonic acid
2-Aminonaphthalene-1,5-disulfonic acid
2-Aminonaphthalene-4,8-disulfonic acid
2-Aminonaphthalene-6,8-disulfonic acid
2-Aminonaphthalene-1-sulfonic acid
2-Aminonaphthalene-6-sulfonic acid
4-β-Ethylsulfonylaniline
3-β-Chloroethylsulfonylaniline
2-Methoxy-4-β-sulfatoethylsulfonylaniline
2-Methoxy-5-methyl-4-β-sulfatoethylsulfonylaniline
2-Bromo-4-β-sulfatoethylsulfonylaniline
2-Sulfo-4-β-sulfatoethylsulfonylaniline
2-Methoxy-5-β-sulfatoethylsulfonylaniline
2-Sulfo-5-δ-(β-chloroethylsulfonylbutyryl)-aminoaniline
2-Amino-8-β-sulfatoethylsulfonylnaphthalene-5-sulfonic acid
2-Amino-8-β-sulfatoethylsulfonylnaphthalene
2-Amino-6-vinylsulfonylnaphthalene-1-sulfonic acid.

Coupling components:
1-(3'-Amino-6'-sulfophenyl)-3-methyl-5-pyrazolone
1-(4'-Amino-3'-sulfophenyl)-3-methyl-5-pyrazolone
1-(4'-Amino-2'-sulfophenyl)-3-methyl-5-pyrazolone
1-(3'-Amino-6'-sulfophenyl)-5-pyrazolone-3-carboxylic acid
1-(4'-Amino-3'-sulfophenyl)-5-pyrazolone-3-carboxylic acid
1-(3'-Amino-5'-sulfo-6'-methylphenyl)-5-pyrazolone-3-carboxylic acid
1-(2'-Methyl-3'-amino-5'-sulfophenyl)-5-pyrazolone-3-carboxylic acid
1-(2'-Methyl-3'-amino-5'-sulfophenyl)-3-methyl-5-pyrazolone
1-(3'-Amino-5'-sulfo-6'-methylphenyl)-3-methyl-5-pyrazolone
1-(4'-Amino-2',5'-disulfophenyl)-5-pyrazolone-3-carboxylic acid.

EXAMPLE 144

54.5 parts of the dye 2-(4'-amino-2'-ureidophenylazo)-naphthalene-3,6,8-trisulfonic acid are dissolved in 250 parts of water under neutral conditions. This neutral solution is added to a suspension prepared from 18.5 parts of cyanuric chloride in acetone and water. The temperature is maintained at 0° to 3° by cooling with ice. During the course of the acylation reaction, 9 g of bicarbonate are added at such a rate that the pH remains between 5.5 and 7. When no more starting dye can be detected in the chromatogram, 32.6 parts of the compound of the formula

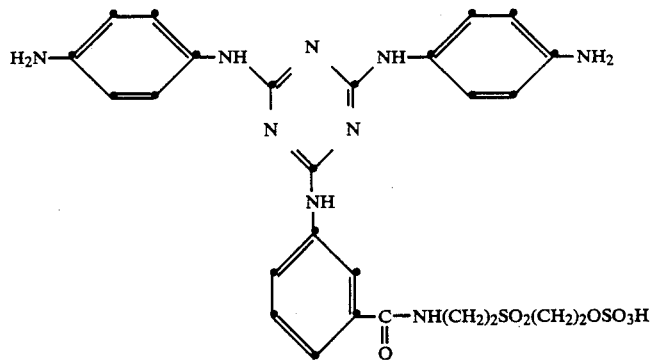

are added, and the mixture is heated to 30°. The pH is maintained within the limits from 6.5 to 7.0 by the addition of a further 18 g of bicarbonate. The reaction is completed, when no more alkali is consumed. The resulting dye of the formula:

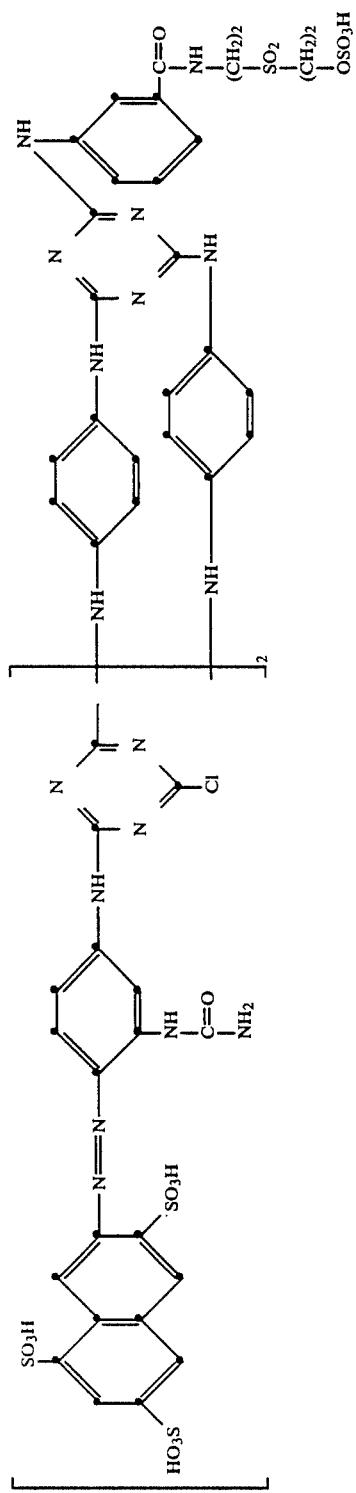

is precipitated by the addition of sodium chloride and dried at 50° to 55° in vacuo. It dyes cellulose fibres by the exhaust process in strong pure golden-yellow shades.

Similarly useful reactive dyes are also obtained by using, instead of the starting dye 2-(4'-amino-2'-ureidophenylazo)naphthalene-3,6,8-trisulfonic acid used above, the azo dyes obtainable from the diazo and coupling components listed in the table below and otherwise repeating the procedure described above:

Diazo components:
2-Naphthylamine-1,5-disulfonic acid
2-Naphthylamine-4,8-disulfonic acid
2-Naphthylamine-5,7-disulfonic acid
2-Naphthylamine-6,8-disulfonic acid
2-Naphthylamine-1,5,7-trisulfonic acid
2-Naphthylamine-4,6,8-trisulfonic acid
Aniline-2,5-disulfonic acids.

Coupling components:
Aniline, N-methylaniline
3-Aminoanisole, 3-aminotoluene
2-Amino-4-acetaminotoluene
2-Amino-4-acetaminoanisole
3-Aminoacetanilide
3-Amino-4-methoxytoluene
3-Toluidine
1-Naphthylamine-5-sulfonic acid
1-Naphthylamine-7-sulfonic acid
1-Naphthylamine-8-sulfonic acid
2-Aminotoluene
2-Aminoanisole
2,5-Dimethylaniline
2-Methoxy-5-methylaniline
2,5-Dimethoxyaniline
o-Phenetidine
m-Phenetidine
3-Aminophenylurea.

EXAMPLE 145

50.3 parts of the dye 2-amino-5-hydroxy-6-(2',5'-disulfophenylazo)-naphthalene-7-sulfonic acid are dissolved in 800 ml of water under neutral conditions, and the solution is cooled to 0° to 5°. At this temperature, 14 parts of cyanuric fluoride are added, during which the reaction solution is maintained at a pH of 6–6.5 by simultaneous addition of 2N sodium hydroxide solution. After the addition of 27.0 parts of the compound of the formula

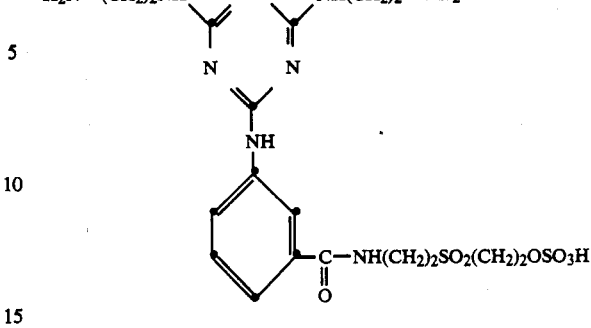

the temperature is increased to 20° to 25° C., and the pH is maintained at 5.5–6.5. Reaction time about 4 hours.

The dye is precipitated by adding 10% of sodium chloride and 10% of potassium chloride to the neutral solution and is filtered. The resulting paste is dried at 40° to 50° in vacuo. The reactive dye thus prepared has the following structure:

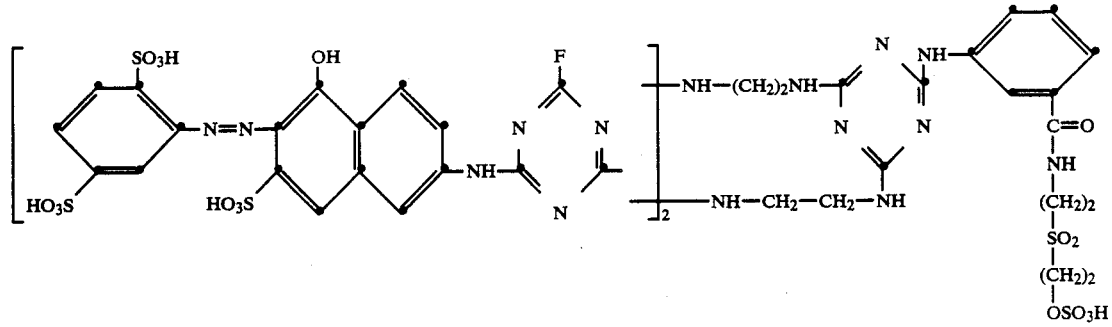

It dyes cellulose fibres by the exhaust process in strong pure orange shades.

The procedure as described is repeated, using equimolar amounts of one of the diazo components mentioned below instead of 2-aminobenzene-1,4-disulfonic acid, to give similarly useful dyes according to the invention:
2-Aminobenzenesulfonic acid
3-Aminobenzenesulfonic acid
4-Aminobenzenesulfonic acid
2-Naphthylamine-1,5-disulfonic acid
5-Chloro-2-aminobenzenesulfonic acid
6-Chloro-2-aminobenzenesulfonic acid
5-Nitro-2-aminobenzenesulfonic acid
4-Chloro-3-aminobenzenesulfonic acid
6-Chloro-3-aminobenzenesulfonic acid
3-Chloro-4-aminobenzenesulfonic acid
2-Aminotoluene-4-sulfonic acid
2-Aminotoluene-5-sulfonic acid
3-Aminotoluene-6-sulfonic acid
4-Aminotoluene-2-sulfonic acid
4-Aminotoluene-3-sulfonic acid
5-Chloro-2-aminotoluene-3-sulfonic acid
3-Chloro-2-aminotoluene-5-sulfonic acid
6-Chloro-3-aminotoluene-4-sulfonic acid
2-Chloro-4-aminotoluene-5-sulfonic acid
2-Chloro-4-aminotoluene-6-sulfonic acid
4-Nitro-2-aminotoluene-6-sulfonic acid
6-Nitro-4-aminotoluene-2-sulfonic acid
3-Amino-1,2-dimethylbenzene-4-sulfonic acid 4-Amino-1,3-dimethylbenzene-5-sulfonic acid
4-Amino-1,3-dimethylbenzene-6-sulfonic acid
2-Aminoanisole-4-sulfonic acid
4-Aminoanisole-2-sulfonic acid
4-Aminoanisole-3-sulfonic acid
4-Chloro-2-aminoanisole-5-sulfonic acid
4-Aminophenetole-2-sulfonic acid
4-Aminophenetole-3-sulfonic acid
2-Aminophenetole-4-sulfonic acid
4-Aminobenzene-1,3-disulfonic acid
2-Aminotoluene-3,4-disulfonic acid
2-Aminotoluene-3,5-disulfonic acid
Aniline
4-Aminotoluene
4-Aminoanisole
4-Aminochlorobenzene
2-Aminochlorobenzene
2-Naphthylamine-1-sulfonic acid
2-Naphthylamine-5-sulfonic acid
2-Naphthylamine-6-sulfonic acid
2-Naphthylamine-7-sulfonic acid
2-Naphthylamine-8-sulfonic acid
2-Naphthylamine-1,7-disulfonic acid
2-Naphthylamine-3,6-disulfonic acid
2-Naphthylamine-3,7-disulfonic acid
2-Naphthylamine-4,7-disulfonic acid
2-Naphthylamine-5,7-disulfonic acid
2-Naphthylamine-6,8-disulfonic acid
2-Naphthylamine-1,5,7-trisulfonic acid
2-Naphthylamine-3,6,8-trisulfonic acid
2-Naphthylamine-4,6,8-trisulfonic acid.

The procedure as described above is repeated, using equimolar amounts of the acetyl compound of one of the coupling components mentioned below instead of 2-acetamino-5-naphthol-7-sulfonic acid used as coupling component for the preparation of the starting dye, to give similarly useful dyes according to the invention:
2-Amino-8-naphthol-6-sulfonic acid, 2-methylamino-8-naphthol-6-sulfonic acid, 2-carboxymethylamino-8-naphthol-6-sulfonic acid, 2-β-sulfoethylamino-8-naphthol-6-sulfonic acid, 2-isopropylamino-8-naphthol-6-sulfonic acid, 2-methylamino-5-naphthol-7-sulfonic acid, 2-ethylamino-5-naphthol-7-sulfonic acid, 2-n-butylamino-5-naphthol-7-sulfonic acid, 2-amino-8-naphthol-4-sulfonic acid, 2-amino-5-naphthol-4,7-disulfonic acid, 1-amino-5-naphthol-7-sulfonic acid, 2-amino-5-naphthol-1,7-disulfonic acid.

The dyes Nos. 146 to 156 listed in the table below can also be prepared analogously to the processes described in Examples 1 to 145. The dyes dye cellulose fibres in the hues listed in the third column.

| Example | | Hue |
|---|---|---|
| 146 | 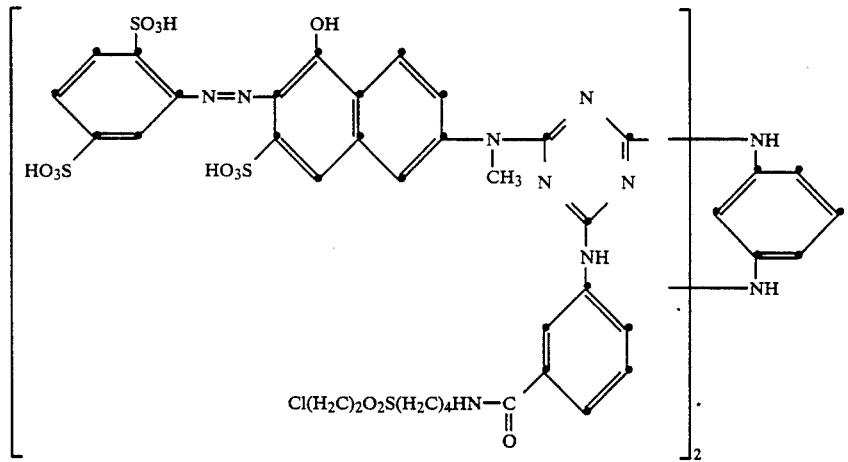 | |
| 147 | 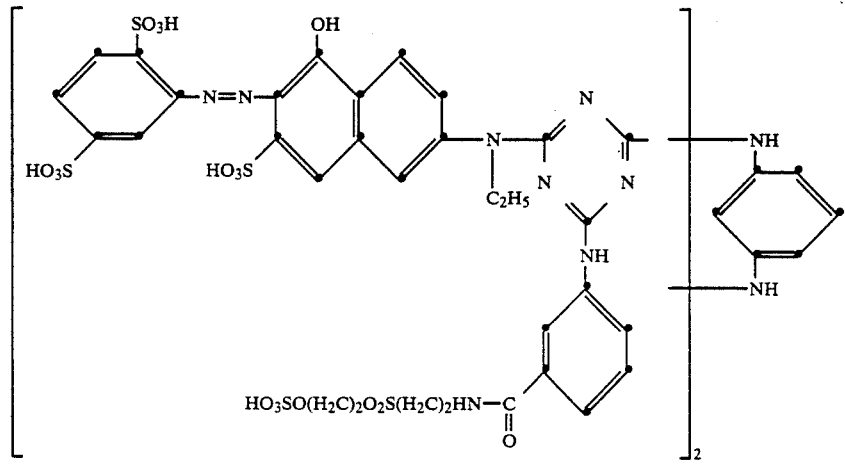 | |

| Example | Hue |
|---|---|
| 148 | |
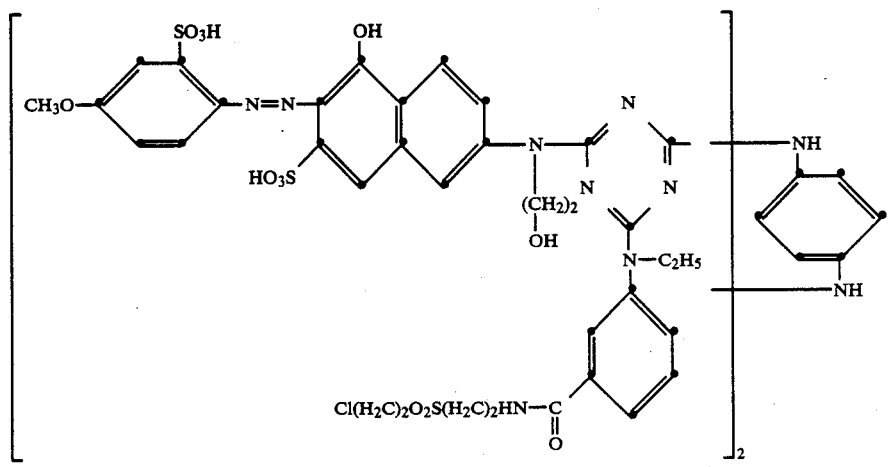
149
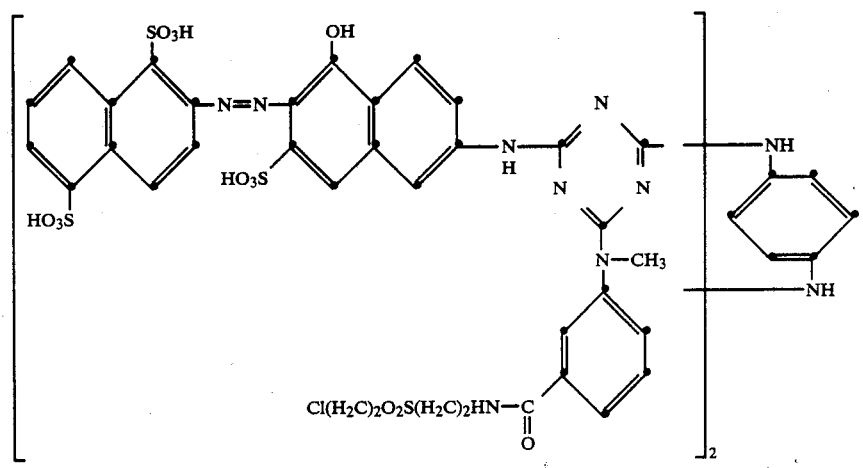
150
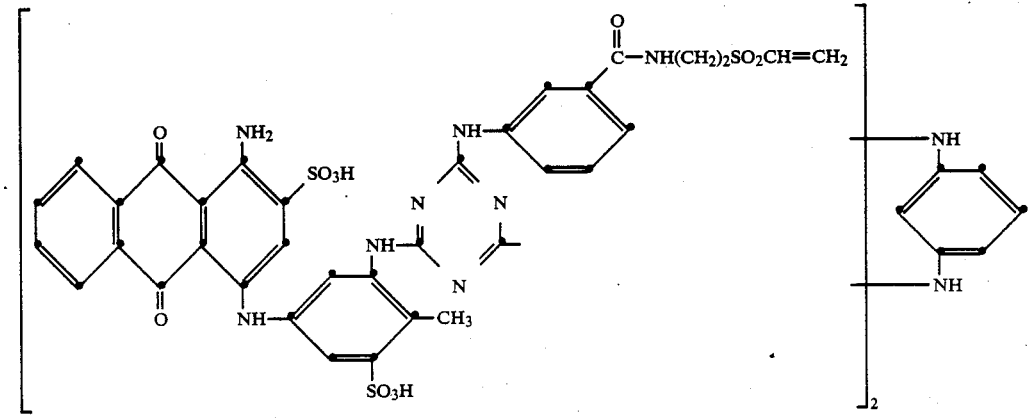
151

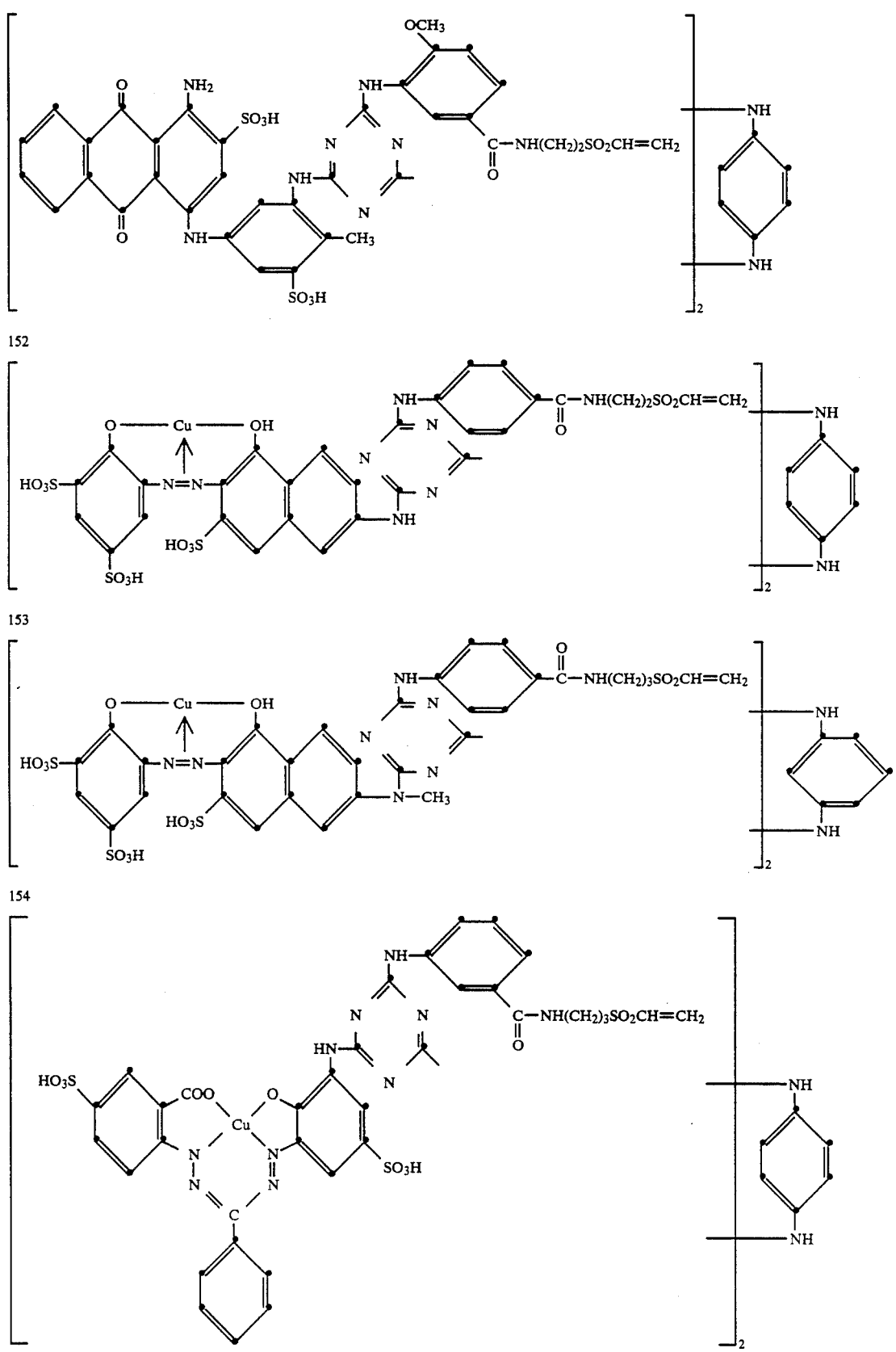

| Example | Hue |
|---|---|

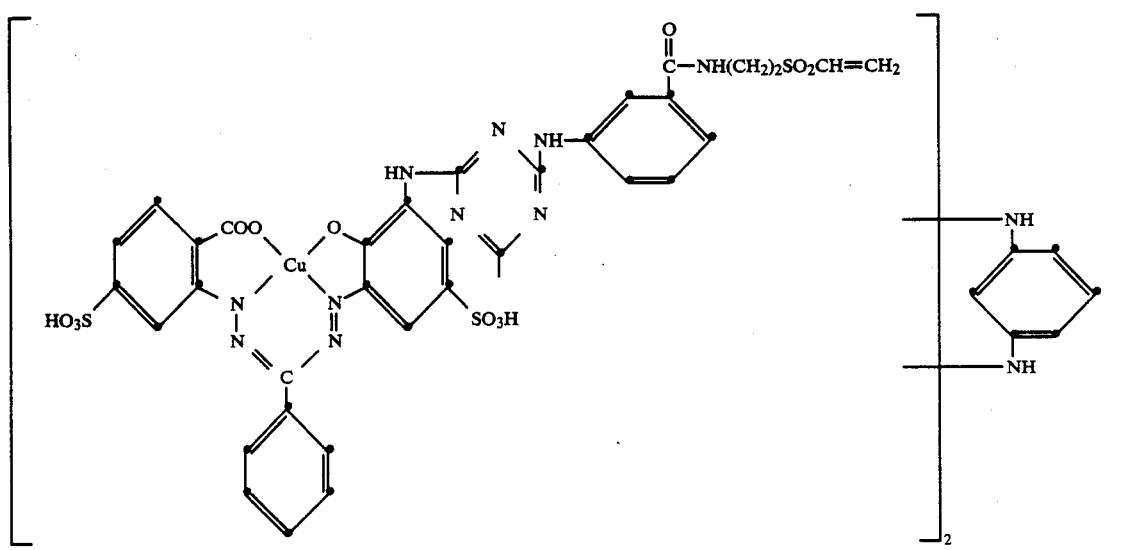

156

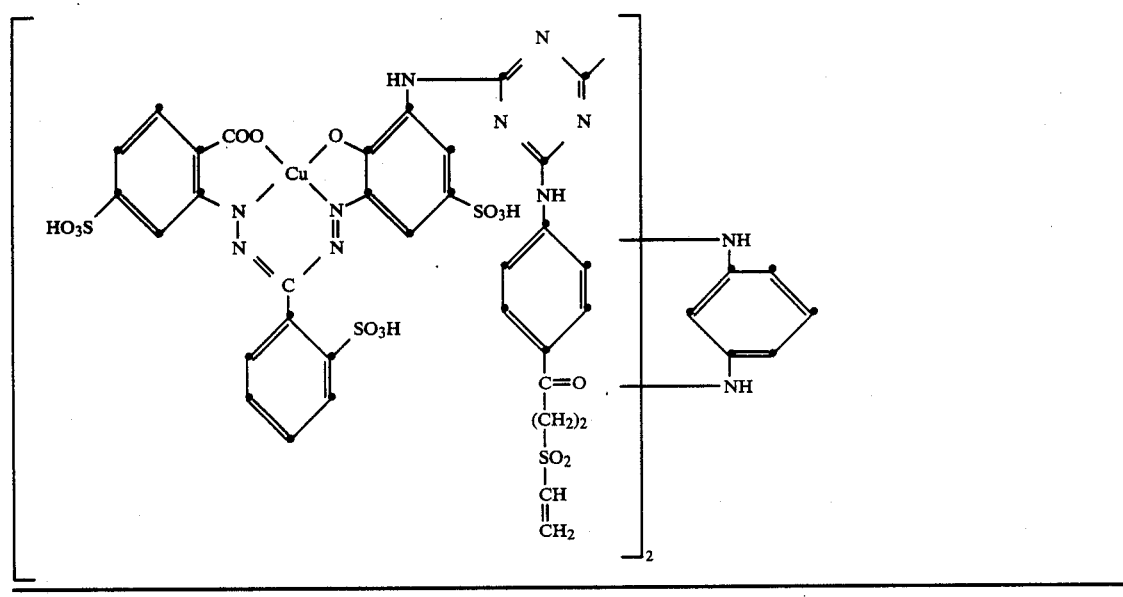

DYEING PROCEDURE I 2 parts of the dye obtained according to Example 1 are dissolved in 400 parts of water; 1500 parts of a solution containing 53 g of sodium chloride per liter are then added. This dyeing bath is entered at 40° C. with 100 parts of a cotton fabric. After 45 minutes, 100 parts of a solution containing 16 g of sodium hydroxide and 20 g of calcined sodium carbonate per liter are added. The temperature of the dyeing bath is maintained at 40° C. for another 45 minutes. The dyed goods are then rinsed, soaped with a nonionogenic detergent at boiling temperature for one quarter of an hour, rinsed again and dried.

DYEING PROCEDURE II 2 parts of the reactive dye obtained according to Example 1 are dissolved in 400 parts of water; 1500 parts of a solution containing 53 g of sodium chloride per liter are then added. This dyeing bath is entered at 35° C. with 100 parts of a cotton fabric. After 20 minutes, 100 parts of a solution containing 16 g of sodium hydroxide and 20 g of calcined sodium carbonate per liter are added. The temperature of the dyeing bath is maintained at 35° C. for another 15 minutes. The temperature is then increased to 60° C. over a period of 20 minutes. The temperature is maintained at 60° C. for another 35 minutes. The dyed goods are then rinsed, soaped with a nonionogenic detergent at boiling temperature for one quarter of an hour, rinsed again and dried.

DYEING PROCEDURE III 8 parts of the reactive dye obtained according to Example 1 are dissolved in 400 parts of water; 1400 parts of a solution containing 100 g of sodium sulfate per liter are then added. This dyeing bath is entered at 25°

C. with 100 parts of a cotton fabric. After 10 minutes, 200 parts of a solution containing 150 g of trisodium phosphate per liter are added. The temperature of the dyeing bath is then increased to 60° C. over a period of 10 minutes. The temperature is maintained at 60° C. for another 90 minutes. The dyed goods are then rinsed, soaped with a nonionogenic detergent at boiling temperature for one quarter of an hour, rinsed again and dried.

DYEING PROCEDURE IV 4 parts of the reactive dye obtained according to Example 1 are dissolved in 50 parts of water. 50 parts of a solution containing 5 g of sodium hydroxide and 20 g of calcined sodium carbonate per liter are added. The resulting solution is used to pad a cotton fabric in such a manner that its weight increases by 70%, and the fabric is then wrapped around a batching roller. In this form, the cotton fabric is stored at room temperature for 3 hours. The dyed goods are then rinsed, soaped with a nonionogenic detergent at boiling temperature for one quarter of an hour, rinsed again and dried.

DYEING PROCEDURE V 6 parts of the reactive dye obtained according to Example 1 are dissolved in 50 parts of water. 50 parts of a solution containing 16 g of sodium hydroxide and 0.04 liter of waterglass (38° Bé) per liter are added. The resulting solution is used to pad a cotton fabric in such a manner that its weight increases by 70%, and the fabric is then wrapped around a batching roller. In this form, the cotton fabric is stored at room temperature for 10 hours. The dyed goods are then rinsed, soaped with a nonionogenic detergent at boiling temperature for one quarter of an hour, rinsed again and dried.

DYEING PROCEDURE VI 2 parts of the reactive dye obtained according to Example 1 are dissolved in 100 parts of water with the addition of 0.5 part of sodium m-nitrobenzenesulfonate. The resulting solution is used to impregnate a cotton fabric in such a manner that its weight increases by 75%, and the fabric is then dried. The fabric is then impregnated with a solution at 20° C. containing 4 g of sodium hydroxide and 300 g of sodium chloride per liter, squeezed down to a weight increase of 75%, the dyeing is steamed at 100° to 102° C. for 30 seconds, rinsed, soaped in a 0.3% boiling solution of a nonionogenic detergent for one quarter of an hour, rinsed and dried.

DYEING PROCEDURE VII 2 parts of the dye of Example 2, 160 parts of sodium sulfate and, as a buffer, 4 parts of $Na_2HPO_4 \cdot 12 H_2O$ and 1 part of $KH_2PO_4$ are added to 2,000 parts of water to give a dyeing bath having a pH of 7. 100 parts of a knitted fabric made of non-mercerized cotton are dipped into this bath. Over a period of 30 minutes, the temperature of the bath is brought to 130° C., and dyeing is carried out at this temperature for 60 minutes. The dyed fabric is then removed from the bath, washed with water, soaped, washed again with water and dried. This gives a deep red dyeing.

DYEING PROCEDURE VIII 2 parts of the dye of Example 2, 2 parts of the known water-insoluble anthraquinone dye of the formula

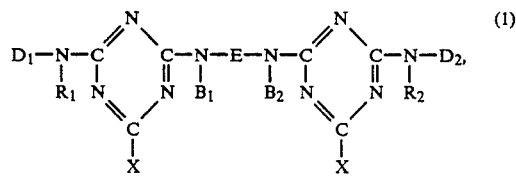

120 parts of sodium sulfate and, as a buffer, 4 parts of $Na_2HPO_4 \cdot 12H_2O$ and 1 part of $KH_2PO_4$ are added to 2,000 parts of water. 100 parts of a polyester/cotton mixed fabric (50:50) are dipped into the dyeing bath thus obtained, and over a period of 30 minutes the temperature of the bath is brought to 130° C., at which temperature dyeing is carried out for 60 minutes. The dyed fabric is then removed from the bath, washed with water, soaped, washed again with water and dried. This gives a levelly dyed red fabric. The dyeing bath is maintained at a pH of 7 before and during the dyeing.

PRINTING PROCEDURE I 3 parts of the reactive dye according to Example 1 are quickly stirred into 100 parts of a stock thickener containing 50 parts of a 5% sodium alginate thickener, 27.8 parts of water, 20 parts of urea, 1 part of sodium m-nitrobenzenesulfonate and 1.2 parts of sodium bicarbonate. The printing paste thus obtained is used to print a cotton fabric, after which the printed material is dried and steamed at 102° C. in saturated steam for 2 minutes. The printed fabric is then rinsed, if necessary soaped at the boiling temperature and rinsed again, and subsequently dried.

PRINTING PROCEDURE II 5 parts of the reactive dye obtained according to Example 1 are quickly stirred into 100 parts of a stock thickener containing 50 parts of a 5% sodium alginate thickener, 36.5 parts of water, 10 parts of urea, 1 part of sodium m-nitrobenzenesulfonate and 2.5 parts of sodium bicarbonate. The printing paste thus obtained, the stability of which conforms to the technical requirements, is used to print a cotton fabric, after which the printed material obtained is dried and steamed at 102° C. in saturated steam for 8 minutes. The printed fabric is then rinsed, if necessary soaped at the boiling temperature and rinsed again, and subsequently dried.

What is claimed is:

1. A reactive dye of the formula $$D_1-N-C\underset{R_1}{\overset{N}{\underset{\|}{=}}}\underset{N}{\overset{}{\underset{\|}{C}}}-N-E-N-\underset{B_1}{\overset{}{\underset{\|}{C}}}\underset{B_2}{\overset{N}{\underset{\|}{=}}}\underset{N}{\overset{}{\underset{\|}{C}}}-N-D_2, \quad (1)$$
$$\underset{X}{\overset{}{\underset{|}{C}}} \qquad \underset{X}{\overset{}{\underset{|}{C}}}$$

in which $D_1$ and $D_2$, independently of one another, are each a radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye; $R_1$, $R_2$, $B_1$ and $B_2$, independently of one another, are hydrogen or alkyl having 1 to 4 carbon atoms, which is unsubstituted or substituted by halogen, hydroxyl, cyano, $C_1$-$C_4$alkoxy, $C_1$-$C_4$alkoxycarbonyl, carboxyl, sulfamoyl, sulfo or sulfato; X is fluorine, chlorine, bromine, sulfo, $C_1$-$C_4$alkylsulfonyl, phenylsulfonyl or carboxypyridinium, and E is a radical of the formula

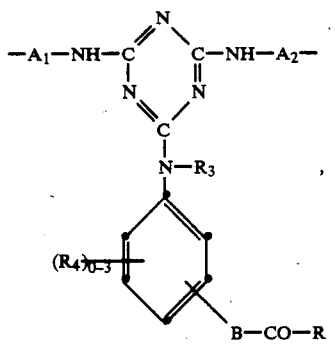 (2)

in which $A_1$ and $A_2$, independently of one another, are each a radical of the formula

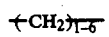 (3a)

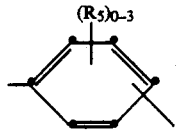 (3b)

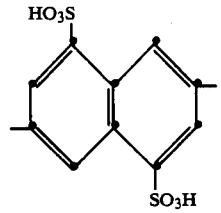 (3c)

or

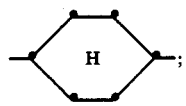 (3d)

or

X is a radical of the formula

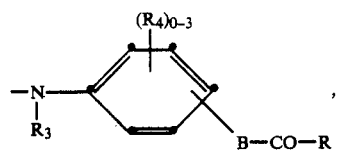 (4)

and E is a radical of the formula (3a), (3b), (3c) or (3d);

and $R_3$ is hydrogen or alkyl having 1 to 4 carbon atoms, which is unsubstituted or substituted by halogen, hydroxyl, cyano, $C_1$-$C_4$alkoxy, $C_1$-$C_4$alkoxycarbonyl, carboxyl, sulfamoyl, sulfo or sulfato; $R_4$ and $R_5$, independently of one another, are 0 to 3 substituents from the group consisting of $C_1$-$C_4$alkyl, $C_1$-$C_4$alkoxy, halogen, carboxyl and sulfo; B is a direct bond or —$(CH_2)_n$— or —O—$(CH_2)_n$—, n is 1 to 6; R is a radical of the formula

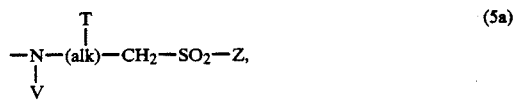 (5a)

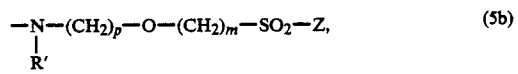 (5b)

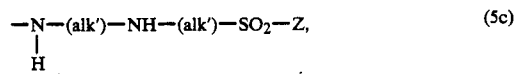 (5c)

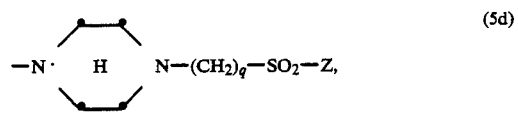 (5d)

Z is β-sulfatoethyl, β-thiosulfatoethyl, β-phosphatoethyl, β-acyloxyethyl, β-halogenoethyl or vinyl; alk is alkylene having 1 to 6 carbon atoms or branched isomers thereof; T is hydrogen, chlorine, bromine, fluorine, hydroxyl, sulfato, alkanoyloxy having 2 to 4 carbon atoms, cyano, carboxyl, alkoxycarbonyl having 1 to 5 carbon atoms, carbamoyl, or —$SO_2$—Z in which Z is as defined above; V is hydrogen or alkyl having 1 to 4 carbon atoms, which is unsubstituted or substituted by carboxyl, sulfo, carbamoyl, N-methylcarbamoyl, N-ethylcarbamoyl, N,N-dimethylcarbamoyl, N,N-diethylcarbamoyl, cyano, acetyl, propionyl, butyryl, methoxycarbonyl, ethoxycarbonyl, propyloxycarbonyl, sulfamoyl, N-methylsulfamoyl, N-ethylsulfamoyl, N,N-dimethylsulfamoyl, N,N-diethylsulfamoyl, methylsulfonyl, ethylsulfonyl, propylsulfonyl, alkoxy having 1 to 2 carbon atoms, halogen or hydroxyl; or is

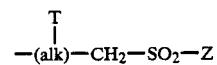

in which Z, alk and T are as defined above; R' is hydrogen or $C_1$-$C_6$alkyl; alk', independently of one another, is polymethylene having 2 to 6 carbon atoms or branched isomers thereof; and m is 1 to 6, p is 1 to 6 and q is 1 to 6.

2. A reactive dye according to claim 1 of the formula

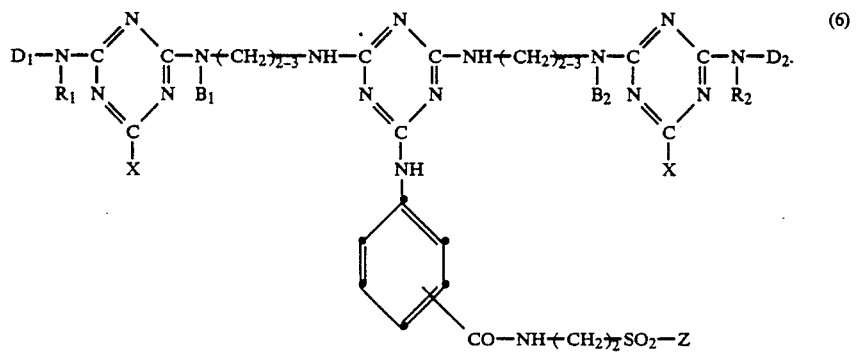
(6)
3. A reactive dye according to claim 1 of the formula
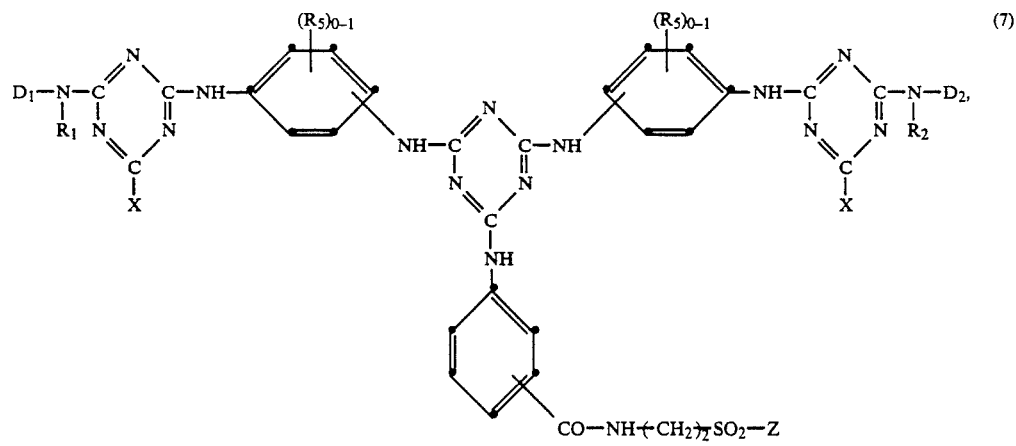
(7)
in which $R_5$ is 0 to 1 substituents from the group consisting of methyl, methoxy, chlorine and sulfo.
4. A reactive dye according to claim 1 of the formula
5. A reactive dye according to claim 1 of the formula
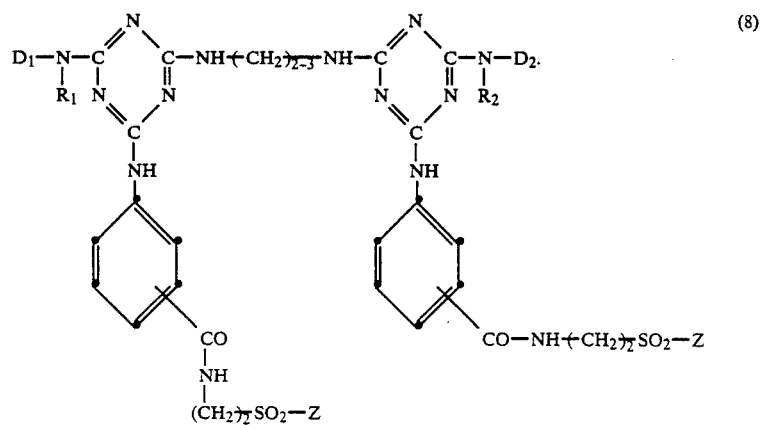
(8)

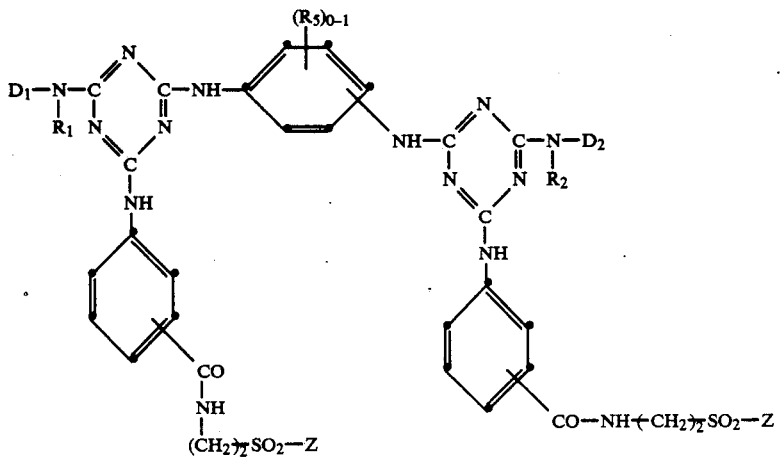

(9)

in which $R_5$ is 0 to 1 substituents from the group consisting of methyl, methoxy, chlorine or sulfo.

6. A reactive dye according to claim 1, in which the radicals $D_1$—$N(R_1)$— and —$N(R_2)$—$D_2$ are identical.

7. A reactive dye according to claim 1, in which X is fluorine or chlorine.

8. A reactive dye according to claim 1, in which $R_1$ and $R_2$ are hydrogen, methyl, ethyl or β-hydroxyethyl.

9. A reactive dye according to claim 1, in which $B_1$ and $B_2$ are hydrogen.

10. A reactive dye according to claim 1, in which $D_1$ and $D_2$ are each a monoazo or disazo dye.

11. A reactive dye according to claim 1, in which $D_1$ and $D_2$ are each a metal complex azo, anthraquinone or formazan dye.

12. A reactive dye according to claim 10, in which $D_1$ and $D_2$ are each a monoazo or disazo dye of the formula

(10a), or

(10b), or of a metal complex derived therefrom; D is a benzene or naphthalene diazo component, M is a benzene or naphthalene middle component, and K is a 6-hydroxy-2-pyridone, arylacetoacetamide benzene, naphthalene or pyrazolone coupling component, where D, M and K is unsubstituted or substituted by alkyl having 1 to 4 carbon atoms, alkoxy having 1 to 4 carbon atoms, alkanoylamino having 2 to 8 carbon atoms, benzoylamino, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, alkylsufonyl having 1 to 4 carbon atoms, trifluoromethyl, nitro, cyano, halogen, carbamoyl, N-alkylcarbamoyl having 1 to 4 carbon atoms in the alkyl radical, sulfamoyl, N-alkylsulfamoyl having 1 to 4 carbon atoms, N-(β-hydroxyethyl)sulfamoyl, N,N-di-(β-hydroxyethyl)sulfamoyl, N-phenylsulfamoyl, ureido, hydroxyl, carboxyl, sulfomethyl or sulfo; r is 0 or 1; and D, M and K together contain at least two sulfo groups.

13. A reactive dye according to claim 12, in which D, M and K is unsubstituted or substituted by hydroxy, amino, methyl, methoxy, ethoxy, $C_2$-$C_4$alkanoylamino, benzoylamino or halogen.

14. A reactive dye according to claim 12, in which D, M and K together contain three or four sulfo groups.

15. A reactive dye according to claim 11, in which $D_1$ and $D_2$ are each a 1:1 copper complex azo dye containing benzene or naphthalene and the copper atom is bound to one metallizable group each on both sides in the ortho-position with respect to the azo bridge.

16. A reactive dye according to claim 11, in which $D_1$ and $D_2$ are each a formazan dye of the formula

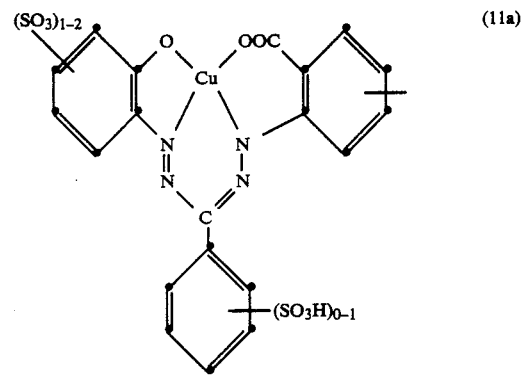
(11a)

or

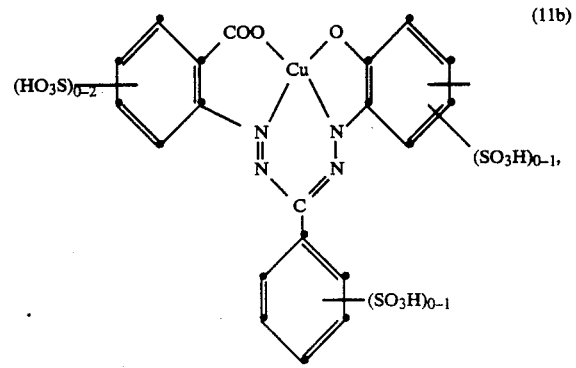
(11b)

in which the benzene rings are unsubstituted or further substituted by alkyl having 1 to 4 carbon atoms, alkoxy having 1 to 4 carbon atoms, alkylsulfonyl having 1 to 4 carbon atoms, halogen or carboxyl.

17. A reactive dye according to claim 12, in which $D_1$ and $D_2$ are each a radical of the formula

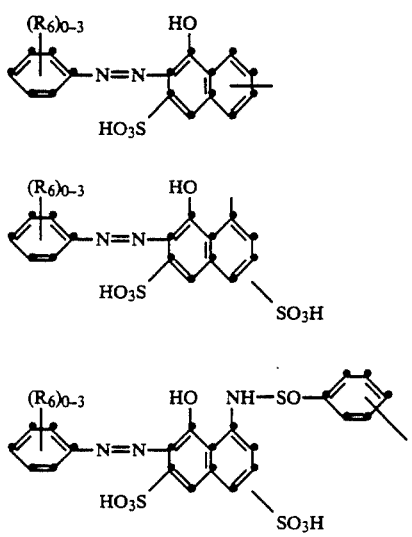

in which $R_6$ is 0 to 3 substituents from the group consisting of $C_1$-$C_4$alkyl, $C_1$-$C_4$alkoxy, halogen, carboxyl and sulfo,

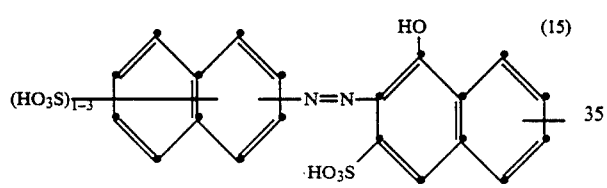

in which $R_7$ is 0 to 4 substituents from the group consisting of halogen, nitro, cyano, trifluoromethyl, sulfamoyl, carbamoyl, $C_1$-$C_4$alkyl, $C_1$-$C_4$alkoxy, amino, acetylamino, ureido, hydroxyl, carboxyl, sulfomethyl and sulfo, independently of one another.

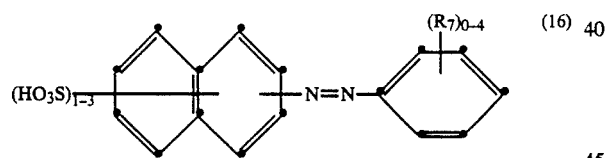

in which $R_8$ is $C_1$-$C_4$alkanoyl or benzoyl,

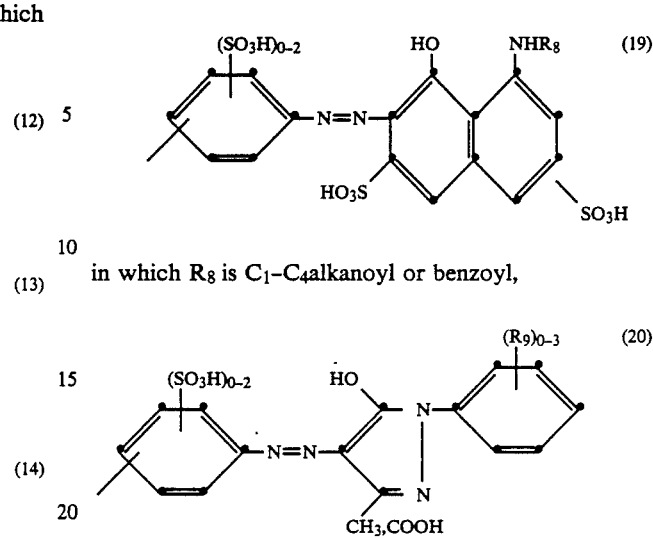

in which $R_8$ is $C_1$-$C_4$alkanoyl or benzoyl,

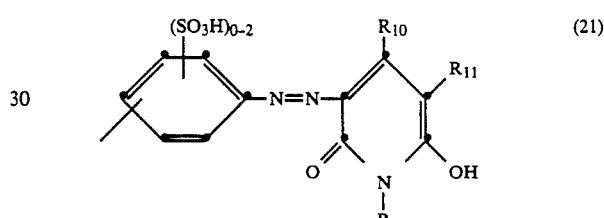

in which $R_9$ is 0 to 3 substituents from the group consisting of $C_1$-$C_4$alkyl, $C_1$-$C_4$alkoxy, halogen, carboxyl and sulfo,

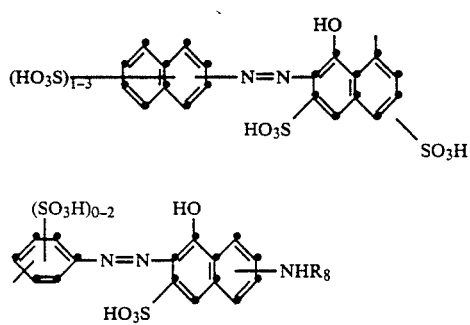

in which $R_{12}$ and $R_{10}$, independently of one another, are hydrogen, $C_1$-$C_4$alkyl or phenyl, and $R_{11}$ is hydrogen, cyano, carbamoyl or sulfomethyl,

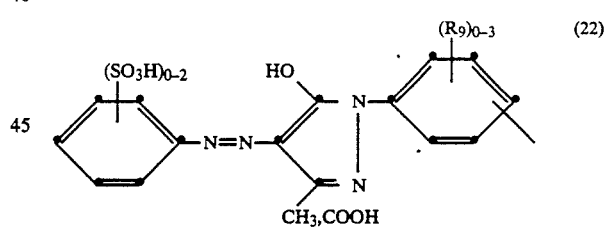

in which $R_9$ is 0 to 3 substituents from the group consisting of $C_1$-$C_4$alkyl, $C_1$-$C_4$alkoxy, halogen, carboxyl and sulfo,

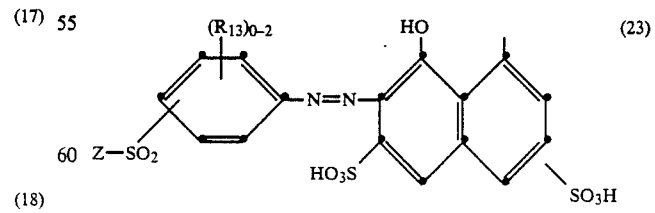

in which $R_{13}$ is 0 to 2 substituents from the group consisting of $C_1$-$C_4$alkyl, $C_1$-$C_4$alkoxy, halogen, carboxyl and sulfo; and Z is β-sulfatoethyl, β-thiosulfatoethyl, β-phosphatoethyl, β-acetoxyethyl, β-halogenoethyl or vinyl, or

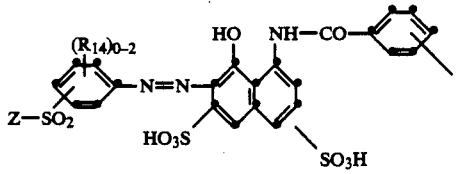 (24)

in which $R_{14}$ is 0 to 2 substituents from the group consisting of $C_1$–$C_4$ alkyl, $C_1$–$C_4$ alkoxy, halogen, carboxyl and sulfo; and Z is β-sulfatoethyl, β-thiosulfatoethyl, β-phosphatoethyl, β-acetoxyethyl, β-halogenoethyl or vinyl.

18. A reactive dye according to claim 1, in which R is a radical of the formula

 (25a)

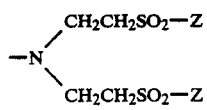 (25b)

 (25c)

 (25d)

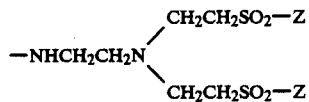 (25e)

or

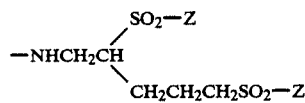 (25f)

and Z is β-chloroethyl, vinyl or β-sulfatoethyl.

19. A reactive dye according to claim 11, in which $D_1$ and $D_2$ are each an anthraquinone dye of the formula

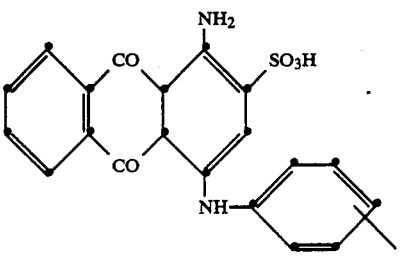

in which the anthraquinone nucleus is unsubstituted or substituted by a further sulfo group and the phenyl radical by alkyl having 1 to 4 carbon atoms, alkoxy having 1 to 4 carbon atoms, halogen, carboxyl or sulfo, and the dye contains at least 2 sulfo groups.

20. A reactive dye according to claim 12, in which $D_1$ and $D_2$ are each a monoazo dye of the formula

 (10c)

or

 (10d)

or of a copper complex derived therefrom, D is benzene or naphthalene, which is unsubstituted or substituted by hydroxyl, chlorine, nitro, methyl, methoxy, ethoxy, carboxyl, β-chloroethylsulfonyl, vinylsulfonyl, β-sulfatoethylsulfonyl and β-chloroethylsulfonylbutyryl, K is benzene, naphthalene, 3-methyl-1-phenylpyrazolone or 3-carboxy-1-phenylpyrazolone, which is unsubstituted or substituted by amino, N-methylamino, methyl, methoxy, ethoxy, acetylamino, ureido, benzoylamino, hydroxyl and carboxyl, and D and K together contain at least two sulfo groups.

21. A reactive dye according to claim 20, in which D and K together contain three or four sulfo groups.

* * * * *